(12) United States Patent
Garg et al.

(10) Patent No.: US 10,691,445 B2
(45) Date of Patent: Jun. 23, 2020

(54) ISOLATING A PORTION OF AN ONLINE COMPUTING SERVICE FOR TESTING

(71) Applicant: MICROSOFT TECHNOLOGY LICENSING, LLC, Redmond, WA (US)

(72) Inventors: Nakul Garg, Redmond, WA (US); Ricardo Stern, Redmond, WA (US); Neelamadhaba Mahapatro, Bellevue, WA (US); Rui Chen, Bellevue, WA (US); Michael Wilde, Bothell, WA (US); Charles Jeffries, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/019,939

(22) Filed: Jun. 27, 2018

(65) Prior Publication Data

US 2018/0314514 A1 Nov. 1, 2018

Related U.S. Application Data

(63) Continuation of application No. 14/294,410, filed on Jun. 3, 2014, now Pat. No. 10,037,202.

(51) Int. Cl.
*G06F 8/65* (2018.01)
*G06F 11/36* (2006.01)
(Continued)

(52) U.S. Cl.
CPC .............. *G06F 8/65* (2013.01); *G06F 8/656* (2018.02); *G06F 11/3664* (2013.01); *H04L 41/5032* (2013.01); *H04L 41/5038* (2013.01)

(58) Field of Classification Search
CPC ..... G06F 11/3664; G06F 8/65; H04L 41/5038
See application file for complete search history.

(56) References Cited

U.S. PATENT DOCUMENTS

| 1,965,389 A | 7/1934 | Parr |
| 2,002,004 A | 5/1935 | Gard et al. |

(Continued)

FOREIGN PATENT DOCUMENTS

| CN | 1271896 A | 11/2000 |
| CN | 1337619 A | 2/2002 |

(Continued)

OTHER PUBLICATIONS

"Non-Final Office Action Issued in U.S. Appl. No. 14/264,619", dated Apr. 19, 2016, 12 Pages.
(Continued)

*Primary Examiner* — Mohamed A. Wasel
(74) *Attorney, Agent, or Firm* — NovoTechIP International PLLC

(57) ABSTRACT

Techniques for isolating a portion of an online computing service referred to as a deployment unit and configured with a complete build of the online computing service may include routing production traffic away from the deployment unit, applying one or more changes to the complete build, and after applying one or more changes to the complete build, using the deployment unit for testing these changes using end-to-end tests. In one embodiment, the deployment unit may be dedicated to a specific group of tenants that require at least some isolation from other tenants.

20 Claims, 12 Drawing Sheets

(51) Int. Cl.
  *G06F 8/656* (2018.01)
  *H04L 12/24* (2006.01)

(56) References Cited

U.S. PATENT DOCUMENTS

| | | | |
|---|---|---|---|
| 2,015,037 A | 9/1935 | MacFarland | |
| 4,868,653 A | 9/1989 | Golin et al. | |
| 5,060,170 A | 10/1991 | Bourgeois et al. | |
| 5,149,919 A | 9/1992 | Greanias et al. | |
| 5,241,682 A | 8/1993 | Bryant et al. | |
| 5,353,133 A | 10/1994 | Bernkopf | |
| 5,450,586 A | 9/1995 | Kuzara et al. | |
| 5,475,425 A | 12/1995 | Przyborski et al. | |
| 5,687,011 A | 11/1997 | Mowry | |
| 5,717,957 A | 2/1998 | Lin | |
| 5,778,404 A | 7/1998 | Capps et al. | |
| 5,831,594 A | 11/1998 | Tognazzini et al. | |
| 5,867,709 A | 2/1999 | Klencke | |
| 5,903,566 A | 5/1999 | Flammer, III | |
| 5,964,879 A | 10/1999 | Dunstan et al. | |
| 6,028,960 A | 2/2000 | Graf et al. | |
| 6,151,643 A | 11/2000 | Cheng et al. | |
| 6,167,337 A | 12/2000 | Haack et al. | |
| 6,167,377 A | 12/2000 | Gillick et al. | |
| 6,185,528 B1 | 2/2001 | Fissore et al. | |
| 6,232,972 B1 | 5/2001 | Arcuri et al. | |
| 6,263,308 B1 | 7/2001 | Heckerman et al. | |
| 6,278,942 B1 | 8/2001 | McDonough | |
| 6,282,709 B1 | 8/2001 | Reha et al. | |
| 6,339,437 B1 | 1/2002 | Nielsen | |
| 6,349,406 B1 | 2/2002 | Levine et al. | |
| 6,389,181 B2 | 5/2002 | Shaffer et al. | |
| 6,452,597 B1 | 9/2002 | Goldberg et al. | |
| 6,452,915 B1 | 9/2002 | Jorgensen | |
| 6,603,491 B2 | 8/2003 | Lemelson et al. | |
| 6,847,386 B2 | 1/2005 | Paleiov | |
| 6,854,073 B2 | 2/2005 | Bates et al. | |
| 6,879,709 B2 | 4/2005 | Tian et al. | |
| 6,934,370 B1 | 8/2005 | Leban et al. | |
| 6,970,947 B2 | 11/2005 | Ebling et al. | |
| 7,027,054 B1 | 4/2006 | Cheiky et al. | |
| 7,082,211 B2 | 7/2006 | Simon et al. | |
| 7,146,296 B1 | 12/2006 | Carlbom et al. | |
| 7,155,037 B2 | 12/2006 | Nagai et al. | |
| 7,251,812 B1 | 7/2007 | Jhanwar et al. | |
| 7,254,257 B2 | 8/2007 | Kim et al. | |
| 7,337,112 B2 | 2/2008 | Moriya et al. | |
| 7,370,043 B1 | 5/2008 | Shelton et al. | |
| 7,387,539 B2 | 6/2008 | Trenne | |
| 7,400,439 B2 | 7/2008 | Holman | |
| 7,443,791 B2 | 10/2008 | Barrett et al. | |
| 7,443,807 B2 | 10/2008 | Cutler | |
| 7,458,825 B2 | 12/2008 | Atsmon et al. | |
| 7,466,986 B2 | 12/2008 | Halcrow et al. | |
| 7,496,910 B2 | 2/2009 | Voskuil | |
| 7,525,928 B2 | 4/2009 | Cutler | |
| 7,551,754 B2 | 6/2009 | Steinberg et al. | |
| 7,577,295 B2 | 8/2009 | Constantin et al. | |
| 7,577,297 B2 | 8/2009 | Mori et al. | |
| 7,584,285 B2 | 9/2009 | Hudson et al. | |
| 7,606,375 B2 | 10/2009 | Bailey et al. | |
| 7,614,046 B2 | 11/2009 | Daniels et al. | |
| 7,639,877 B2 | 12/2009 | Shiota et al. | |
| 7,680,327 B2 | 3/2010 | Weiss | |
| 7,690,042 B2 | 3/2010 | Rantalahti | |
| 7,697,557 B2 | 4/2010 | Segel | |
| 7,703,036 B2 | 4/2010 | Satterfield et al. | |
| 7,716,643 B2 | 5/2010 | Goldin | |
| 7,729,902 B1 | 6/2010 | Gupta et al. | |
| 7,738,870 B2 | 6/2010 | Howard | |
| 7,751,599 B2 | 7/2010 | Chen et al. | |
| 7,756,538 B2 | 7/2010 | Bonta et al. | |
| 7,765,194 B1 | 7/2010 | Sharma et al. | |
| 7,766,498 B2 | 8/2010 | Sampsell | |
| 7,779,367 B2 | 8/2010 | Oshiro et al. | |
| 7,783,629 B2 | 8/2010 | Li et al. | |
| 7,783,777 B1 | 8/2010 | Pabla et al. | |
| 7,804,982 B2 | 9/2010 | Howard et al. | |
| 7,835,910 B1 | 11/2010 | Hakkani-Tur et al. | |
| 7,865,952 B1 | 1/2011 | Hopwood et al. | |
| 7,881,479 B2 | 2/2011 | Asada | |
| 7,900,011 B2 | 3/2011 | Amundsen et al. | |
| 7,959,308 B2 | 6/2011 | Freeman et al. | |
| 7,970,350 B2 | 6/2011 | Sheynman et al. | |
| 7,978,925 B1 | 7/2011 | Souchard | |
| 8,015,006 B2 | 9/2011 | Kennewick et al. | |
| 8,019,060 B2 | 9/2011 | Martino | |
| 8,024,564 B2 * | 9/2011 | Bassani | G06F 21/604 713/164 |
| 8,026,830 B2 | 9/2011 | Womble et al. | |
| 8,074,213 B1 | 12/2011 | Holtz | |
| 8,091,074 B2 | 1/2012 | Lyon-Smith | |
| 8,107,243 B2 | 1/2012 | Guccione et al. | |
| 8,121,408 B2 | 2/2012 | Omori | |
| 8,130,281 B2 | 3/2012 | Kaneda et al. | |
| 8,149,748 B2 | 4/2012 | Bata et al. | |
| 8,154,384 B2 | 4/2012 | Hirai | |
| 8,155,400 B2 | 4/2012 | Bronstein et al. | |
| 8,165,352 B1 | 4/2012 | Mohanty et al. | |
| 8,170,298 B2 | 5/2012 | Li et al. | |
| 8,189,807 B2 | 5/2012 | Cutler | |
| 8,194,177 B2 | 6/2012 | Jung et al. | |
| 8,212,294 B2 | 7/2012 | Hoke et al. | |
| 8,213,333 B2 | 7/2012 | Greel et al. | |
| 8,213,690 B2 | 7/2012 | Okada et al. | |
| 8,224,036 B2 | 7/2012 | Maruyama et al. | |
| 8,229,729 B2 | 7/2012 | Sarikaya et al. | |
| 8,232,962 B2 | 7/2012 | Buck | |
| 8,239,446 B2 | 8/2012 | Navar et al. | |
| 8,245,043 B2 | 8/2012 | Cutler | |
| 8,275,615 B2 | 9/2012 | Kozat et al. | |
| 8,296,107 B2 | 10/2012 | Turner et al. | |
| 8,296,673 B2 | 10/2012 | Lipstein et al. | |
| 8,302,006 B2 | 10/2012 | Stanek et al. | |
| 8,316,237 B1 | 11/2012 | Felsher et al. | |
| 8,321,220 B1 | 11/2012 | Chotimongkol et al. | |
| 8,326,000 B2 | 12/2012 | Jung et al. | |
| 8,326,634 B2 | 12/2012 | Di Cristo et al. | |
| 8,331,632 B1 | 12/2012 | Mohanty et al. | |
| 8,335,851 B1 * | 12/2012 | Vendrow | G06F 8/60 700/99 |
| 8,346,563 B1 | 1/2013 | Hjelm et al. | |
| 8,358,811 B2 | 1/2013 | Adams et al. | |
| 8,364,717 B2 | 1/2013 | Delling et al. | |
| 8,364,802 B1 * | 1/2013 | Keagy | G06F 8/63 709/223 |
| 8,368,540 B2 | 2/2013 | Perkins et al. | |
| 8,373,829 B2 | 2/2013 | Hara et al. | |
| 8,374,122 B2 | 2/2013 | Meier et al. | |
| 8,375,456 B2 | 2/2013 | Li et al. | |
| 8,384,694 B2 | 2/2013 | Powell et al. | |
| 8,392,594 B2 | 3/2013 | Georgis et al. | |
| 8,397,163 B1 | 3/2013 | Sran | |
| 8,400,332 B2 | 3/2013 | Szwabowski et al. | |
| 8,406,206 B2 | 3/2013 | Chiang | |
| 8,407,472 B2 | 3/2013 | Hao et al. | |
| 8,410,903 B2 | 4/2013 | Hirai | |
| 8,412,521 B2 | 4/2013 | Mathias et al. | |
| 8,413,198 B2 | 4/2013 | Connor et al. | |
| 8,418,139 B2 * | 4/2013 | Dhanakshirur | G06F 9/44505 717/121 |
| 8,421,874 B2 | 4/2013 | Okamoto et al. | |
| 8,448,847 B2 | 5/2013 | Lee | |
| 8,484,314 B2 | 7/2013 | Luna et al. | |
| 8,493,992 B2 | 7/2013 | Sella et al. | |
| 8,495,372 B2 | 7/2013 | Bailey et al. | |
| 8,504,823 B2 | 8/2013 | Carpenter et al. | |
| 8,516,471 B2 | 8/2013 | Bhakta et al. | |
| 8,522,209 B2 | 8/2013 | Wintergerst et al. | |
| 8,526,683 B2 | 9/2013 | Maruyama et al. | |
| 8,527,602 B1 | 9/2013 | Rasmussen et al. | |
| 8,532,347 B2 | 9/2013 | Bourdev | |
| 8,535,075 B1 | 9/2013 | Golko et al. | |
| 8,538,091 B2 | 9/2013 | Kaneda et al. | |

(56) References Cited

U.S. PATENT DOCUMENTS

| | | |
|---|---|---|
| 8,539,477 B2 | 9/2013 | Balascio et al. |
| 8,549,150 B1 | 10/2013 | Roseman et al. |
| 8,553,037 B2 | 10/2013 | Smith et al. |
| 8,555,364 B2 | 10/2013 | Filippi et al. |
| 8,559,722 B2 | 10/2013 | Tsuji |
| 8,571,866 B2 | 10/2013 | Melamed et al. |
| 8,611,678 B2 | 12/2013 | Hanson et al. |
| 8,614,734 B2 | 12/2013 | Cutler |
| 8,619,062 B2 | 12/2013 | Powell et al. |
| 8,620,351 B2 | 12/2013 | Karaoguz |
| 8,624,994 B2 | 1/2014 | Kaneda et al. |
| 8,626,932 B2 | 1/2014 | Lydon et al. |
| 8,631,350 B2 | 1/2014 | Lepage et al. |
| 8,649,604 B2 | 2/2014 | Steinberg et al. |
| 8,670,850 B2 | 3/2014 | Soulodre |
| 8,680,439 B2 | 3/2014 | Shei et al. |
| 8,686,600 B2 | 4/2014 | Terlizzi et al. |
| 8,701,102 B2 | 4/2014 | Appiah et al. |
| 8,719,603 B2 | 5/2014 | Belesiu et al. |
| 8,756,507 B2 | 6/2014 | Fong et al. |
| 8,776,166 B1 | 7/2014 | Erickson et al. |
| 8,839,222 B1* | 9/2014 | Brandwine ......... G06F 11/3668 717/168 |
| 8,880,439 B2 | 11/2014 | Archambeau et al. |
| 8,918,709 B2 | 12/2014 | Oleksy et al. |
| 8,924,315 B2 | 12/2014 | Archambeau et al. |
| 8,935,673 B1 | 1/2015 | Ashkenazi et al. |
| 9,017,092 B1 | 4/2015 | McCracken et al. |
| 9,058,311 B1 | 6/2015 | Bertz et al. |
| 9,088,891 B2 | 7/2015 | Belton et al. |
| 9,222,791 B2 | 12/2015 | Delling et al. |
| 9,239,773 B1 | 1/2016 | Teplitsky et al. |
| 9,262,152 B1* | 2/2016 | Kurian ...................... G06F 8/65 |
| 9,311,718 B2 | 4/2016 | Scavezze et al. |
| 9,324,321 B2 | 4/2016 | Xue et al. |
| 9,324,323 B1 | 4/2016 | Bikel et al. |
| 9,329,761 B2 | 5/2016 | Rodrig et al. |
| 9,367,490 B2 | 6/2016 | Huang et al. |
| 9,373,179 B2 | 6/2016 | Negrila et al. |
| 9,384,334 B2 | 7/2016 | Burba et al. |
| 9,384,335 B2 | 7/2016 | Hunt et al. |
| 9,430,667 B2 | 8/2016 | Burba et al. |
| 9,520,127 B2 | 12/2016 | Li et al. |
| 9,614,724 B2 | 4/2017 | Menezes et al. |
| 9,645,808 B1* | 5/2017 | Turpie ...................... G06F 8/65 |
| 9,720,548 B2 | 8/2017 | Powell |
| 10,037,202 B2 | 7/2018 | Garg et al. |
| 10,062,188 B2 | 8/2018 | Delling et al. |
| 2001/0000356 A1 | 4/2001 | Woods |
| 2002/0083041 A1 | 6/2002 | Achlioptas et al. |
| 2002/0101918 A1 | 8/2002 | Rodman et al. |
| 2002/0116171 A1 | 8/2002 | Russell |
| 2002/0143855 A1 | 10/2002 | Traversat et al. |
| 2002/0149924 A1 | 10/2002 | Falicoff et al. |
| 2003/0031177 A1 | 2/2003 | Robidas et al. |
| 2003/0064142 A1 | 4/2003 | Wagner et al. |
| 2003/0125948 A1 | 7/2003 | Lyudovyk |
| 2003/0182414 A1 | 9/2003 | O'neill |
| 2003/0212543 A1 | 11/2003 | Epstein et al. |
| 2003/0212544 A1 | 11/2003 | Acero et al. |
| 2004/0032831 A1 | 2/2004 | Matthews |
| 2004/0040021 A1 | 2/2004 | Bharati et al. |
| 2004/0076079 A1 | 4/2004 | Lyon et al. |
| 2004/0088726 A1 | 5/2004 | Ma et al. |
| 2004/0168165 A1 | 8/2004 | Kokkinen |
| 2004/0210752 A1 | 10/2004 | Rao |
| 2004/0240711 A1 | 12/2004 | Hamza et al. |
| 2005/0039169 A1 | 2/2005 | Hsu et al. |
| 2005/0052427 A1 | 3/2005 | Wu et al. |
| 2005/0058297 A1 | 3/2005 | Jot et al. |
| 2005/0065789 A1 | 3/2005 | Yacoub et al. |
| 2005/0091057 A1 | 4/2005 | Phillips et al. |
| 2005/0111189 A1 | 5/2005 | Smalc et al. |
| 2005/0114625 A1 | 5/2005 | Snyder |
| 2005/0132348 A1 | 6/2005 | Meulemans et al. |
| 2005/0144013 A1 | 6/2005 | Fujimoto et al. |
| 2005/0144616 A1 | 6/2005 | Hammond et al. |
| 2005/0165598 A1 | 7/2005 | Cote et al. |
| 2005/0165839 A1 | 7/2005 | Madan et al. |
| 2005/0177515 A1 | 8/2005 | Kalavade et al. |
| 2005/0177624 A1 | 8/2005 | Oswald et al. |
| 2005/0198407 A1 | 9/2005 | Lee |
| 2005/0245243 A1 | 11/2005 | Zuniga |
| 2006/0036965 A1 | 2/2006 | Harris et al. |
| 2006/0046709 A1 | 3/2006 | Krumm et al. |
| 2006/0058009 A1 | 3/2006 | Vogedes et al. |
| 2006/0088209 A1 | 4/2006 | Yu et al. |
| 2006/0155777 A1* | 7/2006 | Shih ..................... G06F 11/3672 |
| 2006/0156222 A1 | 7/2006 | Chi et al. |
| 2006/0174017 A1 | 8/2006 | Robertson |
| 2006/0200477 A1 | 9/2006 | Barrenechea |
| 2006/0212867 A1 | 9/2006 | Fields et al. |
| 2006/0244845 A1 | 11/2006 | Craig et al. |
| 2006/0253491 A1 | 11/2006 | Gokturk et al. |
| 2006/0277478 A1 | 12/2006 | Seraji et al. |
| 2006/0280341 A1 | 12/2006 | Koshizen et al. |
| 2006/0290705 A1 | 12/2006 | White et al. |
| 2007/0038436 A1 | 2/2007 | Cristo et al. |
| 2007/0055752 A1 | 3/2007 | Wiegand et al. |
| 2007/0055936 A1 | 3/2007 | Dhanjal et al. |
| 2007/0058878 A1 | 3/2007 | Gomilla et al. |
| 2007/0074168 A1 | 3/2007 | Bates et al. |
| 2007/0128979 A1 | 6/2007 | Shackelford et al. |
| 2007/0136324 A1* | 6/2007 | Xu ........................ G06F 16/254 |
| 2007/0147318 A1 | 6/2007 | Ross et al. |
| 2007/0150428 A1 | 6/2007 | Webb |
| 2007/0156392 A1 | 7/2007 | Balchandran et al. |
| 2007/0157313 A1 | 7/2007 | Denton |
| 2007/0188477 A1 | 8/2007 | Rehm |
| 2007/0198950 A1 | 8/2007 | Dodge et al. |
| 2007/0203863 A1 | 8/2007 | Gupta et al. |
| 2007/0226649 A1 | 9/2007 | Agmon |
| 2007/0233879 A1 | 10/2007 | Woods et al. |
| 2007/0294061 A1 | 12/2007 | Carlbom et al. |
| 2008/0004877 A1 | 1/2008 | Tian |
| 2008/0005114 A1 | 1/2008 | Li |
| 2008/0037438 A1 | 2/2008 | Twiss et al. |
| 2008/0037442 A1 | 2/2008 | Bill |
| 2008/0046425 A1 | 2/2008 | Perski |
| 2008/0055278 A1 | 3/2008 | Locker et al. |
| 2008/0066181 A1 | 3/2008 | Haveson et al. |
| 2008/0069364 A1 | 3/2008 | Itou et al. |
| 2008/0089299 A1 | 4/2008 | Lindsley et al. |
| 2008/0089561 A1 | 4/2008 | Zhang |
| 2008/0137875 A1 | 6/2008 | Zong et al. |
| 2008/0140981 A1 | 6/2008 | Kim |
| 2008/0143674 A1 | 6/2008 | Molander et al. |
| 2008/0159232 A1 | 7/2008 | Thalanany et al. |
| 2008/0164934 A1 | 7/2008 | Hankey et al. |
| 2008/0165701 A1 | 7/2008 | Ananthanarayanan et al. |
| 2008/0175190 A1 | 7/2008 | Lee et al. |
| 2008/0192820 A1 | 8/2008 | Brooks et al. |
| 2008/0195388 A1 | 8/2008 | Bower et al. |
| 2008/0204598 A1 | 8/2008 | Maurer et al. |
| 2008/0209354 A1 | 8/2008 | Stanek et al. |
| 2008/0212894 A1 | 9/2008 | Demirli et al. |
| 2008/0215183 A1 | 9/2008 | Chen et al. |
| 2008/0235017 A1 | 9/2008 | Satomura |
| 2008/0253564 A1 | 10/2008 | Kahn et al. |
| 2008/0263130 A1 | 10/2008 | Michalowitz et al. |
| 2008/0273708 A1 | 11/2008 | Sandgren et al. |
| 2008/0313264 A1 | 12/2008 | Pestoni |
| 2009/0010623 A1 | 1/2009 | Date et al. |
| 2009/0030697 A1 | 1/2009 | Cerra et al. |
| 2009/0046864 A1 | 2/2009 | Mahabub et al. |
| 2009/0055389 A1 | 2/2009 | Schilit et al. |
| 2009/0055461 A1 | 2/2009 | Georgis et al. |
| 2009/0083148 A1 | 3/2009 | Hwang et al. |
| 2009/0087099 A1 | 4/2009 | Nakamura |
| 2009/0089801 A1 | 4/2009 | Jones et al. |
| 2009/0100384 A1 | 4/2009 | Louch |
| 2009/0100459 A1 | 4/2009 | Riedl |
| 2009/0100489 A1 | 4/2009 | Strothmann |
| 2009/0116749 A1 | 5/2009 | Cristinacce et al. |

(56) References Cited

U.S. PATENT DOCUMENTS

| | | |
|---|---|---|
| 2009/0180671 A1 | 7/2009 | Lee et al. |
| 2009/0187593 A1 | 7/2009 | Chen et al. |
| 2009/0193445 A1* | 7/2009 | Thakker ............... G06F 11/366 |
| | | 719/332 |
| 2009/0210328 A1 | 8/2009 | Fomenko et al. |
| 2009/0219405 A1 | 9/2009 | Kaneda et al. |
| 2009/0259667 A1 | 10/2009 | Wang et al. |
| 2009/0271735 A1 | 10/2009 | Anderson et al. |
| 2009/0292687 A1 | 11/2009 | Fan et al. |
| 2009/0300596 A1 | 12/2009 | Tyhurst et al. |
| 2009/0313330 A1 | 12/2009 | Sakamoto |
| 2009/0326960 A1 | 12/2009 | Breebaat |
| 2010/0004930 A1 | 1/2010 | Strope et al. |
| 2010/0008233 A1* | 1/2010 | Ee ............................ H04L 43/50 |
| | | 370/241 |
| 2010/0011123 A1 | 1/2010 | Dantzig et al. |
| 2010/0015956 A1 | 1/2010 | Qu et al. |
| 2010/0023251 A1 | 1/2010 | Gale et al. |
| 2010/0027663 A1 | 2/2010 | Dai et al. |
| 2010/0076941 A1 | 3/2010 | Dotsenko et al. |
| 2010/0082316 A1* | 4/2010 | Chawla ............... H04L 12/4641 |
| | | 703/13 |
| 2010/0082478 A1 | 4/2010 | Van der veen et al. |
| 2010/0101763 A1 | 4/2010 | Huang et al. |
| 2010/0103117 A1 | 4/2010 | Townsend et al. |
| 2010/0111059 A1 | 5/2010 | Bappu et al. |
| 2010/0114890 A1 | 5/2010 | Hagar et al. |
| 2010/0121954 A1 | 5/2010 | Yang et al. |
| 2010/0128863 A1 | 5/2010 | Krum et al. |
| 2010/0135038 A1 | 6/2010 | Handschy et al. |
| 2010/0149755 A1 | 6/2010 | Tomioka et al. |
| 2010/0162226 A1 | 6/2010 | Borissov et al. |
| 2010/0191837 A1 | 7/2010 | Linden et al. |
| 2010/0205177 A1 | 8/2010 | Sato et al. |
| 2010/0211695 A1 | 8/2010 | Steinmetz et al. |
| 2010/0211908 A1 | 8/2010 | Luk et al. |
| 2010/0229222 A1 | 9/2010 | Li et al. |
| 2010/0251206 A1 | 9/2010 | Horiuchi et al. |
| 2010/0251230 A1 | 9/2010 | O'farrell et al. |
| 2010/0295774 A1 | 11/2010 | Hennessey |
| 2010/0312546 A1 | 12/2010 | Chang et al. |
| 2010/0329533 A1 | 12/2010 | Omi |
| 2011/0006603 A1 | 1/2011 | Robinson et al. |
| 2011/0007174 A1 | 1/2011 | Bacivarov et al. |
| 2011/0010171 A1 | 1/2011 | Talwar et al. |
| 2011/0010319 A1 | 1/2011 | Harada et al. |
| 2011/0010424 A1 | 1/2011 | Fox et al. |
| 2011/0016333 A1 | 1/2011 | Scott et al. |
| 2011/0023111 A1 | 1/2011 | Gunadisastra et al. |
| 2011/0031113 A1 | 2/2011 | Lopatin et al. |
| 2011/0043490 A1 | 2/2011 | Powell et al. |
| 2011/0052081 A1 | 3/2011 | Onoe et al. |
| 2011/0055901 A1 | 3/2011 | Karaoguz et al. |
| 2011/0055935 A1 | 3/2011 | Karaoguz et al. |
| 2011/0064331 A1 | 3/2011 | Andres Del Valle |
| 2011/0071841 A1 | 3/2011 | Fomenko et al. |
| 2011/0081023 A1 | 4/2011 | Raghuvanshi et al. |
| 2011/0087666 A1 | 4/2011 | Chou et al. |
| 2011/0093459 A1 | 4/2011 | Dong et al. |
| 2011/0099538 A1 | 4/2011 | Naidu pujala et al. |
| 2011/0129159 A1 | 6/2011 | Cifarelli |
| 2011/0135166 A1 | 6/2011 | Wechsler et al. |
| 2011/0138064 A1 | 6/2011 | Rieger et al. |
| 2011/0144999 A1 | 6/2011 | Jang et al. |
| 2011/0153324 A1 | 6/2011 | Ballinger et al. |
| 2011/0167181 A1 | 7/2011 | Minoo et al. |
| 2011/0177481 A1 | 7/2011 | Haff et al. |
| 2011/0179182 A1 | 7/2011 | Vadla Ravnas |
| 2011/0208980 A1 | 8/2011 | Brooks et al. |
| 2011/0225366 A1 | 9/2011 | Izadi et al. |
| 2011/0231676 A1 | 9/2011 | Atkins et al. |
| 2011/0283266 A1 | 11/2011 | Gallagher et al. |
| 2011/0289482 A1 | 11/2011 | Bentley |
| 2011/0321029 A1 | 12/2011 | Kern et al. |
| 2012/0014560 A1 | 1/2012 | Obrador et al. |
| 2012/0027311 A1 | 2/2012 | Cok |
| 2012/0029661 A1 | 2/2012 | Jones et al. |
| 2012/0030325 A1 | 2/2012 | Silverman et al. |
| 2012/0030682 A1 | 2/2012 | Shaffer et al. |
| 2012/0065976 A1 | 3/2012 | Deng et al. |
| 2012/0066642 A1 | 3/2012 | Shi |
| 2012/0071174 A1 | 3/2012 | Bao et al. |
| 2012/0072528 A1 | 3/2012 | Rimac et al. |
| 2012/0076427 A1 | 3/2012 | Hibino et al. |
| 2012/0078612 A1 | 3/2012 | Kandekar et al. |
| 2012/0078690 A1 | 3/2012 | Harriman et al. |
| 2012/0079372 A1 | 3/2012 | Kandekar et al. |
| 2012/0084086 A1 | 4/2012 | Gilbert et al. |
| 2012/0084655 A1 | 4/2012 | Gallagher et al. |
| 2012/0096121 A1 | 4/2012 | Hao et al. |
| 2012/0118537 A1 | 5/2012 | Kameoka et al. |
| 2012/0120678 A1 | 5/2012 | Su |
| 2012/0134139 A1 | 5/2012 | Jang et al. |
| 2012/0144288 A1 | 6/2012 | Caruso et al. |
| 2012/0148159 A1 | 6/2012 | Kaneda et al. |
| 2012/0150548 A1 | 6/2012 | Rajagopalan et al. |
| 2012/0169791 A1 | 7/2012 | Whitehead et al. |
| 2012/0179674 A1 | 7/2012 | Delling et al. |
| 2012/0188382 A1 | 7/2012 | Morrison et al. |
| 2012/0224388 A1 | 9/2012 | Lin |
| 2012/0225652 A1 | 9/2012 | Martinez et al. |
| 2012/0231862 A1 | 9/2012 | Yamamoto |
| 2012/0232885 A1 | 9/2012 | Barbosa et al. |
| 2012/0235887 A1 | 9/2012 | Border et al. |
| 2012/0236184 A1 | 9/2012 | Jia et al. |
| 2012/0242598 A1 | 9/2012 | Won et al. |
| 2012/0245944 A1 | 9/2012 | Gruber et al. |
| 2012/0246458 A1 | 9/2012 | Jain et al. |
| 2012/0250535 A1 | 10/2012 | Delling et al. |
| 2012/0253799 A1 | 10/2012 | Bangalore et al. |
| 2012/0253802 A1 | 10/2012 | Heck et al. |
| 2012/0254086 A1 | 10/2012 | Deng et al. |
| 2012/0254153 A1 | 10/2012 | Abraham et al. |
| 2012/0254161 A1 | 10/2012 | Zhang et al. |
| 2012/0254227 A1 | 10/2012 | Heck et al. |
| 2012/0256967 A1 | 10/2012 | Baldwin et al. |
| 2012/0265531 A1 | 10/2012 | Bennett |
| 2012/0266140 A1 | 10/2012 | Bates |
| 2012/0269355 A1 | 10/2012 | Chandak et al. |
| 2012/0271617 A1 | 10/2012 | Nakajima et al. |
| 2012/0278430 A1 | 11/2012 | Lehane et al. |
| 2012/0290293 A1 | 11/2012 | Hakkani-tur et al. |
| 2012/0293543 A1 | 11/2012 | Jardine-skinner |
| 2012/0303565 A1 | 11/2012 | Deng et al. |
| 2012/0310523 A1 | 12/2012 | Delling et al. |
| 2012/0313865 A1 | 12/2012 | Pearce |
| 2012/0317197 A1 | 12/2012 | De foy et al. |
| 2012/0327040 A1 | 12/2012 | Simon et al. |
| 2012/0327042 A1 | 12/2012 | Harley et al. |
| 2012/0330887 A1 | 12/2012 | Young et al. |
| 2012/0331102 A1 | 12/2012 | Ertugrul |
| 2012/0331111 A1 | 12/2012 | Wu et al. |
| 2013/0013936 A1 | 1/2013 | Lin et al. |
| 2013/0014050 A1 | 1/2013 | Queru |
| 2013/0016055 A1 | 1/2013 | Chuang |
| 2013/0019175 A1 | 1/2013 | Kotler et al. |
| 2013/0021373 A1 | 1/2013 | Vaught et al. |
| 2013/0022513 A1 | 1/2013 | Yoshioka et al. |
| 2013/0031476 A1 | 1/2013 | Coin et al. |
| 2013/0034649 A1 | 2/2013 | Boghmans et al. |
| 2013/0058274 A1 | 3/2013 | Scherzer et al. |
| 2013/0065576 A1 | 3/2013 | Basir |
| 2013/0073725 A1 | 3/2013 | Bordeleau et al. |
| 2013/0078869 A1 | 3/2013 | Golko et al. |
| 2013/0085756 A1 | 4/2013 | Chotimongkol et al. |
| 2013/0086461 A1 | 4/2013 | Ashley-rollman et al. |
| 2013/0086507 A1 | 4/2013 | Poston et al. |
| 2013/0091205 A1 | 4/2013 | Kotler et al. |
| 2013/0091440 A1 | 4/2013 | Kotler et al. |
| 2013/0091453 A1 | 4/2013 | Kotler et al. |
| 2013/0091465 A1 | 4/2013 | Kikin-Gil et al. |
| 2013/0091534 A1 | 4/2013 | Gilde et al. |
| 2013/0094445 A1 | 4/2013 | De foy et al. |
| 2013/0097481 A1 | 4/2013 | Kotler et al. |

(56) References Cited

U.S. PATENT DOCUMENTS

| | | |
|---|---|---|
| 2013/0097490 A1 | 4/2013 | Kotler et al. |
| 2013/0106725 A1 | 5/2013 | Bakken et al. |
| 2013/0106740 A1 | 5/2013 | Yilmaz et al. |
| 2013/0106977 A1 | 5/2013 | Chu et al. |
| 2013/0108065 A1 | 5/2013 | Mullins et al. |
| 2013/0115821 A1 | 5/2013 | Golko et al. |
| 2013/0117470 A1 | 5/2013 | Terlizzi et al. |
| 2013/0117658 A1 | 5/2013 | Fidler et al. |
| 2013/0127982 A1 | 5/2013 | Zhang et al. |
| 2013/0128364 A1 | 5/2013 | Wheeler et al. |
| 2013/0132369 A1 | 5/2013 | Delling et al. |
| 2013/0132614 A1 | 5/2013 | Bajpai et al. |
| 2013/0138436 A1 | 5/2013 | Yu et al. |
| 2013/0148864 A1 | 6/2013 | Dolson et al. |
| 2013/0151441 A1 | 6/2013 | Archambeau et al. |
| 2013/0152092 A1 | 6/2013 | Yadgar |
| 2013/0159021 A1 | 6/2013 | Felsher |
| 2013/0166742 A1 | 6/2013 | Wiener et al. |
| 2013/0173604 A1 | 7/2013 | Li et al. |
| 2013/0174047 A1 | 7/2013 | Sivakumar et al. |
| 2013/0179067 A1 | 7/2013 | Trowbridge et al. |
| 2013/0179172 A1 | 7/2013 | Nakamura et al. |
| 2013/0185065 A1 | 7/2013 | Tzirkel-hancock et al. |
| 2013/0188032 A1 | 7/2013 | Vertegaal |
| 2013/0191781 A1 | 7/2013 | Radakovitz et al. |
| 2013/0212484 A1 | 8/2013 | Joshi et al. |
| 2013/0217414 A1 | 8/2013 | Nagaraj |
| 2013/0226587 A1 | 8/2013 | Cheung et al. |
| 2013/0227398 A1 | 8/2013 | Bolstad |
| 2013/0227415 A1 | 8/2013 | Gregg et al. |
| 2013/0231862 A1 | 9/2013 | Delling et al. |
| 2013/0234913 A1 | 9/2013 | Thangadorai et al. |
| 2013/0238729 A1 | 9/2013 | Holzman et al. |
| 2013/0238819 A1 | 9/2013 | Oljaca et al. |
| 2013/0242964 A1 | 9/2013 | Hassan et al. |
| 2013/0252636 A1 | 9/2013 | Chang et al. |
| 2013/0254412 A1 | 9/2013 | Menezes et al. |
| 2013/0266196 A1 | 10/2013 | Kono et al. |
| 2013/0275779 A1 | 10/2013 | He |
| 2013/0293530 A1 | 11/2013 | Perez et al. |
| 2013/0297700 A1 | 11/2013 | Hayton et al. |
| 2013/0297769 A1* | 11/2013 | Chang ............... G06F 30/00 709/224 |
| 2013/0298185 A1 | 11/2013 | Koneru et al. |
| 2013/0305210 A1* | 11/2013 | Sharma ............... G06Q 10/06 717/102 |
| 2013/0311423 A1* | 11/2013 | Price ............... G06F 16/214 707/609 |
| 2013/0321390 A1 | 12/2013 | Latta et al. |
| 2013/0335301 A1 | 12/2013 | Wong et al. |
| 2013/0346494 A1 | 12/2013 | Nakfour et al. |
| 2014/0004741 A1 | 1/2014 | Jol et al. |
| 2014/0007215 A1 | 1/2014 | Romano et al. |
| 2014/0019626 A1 | 1/2014 | Hubler et al. |
| 2014/0019896 A1 | 1/2014 | Satterfield et al. |
| 2014/0025380 A1 | 1/2014 | Koch et al. |
| 2014/0046914 A1 | 2/2014 | Das et al. |
| 2014/0072242 A1 | 3/2014 | Wei et al. |
| 2014/0075523 A1 | 3/2014 | Tuomaala et al. |
| 2014/0087355 A1* | 3/2014 | Henry ............... G09B 7/00 434/362 |
| 2014/0092554 A1 | 4/2014 | Yamaguchi et al. |
| 2014/0098682 A1 | 4/2014 | Cao et al. |
| 2014/0107921 A1 | 4/2014 | Delling et al. |
| 2014/0108979 A1 | 4/2014 | Davidson et al. |
| 2014/0141635 A1 | 5/2014 | Saunders et al. |
| 2014/0157169 A1 | 6/2014 | Kikin-gil |
| 2014/0173602 A1 | 6/2014 | Kikin-gil et al. |
| 2014/0181708 A1 | 6/2014 | Kikin-gil et al. |
| 2014/0210797 A1 | 7/2014 | Kreek et al. |
| 2014/0211065 A1 | 7/2014 | Sudheendra et al. |
| 2014/0214410 A1 | 7/2014 | Jang et al. |
| 2014/0222729 A1 | 8/2014 | Dasgupta et al. |
| 2014/0253522 A1 | 9/2014 | Cueto |
| 2014/0257803 A1 | 9/2014 | Yu et al. |
| 2014/0258405 A1 | 9/2014 | Perkin |
| 2014/0282415 A1 | 9/2014 | Ovadia et al. |
| 2014/0297412 A1 | 10/2014 | Fong et al. |
| 2014/0304297 A1 | 10/2014 | Lian et al. |
| 2014/0317602 A1 | 10/2014 | Zuo |
| 2014/0341443 A1 | 11/2014 | Cao et al. |
| 2014/0358537 A1 | 12/2014 | Gilbert et al. |
| 2014/0359593 A1 | 12/2014 | Cohen et al. |
| 2014/0372112 A1 | 12/2014 | Xue et al. |
| 2014/0379326 A1 | 12/2014 | Sarikaya et al. |
| 2014/0379353 A1 | 12/2014 | Boies et al. |
| 2015/0081572 A1 | 3/2015 | Thomas et al. |
| 2015/0082291 A1 | 3/2015 | Thomas et al. |
| 2015/0082292 A1 | 3/2015 | Thomas et al. |
| 2015/0082293 A1 | 3/2015 | Thomas et al. |
| 2015/0082296 A1 | 3/2015 | Thomas et al. |
| 2015/0100312 A1 | 4/2015 | Bocchieri et al. |
| 2015/0160961 A1* | 6/2015 | Johnson ............... H04L 63/0272 718/1 |
| 2015/0161993 A1 | 6/2015 | Sainath et al. |
| 2015/0161994 A1 | 6/2015 | Tang et al. |
| 2015/0170020 A1 | 6/2015 | Garimella |
| 2015/0206321 A1 | 7/2015 | Scavezze et al. |
| 2015/0234725 A1* | 8/2015 | Cillis ............... G06F 11/263 714/33 |
| 2015/0255061 A1 | 9/2015 | Xue et al. |
| 2015/0255069 A1 | 9/2015 | Adams et al. |
| 2015/0277682 A1 | 10/2015 | Kaufthal et al. |
| 2015/0277708 A1 | 10/2015 | Rodrig et al. |
| 2015/0278191 A1 | 10/2015 | Levit et al. |
| 2015/0302040 A1* | 10/2015 | Amigud ............... G06F 16/2365 707/694 |
| 2015/0304165 A1 | 10/2015 | Menezes et al. |
| 2015/0310040 A1 | 10/2015 | Chan et al. |
| 2015/0310261 A1 | 10/2015 | Lee et al. |
| 2015/0310858 A1 | 10/2015 | Li et al. |
| 2015/0317147 A1 | 11/2015 | Nachimuthu et al. |
| 2015/0317313 A1 | 11/2015 | Lv et al. |
| 2015/0317510 A1 | 11/2015 | Lee et al. |
| 2015/0324555 A1 | 11/2015 | Burba et al. |
| 2015/0324556 A1 | 11/2015 | Hunt et al. |
| 2015/0324601 A1 | 11/2015 | Burba et al. |
| 2015/0325236 A1 | 11/2015 | Levit et al. |
| 2015/0327068 A1 | 11/2015 | Hunt et al. |
| 2015/0331240 A1 | 11/2015 | Poulos et al. |
| 2015/0331463 A1 | 11/2015 | Obie et al. |
| 2015/0346784 A1 | 12/2015 | Delano et al. |
| 2015/0347120 A1 | 12/2015 | Garg et al. |
| 2015/0347274 A1 | 12/2015 | Taylor et al. |
| 2015/0347734 A1 | 12/2015 | Beigi |
| 2015/0350333 A1 | 12/2015 | Cutler et al. |
| 2015/0356759 A1 | 12/2015 | Delling et al. |
| 2015/0363339 A1 | 12/2015 | Huang et al. |
| 2015/0363919 A1 | 12/2015 | Suri et al. |
| 2015/0371409 A1 | 12/2015 | Negrila et al. |
| 2015/0373475 A1 | 12/2015 | Raghuvanshi et al. |
| 2015/0373546 A1 | 12/2015 | Haugen et al. |
| 2015/0378515 A1 | 12/2015 | Powell |
| 2016/0203125 A1 | 7/2016 | Sarikaya et al. |
| 2016/0210035 A1 | 7/2016 | Rodrig et al. |
| 2016/0217092 A1 | 7/2016 | Huang et al. |
| 2016/0239987 A1 | 8/2016 | Negrila et al. |
| 2016/0379343 A1 | 12/2016 | Suri et al. |
| 2017/0364737 A1 | 12/2017 | Chan et al. |
| 2019/0354748 A1 | 11/2019 | Lee et al. |

FOREIGN PATENT DOCUMENTS

| | | |
|---|---|---|
| CN | 1649420 A | 8/2005 |
| CN | 1735927 A | 2/2006 |
| CN | 1868215 A | 11/2006 |
| CN | 101377925 A | 3/2009 |
| CN | 101406074 A | 4/2009 |
| CN | 101420627 A | 4/2009 |
| CN | 101753404 A | 6/2010 |
| CN | 101770778 A | 7/2010 |
| CN | 101930595 A | 12/2010 |
| CN | 102158554 A | 8/2011 |
| CN | 102368194 A | 3/2012 |

(56) References Cited

FOREIGN PATENT DOCUMENTS

| | | | |
|---|---|---|---|
| CN | 102714723 A | 10/2012 | |
| CN | 102722364 A | 10/2012 | |
| CN | 102884526 A | 1/2013 | |
| CN | 103052922 A | 4/2013 | |
| CN | 103098476 A | 5/2013 | |
| CN | 103365725 A | 10/2013 | |
| CN | 103365817 A | 10/2013 | |
| EP | 553101 A1 | 8/1993 | |
| EP | 704655 A1 | 4/1996 | |
| EP | 553101 B1 | 7/1997 | |
| EP | 816981 A2 | 1/1998 | |
| EP | 816981 A3 | 5/1998 | |
| EP | 704655 B1 | 3/1999 | |
| EP | 1055872 A1 | 11/2000 | |
| EP | 1174787 A2 | 1/2002 | |
| EP | 1331566 A2 | 7/2003 | |
| EP | 1628197 A2 | 2/2006 | |
| EP | 1965389 A2 | 9/2008 | |
| EP | 1970803 A2 | 9/2008 | |
| EP | 2096577 A2 | 9/2009 | |
| EP | 1970803 A3 | 10/2010 | |
| EP | 2267655 A2 | 12/2010 | |
| EP | 2312462 A1 | 4/2011 | |
| EP | 2482572 A1 | 8/2012 | |
| EP | 2575128 A2 | 4/2013 | |
| EP | 2590274 A2 | 5/2013 | |
| EP | 2650752 A2 | 10/2013 | |
| EP | 2701457 A1 | 2/2014 | |
| GB | 2431001 A | 4/2007 | |
| JP | 356140430 A | 11/1981 | |
| JP | 2002091477 A | 3/2002 | |
| KR | 1020040076079 A | 8/2004 | |
| KR | 1020130022513 A | 3/2013 | |
| WO | 9304468 A1 | 3/1993 | |
| WO | 125943 A1 | 4/2001 | |
| WO | 250590 A1 | 6/2002 | |
| WO | 2005013262 A1 | 2/2005 | |
| WO | 2005033934 A2 | 4/2005 | |
| WO | 2009015047 A1 | 1/2009 | |
| WO | 2009082814 A1 | 7/2009 | |
| WO | 2009089308 A2 | 7/2009 | |
| WO | 2009128021 A1 | 10/2009 | |
| WO | 2010141403 A1 | 12/2010 | |
| WO | 2011014138 A1 | 2/2011 | |
| WO | 2011150403 A1 | 12/2011 | |
| WO | 2012152817 A1 | 11/2012 | |
| WO | 2013008026 A2 | 1/2013 | |
| WO | 2013048510 A1 | 4/2013 | |
| WO | 2013154561 A1 | 10/2013 | |
| WO | 2013171481 A2 | 11/2013 | |
| WO | 2013184225 A1 | 12/2013 | |

OTHER PUBLICATIONS

"Non-Final Office Action Issued in U.S. Appl. No. 14/264,619", dated Nov. 2, 2016, 11 Pages.
"Non-Final Office Action Issued in U.S. Appl. No. 14/265,110", dated Jan. 4, 2016, 26 Pages.
"Final Office Action Issued in U.S. Appl. No. 14/266,795", dated Apr. 11, 2016, 12 Pages.
"Final Office Action Issued in U.S. Appl. No. 14/266,795", dated Dec. 21, 2017, 17 Pages.
"Non-Final Office Action Issued in U.S. Appl. No. 14/266,795", dated Oct. 7, 2015, 11 Pages.
"Non-Final Office Action Issued in U.S. Appl. No. 14/266,795", dated Jul. 19, 2016, 13 Pages.
"Final Office Action Issued in U.S. Appl. No. 14/268,953", dated Sep. 14, 2016, 16 Pages.
"Non-Final Office Action Issued in U.S. Appl. No. 14/268,953", dated Apr. 19, 2016, 15 Pages.
"Final Office Action Issued in U.S. Appl. No. 14/273,100", dated Mar. 3, 2016, 18 Pages.

Zwol, et al., "Prediction of Favourite Photos using Social, Visual, and Textual Signals", In Proceedings of the 18th ACM International Conference on Multimedia, Oct. 25, 2010, 4 Pages.
"Non-Final Office Action Issued in U.S. Appl. No. 14/273,100", dated Oct. 1, 2015, 21 Pages.
Zhu, et al., "A Rank-Order Distance based Clustering Algorithm for Face Tagging", In Proceedings of the IEEE Conference on Computer Vision and Pattern Recognition, Jun. 20, 2011, pp. 481-488.
"Final Office Action Issued in U.S. Appl. No. 14/275,724", dated Jan. 29, 2016, 6 Pages.
"Non-Final Office Action Issued in U.S. Appl. No. 14/275,724", dated Sep. 23, 2015, 9 Pages.
"Final Office Action Issued in U.S. Appl. No. 14/275,761", dated Dec. 18, 2015, 6 Pages.
"Non-Final Office Action Issued in U.S. Appl. No. 14/275,761", dated Sep. 24, 2015, 9 Pages.
"Final Office Action Issued in U.S. Appl. No. 14/275,785", dated Feb. 9, 2016, 11 Pages.
"Non-Final Office Action Issued in U.S. Appl. No. 14/275,785", dated Aug. 26, 2015, 10 Pages.
"Non-Final Office Action Issued in U.S. Appl. No. 14/275,785", dated Sep. 9, 2016, 14 Pages.
"Final Office Action Issued in U.S. Appl. No. 14/279,146", dated Apr. 13, 2016, 16 Pages.
Zhang, Daoqiang, "Two-Dimensional Bayesian Subspace Analysis for Face Recognition", In Proceedings of the 4th International Symposium on Neutral Networks, Jun. 3, 2007, 7 Pages.
"Non-Final Office Action Issued in U.S. Appl. No. 14/279,146", dated Dec. 8, 2015, 10 Pages.
"Non-Final Office Action Issued in U.S. Appl. No. 14/279,146", dated Aug. 3, 2016, 15 Pages.
"Final Office Action Issued in U.S. Appl. No. 14/281,518", dated Aug. 25, 2016, 29 Pages.
"Non-Final Office Action Issued in U.S. Appl. No. 14/281,518", dated Feb. 26, 2016, 24 Pages.
Zhai, et al., "A Study of Smoothing Methods for Language Models Applied to Ad Hoc Information Retrieval", In Proceedings of the 24th Annual International ACM SIGIR Conference on Research and Development in Information Retrieval, Sep. 1, 2001, 9 Pages.
"Non Final Office Action Issued in U.S. Appl. No. 14/294,410", dated Sep. 21, 2017, 8 Pages.
"Final Office Action Issued in U.S. Appl. No. 14/296,644", dated Dec. 4, 2017, 32 Pages.
"Non-Final Office Action Issued in U.S. Appl. No. 14/296,644", dated Aug. 04, 2016, 25 Pages.
"Non-Final Office Action Issued in U.S. Appl. No. 14/304,174", dated Jun. 29, 2015, 16 Pages.
"Final Office Action Issued in U.S. Appl. No. 14/304,911", dated Nov. 13, 2015, 7 Pages.
"Non-Final Office Action Issued in U.S. Appl. No. 14/304,911", dated Jul. 17, 2015, 7 Pages.
"Non-Final Office Action Issued in U.S. Appl. No. 14/311,208", dated Jan. 7, 2016, 7 Pages.
"Final Office Action Issued in U.S. Appl. No. 14/312,501", dated May 27, 2016, 14 Pages.
"Non-Final Office Action Issued in U.S. Appl. No. 14/312,501", dated Dec. 16, 2015, 15 Pages.
"Final Office Action Issued in U.S. Appl. No. 14/316,802", dated Sep. 6, 2016, 21 Pages.
"Non-Final Office Action Issued in U.S. Appl. No. 14/316,802", dated Jul. 8, 2016, 17 Pages.
"Non-Final Office Action Issued in U.S. Appl. No. 14/316,802", dated Dec. 2, 2016, 22 Pages.
"Non-Final Office Action Issued in U.S. Appl. No. 14/338,078", dated Jun. 16, 2016, 19 Pages.
"First Action Interview Office Action Issued in U.S. Appl. No. 14/444,987", dated Aug. 24, 2016, 7 Pages.
"Preinterview First Office Action Issued in U.S. Appl. No. 14/444,987", dated Mar. 3, 2016, 5 Pages.
"Final Office Action Issued in U.S. Appl. No. 14/456,679", dated Nov. 2, 2015, 27 Pages.
"Final Office Action Issued in U.S. Appl. No. 14/456,679", dated Aug. 31, 2016, 34 Pages.

(56) References Cited

OTHER PUBLICATIONS

Yu, et al., "Roles of Pre-Training and Fine-Tuning in Context-Dependent DBN-HMMs for Real-World Speech Recognition", In Proceedings of the NIPS Workshop on Deep Learning and Unsupervised Feature Learning, Dec. 1, 2010, 8 Pages.
Yu, et al., "KL-Divergence Regularized Deep Neural Network Adaptation for Improved Large Vocabulary Speech Recognition", In Proceedings of the IEEE International Conference on Acoustics Speech and Signal Processing, May 26, 2013, pp. 7893-7897.
Yu, et al., "Improved Bottleneck Features Using Pretrained Deep Neural Networks", In Proceedings of the 12th Annual Conference of the International Speech Communication Association, Aug. 28, 2011, 4 Pages.
"Non-Final Office Action Issued in U.S. Appl. No. 14/456,679", dated May 10, 2016, 32 Pages.
"Non-Final Office Action Issued in U.S. Appl. No. 14/456,679", dated Jun. 19, 2015, 23 Pages.
"Acoustics—Measurement of Room Acoustic Parameters—Part 1: Performance Spaces", In Proceedings of the International Organization for Standardization, ISO 3382-1:2009, May 6, 2014, 2 Pages.
"Centrally Managed Wireless Networks", Retrieved From: http://web.archive.org/web/20130905204305/http://burconix.com/?p=services-centrally-managed-wireless, Sep. 5, 2013, 2 Pages.
"Cisco Bring Your Own Device", Retrieved From: http://www.cisco.com/c/en/us/td/docs/solutions/Enterprise/Borderless_Networks/Unified_Access/byodwp.html, Mar. 7, 2014, 23 Pages.
"Cloud ERP—New dog, Same Flea", Retrieved From: https://gbeaubouef.wordpress.com/2011/05/22/cloud-erp/, May 22, 2011, 8 Pages.
"Connectify pro Full+Key 7 MB", Retrieved From: http://zonretum.blogspot.mx/2013/05/connectify-pro-fullkey-7-mb.html, May 14, 2013, 5 Pages.
"Connecting to Multiple 802.11 Networks from One WiFi Card Simultaneously", Retrieved From: http://marketplace.yet2.com/app/insight/techofweek/38576, Jun. 20, 2012, 2 Pages.
"Corporate Telecommunication Networks—Mobility for Enterprise Communications", In Proceedings of the ECMA International Technical Report, Ecma/TC32-TG17/2010/056 Ecma/EC32/2010/042, Final Draft, 2nd Edition, Oct. 1, 2010, 38 Pages.
"Debug Navigator Help: Using Debug Gauges", Retrieved From: http://web.archive.org/web/20160421103618/https://developer.apple.com/library/mac/recipes/xcode_help-debug_navigator/articles/using_debug_gauges.html, May 28, 2014, 3 Pages.
"Determining Costs and Impact of a Software Upgrade Across Different Business Units", Retrieved From: http://www.geneca.com/case-studies/determining-costs-impact-software-upgrade-business-units/, Feb. 12, 2013, 2 Pages.
"Find Code Changes and Other History with CodeLens", Retrieved From: https://msdn.microsoft.com/en-gb/enus/library/dn269218.aspx, Retrieved on: May 23, 2014, 10 Pages.
"Get history and other info about your code", Retrieved From: https://web.archive.org/web/20140608170534/http://msdn.microsoft.com/en-us/library/dn269218.aspx, Retrieved on: May 23, 2014,15 Pages.
"GPU-Accelerated Route Planning", Retrieved From: https://www.cs.unc.edu/Research/ProjectSummaries/routing05.pdf, Aug. 1, 2005, 2 Pages.
"How to Set Up a Wireless Hotspot—From Ethernet (Windows 7)", Retrieved From: http://www.instructables.com/id/How-to-Set-Up-a-Wireless-Hotspot-Windows-7/, Apr. 3, 2012, 8 Pages.
"Interactive 3D Audio Rendering Guidelines, Level 2.0", In Proceedings of the 3D Working Group of the Interactive Audio Special Interest Group, Sep. 20, 1999, 29 Pages.
"Interest Point Detection", Retrieved From: http://en.wikipedia.org/wiki/Interest_point_detection, Apr. 21, 2014, 3 Pages.
"Lifecycle Services for Microsoft Dynamics User Guide (LCS) [AX 2012]", Retrieved From: https://web.archive.org/web/20141031185423/http://technet.microsoft.com/en-us/library/dn268616.aspx, Aug. 8, 2013, 5 Pages.
"Microsoft Codelens Code Health Indicator Extension", Retrieved From: https://web.archive.org/web/20150319182733/https://visualstudiogallery.msdn.microsoft.com/f85a7ab9-b4c2-436c-a6e5-0f06e0bac16d, Mar. 10, 2014, 2 Pages.
"Ribbon Layout and Resizing", Retrieved From: https://msdn.microsoft.com/en-us/library/ff701790(v=vs.110).aspx, Retrieved Date: Mar. 12, 2014, 6 Pages.
Volker, Lars "Route Planning in Road Networks with Turn Costs", Retrieved from: http://algo2.iti.kit.edu/documents/routeplanning/volker_sa.pdf, Jul. 22, 2008, 30 Pages.
"The Ribbon Bar", Retrieved From: http://bioinf.scri.ac.uk/tablet/help/ribbon.shtml, Retrieved Date: Dec. 28, 2015, 5 Pages.
"UI Element Guidelines: Menus", Retrieved From: https://web.archive.org/web/20140603021407/https://developer.apple.com/library/mac/documentation/UserExperience/Conceptual/AppleHIGuidelines/Menus/Menus.html, Sep. 26, 2011, 22 Pages.
"Unified Communications Managed API 3.0 Core SDK Documentation", Retrieved From: http://web.archive.org/web/20120113042236/http://msdn.microsoft.com/en-us/library/gg421023.aspx, Dec. 1, 2011, 2 Pages.
"Xcode OpenGL ES Tools Overview", Retrieved From: https://developer.apple.com/library/ios/documentation/3DDrawing/Conceptual/OpenGLES_ProgrammingGuide/ToolsOverview/ToolsOverview.html, Retrieved on: Jun. 5, 2014, 12 Pages.
"Xcode Overview", Retrieved From: https://developer.apple.com/library/ios/documentation/ToolsLanguages/Conceptual/Xcode_Overview/DebugYourApp/DebugYourApp.html, Mar. 10, 2014,18 Pages.
"Final Office Action Issued in U.S. Appl. No. 12/573,157", dated Jul. 5, 2013, 18 Pages.
"Final Office Action Issued in U.S. Appl. No. 12/573,157", dated Feb. 17, 2015, 18 Pages.
"Non Final Office Action Issued in U.S. Appl. No. 12/573,157", dated Aug. 20, 2015, 18 Pages.
"Non Final Office Action Issued in U.S. Appl. No. 12/573,157", dated Apr. 23, 2014, 19 Pages.
"Non Final Office Action Issued in U.S. Appl. No. 12/573,157", dated Nov. 28, 2012, 12 Pages.
"Final Office Action Issued in U.S. Appl. No. 12/970,949", dated Jun. 10, 2015, 25 Pages.
"Non-Final Office Action Issued in U.S. Appl. No. 12/970,949", dated Jan. 2, 2015, 24 Pages.
"Final Office Action Issued in U.S. Appl. No. 13/327,794", dated Nov. 20, 2014,13 Pages.
"Final Office Action Issued in U.S. Appl. No. 13/530,015", dated Nov. 19, 2014, 49 Pages.
"Non-Final Office Action Issued in U.S. Appl. No. 13/530,015", dated Apr. 28, 2015, 33 Pages.
"Non-Final Office Action Issued in U.S. Appl. No. 13/903,944", dated Mar. 27, 2015, 26 Pages.
"Final Office Action Issued in U.S. Appl. No. 13/920,323", dated Sep. 24, 2015, 25 Pages.
"Non-Final Office Action Issued in U.S. Appl. No. 13/920,323", dated Apr. 5, 2016, 23 Pages.
"Non-Final Office Action Issued in U.S. Appl. No. 13/920,323", dated Feb. 27, 2015, 14 Pages.
"Final Office Action Issued in U.S. Appl. No. 13/923,917", dated Sep. 29, 2015, 6 Pages.
"Non-Final Office Action Issued in U.S. Appl. No. 13/923,917", dated Jun. 30, 2016, 9 Pages.
"Non-Final Office Action Issued in U.S. Appl. No. 13/923,917", dated May 28, 2015, 10 Pages.
"Non-Final Office Action Issued in U.S. Appl. No. 13/923,969", dated May 6, 2015, 8 Pages.
"Non-Final Office Action Issued in U.S. Appl. No. 14/201,704", dated Jul. 1, 2015, 7 Pages.
"Non-Final Office Action Issued in U.S. Appl. No. 14/227,492", dated Aug. 13, 2015, 37 Pages.
"Non-Final Office Action Issued in U.S. Appl. No. 14/257,502", dated Feb. 1, 2016, 20 Pages.

(56) References Cited

OTHER PUBLICATIONS

Yeh, et al., "Wave-Ray Coupling for Interactive Sound Propagation in Large Complex Scenes", In Proceedings of the ACM SIGGRAPH Transactions on Graphics (TOG)—vol. 32, Issue 6, Nov. 1, 2013, 11 Pages.
"Non-Final Office Action Issued in U.S. Appl. No. 14/264,012", dated Mar. 10, 2016, 8 Pages.
"Non-Final Office Action Issued in U.S. Appl. No. 14/264,012", dated Jul. 31, 2015, 8 Pages.
"Non-Final Office Action Issued in U.S. Appl. No. 14/264,012", dated Aug. 10, 2016, 9 Pages.
"Final Office Action Issued in U.S. Appl. No. 14/264,619", dated Aug. 12, 2016, 12 Pages.
"International Search Report and Written Opinion Issued in PCT Application No. PCT/US2015/030096", dated Aug. 19, 2015, 11 Pages.
"Second Written Opinion Issued in PCT Application No. PCT/US2015/030096", dated Apr. 5, 2016, 6 Pages.
"International Preliminary Report on Patentability Issued in PCT Application No. PCT/US2015/030104", dated Apr. 15, 2016, 8 Pages.
"International Search Report & Written Opinion Issued in PCT Application No. PCT/US2015/030104", dated Aug. 7, 2015, 11 Pages.
"Second Written Opinion Issued in PCT Application No. PCT/US2015/030104", dated Dec. 4, 2015, 7 Pages.
"International Preliminary Report on Patentability Issued in PCT Patent Application No. PCT/US2015/030113", dated Jul. 14, 2016, 11 Pages.
"International Search Report & Written Opinion Issued in PCT Application No. PCT/US2015/030113", dated Aug. 7, 2015, 10 Pages.
"Second Written Opinion Issued in PCT Application No. PCT/US2015/030113", dated Mar. 21, 2016, 8 Pages.
"International Preliminary Report on Patentability Issued in PCT Application No. PCT/US2015/030153", dated Apr. 15, 2016, 8 Pages.
"International Search Report and Written Opinion Issued in PCT Application No. PCT/US2015/030153", dated Aug. 7, 2015, 12 Pages.
"Second Written Opinion Issued in PCT Application No. PCT/US2015/030153", dated Dec. 4, 2015, 6 Pages.
"International Preliminary Report on Patentability Issued in PCT Application No. PCT/US2015/031270", dated Aug. 17, 2016, 10 Pages.
"International Search Report & Written Opinion Issued in PCT Application No. PCT/US2015/031270", dated Sep. 4, 2015, 16 Pages.
"Second Written Opinion Issued in PCT Application No. PCT/US2015/031270", dated May 3, 2016, 9 Pages.
"International Preliminary Report on Patentability Issued in PCT Application No. PCT/US2015/032089", dated Jun. 29, 2016, 9 Pages.
"International Search Report & Written Opinion Issued in PCT Application No. PCT/US2015/032089", dated Jul. 31, 2015, 11 Pages.
"Second Written Opinion Issued in PCT Application No. PCT/US2015/032089", dated Apr. 12, 2016, 8 Pages.
"International Search Report & Written Opinion Issued in PCT Application No. PCT/US2015/033545", dated Aug. 20, 2015, 11 Pages.
"International Preliminary Report on Patentability Issued in PCT Application No. PCT/US2015/033872", dated Jul. 1, 2016, 6 Pages.
"International Search Report & Written Opinion Issued in PCT Application No. PCT/US2015/033872", dated Sep. 2, 2015, 12 Pages.
"Second Written Opinion Issued in PCT Application No. PCT/US2015/033872", dated Apr. 21, 2016, 6 Pages.
"International Preliminary Report on Patentability Issued in PCT Application No. PCT/US2015/035218", dated Nov. 16, 2016, 7 Pages.
"International Search Report and Written Opinion Issued in PCT Patent Application No. PCT/US2015/035218", dated May 19, 2016, 19 Pages.
"Second Written Opinion Issued in PCT Application No. PCT/US2015/035218", dated Jul. 27, 2016, 7 Pages.
"International Preliminary Report on Patentability Issued in PCT Application No. PCT/US2015/035219", dated Jun. 23, 2016, 9 Pages.
"Second Written Opinion Issued in PCT Application No. PCT/US2015/035219", dated Apr. 26, 2016, 8 Pages.
"International Search Report and Written Opinion Issued in PCT Application No. PCT/US2015/036587", dated Oct. 8, 2015, 11 Pages.
"Second Written Opinion Issued in PCT Application No. PCT/US2015/036587", dated May 18, 2016, 7 Pages.
"International Preliminary Report on Patentability Issued in PCT Application No. PCT/US2015/036595", dated Oct. 7, 2016, 8 Pages.
"International Search Report & Written Opinion Issued in PCT Application No. PCT/US2015/036595", dated Sep. 24, 2015, 10 Pages.
"Second Written Opinion Issued in PCT Application No. PCT/US2015/036595", dated May 31, 2016, 6 Pages.
"International Search Report and Written Opinion Issued in PCT Application No. PCT/US2015/036767", dated Sep. 14, 2015, 18 Pages.
"International Preliminary Report on Patentability Issued in PCT Application No. PCT/US2015/036859", dated Oct. 7, 2016, 8 Pages.
"International Search Report & Written Opinion Issued in PCT Application No. PCT/US2015/036859", dated Dec. 22, 2015, 17 Pages.
"Second Written Opinion Issued in PCT Application No. PCT/US2015/036859", dated May 6, 2016, 7 Pages.
Peng, et al., "Joint and Implicit Registration for Face Recognition", In Proceedings of the IEEE Computer Society Conference on Computer Vision and Pattern Recognition, Jun. 20, 2009, 8 Pages.
Perumalla, et al., "GPU-based Real-Time Execution of Vehicular Mobility Models in Large-Scale Road Network Scenarios", In Proceedings of the ACM/IEEE/SCS 23rd Workshop on Principles of Advanced and Distributed Simulation, Jun. 22, 2009, 9 Pages.
Peter, et al., "Frequency-Domain Edge Diffraction for Finite and Infinite Edges", In Proceedings of the Acta Acustica United with Acustica, vol. 95, Issue 3, May 1, 2009, pp. 568-572.
Petkova, et al., "Proximity-Based Document Representation for Named Entity Retrieval", In Proceedings of the Sixteenth ACM Conference on Information and Knowledge Management, Nov. 6, 2007, 10 Pages.
Phillips, et al., "The FERET Evaluation Methodology for Face-Recognition Algorithms", In Proceedings of the IEEE Transactions on Pattern Analysis and Machine Intelligence, vol. 22, Issue 10, Oct. 1, 2000, pp. 1090-1104.
Pierce, et al., "Acoustics: An Introduction to Its Physical Principles and Applications", In Book of Acoustics: An Introduction to Its Physical Principles and Applications, Jun. 1, 1989, 4 Pages.
Ponte, et al., "A Language Modelling Approach to Information Retrieval", In Proceedings of the 21st Annual International ACM SIGIR Conference on Research and Development in Information Retrieval, Aug. 1, 1998, 7 Pages.
Raghuvanshi, et al., "Efficient and Accurate Sound Propagation Using Adaptive Rectangular Decomposition", In Proceedings of the IEEE Transactions on Visualization and Computer Graphics, vol. 15, Issue 5, Sep. 1, 2009, 10 Pages.
Raghuvanshi, Nikunj, "Interactive Physically-Based Sound Simulation", In a Dissertation Submitted to the Faculty of The University of North Carolina at Chapel Hill in Partial Fulfillment of the Requirements for the Degree of Doctor of Philosophy in the Department of Computer Science, Aug. 1, 2010, 187 Pages.

(56) References Cited

OTHER PUBLICATIONS

Raghuvanshi, et al., "Parametric wave field coding for precomputed sound propagation", In Proceedings of the ACM Transactions on Graphics, vol. 33, Issue 4, Jul. 27, 2014, 11 Pages.

Raghuvanshi, et al., "Precomputed Wave Simulation for Real-Time Sound Propagation of Dynamic Sources in Complex Scenes", In Proceedings of the ACM Transactions on Graphics, vol. 29, Issue 4, Jul. 26, 2010, 11 Pages.

Ramanan, et al., "Local Distance Functions: A Taxonomy, New Algorithms, and an Evaluation", In Proceedings of the IEEE Transactions on Pattern Analysis and Machine Intelligence, vol. 33, Issue 4, Apr. 1, 2011, 8 Pages.

Ramon, San, "Unified Communications Interoperability Forum and Open Networking Foundation Announce Collaborative Relationship Between Unified Communications and Software-Defined Networks", Retrieved From: http://www.businesswire.com/news/home/20131120005275/en/Unified-Communications-Interoperability-Forum-Open-Networking-Foundation, Nov. 20, 2013, 2 Pages.

Rindel, et al., "The Use of Colors, Animations and Auralizations in Room Acoustics", In Proceedings of the Inter Noise Conference, Sep. 15, 2013, pp. 4396-4404.

Roberts, et al., "Evaluating Passage Retrieval Approaches for Question Answering", In Proceedings of the 26th European Conference on Information Retrieval, Apr. 14, 2003, 8 Pages.

Yu, et al., "Exploiting Sparseness in Deep Neural Networks for Large Vocabulary Speech Recognition", In Proceedings of the IEEE International Conference on Acoustics, Speech and Signal Processing, Mar. 25, 2012, pp. 4409-4412.

"Non Final office Action Issued in U.S. Appl. No. 14/529,636", dated Jul. 19, 2016, 13 Pages.

"Non Final Office Action Issued in U.S. Appl. No. 15/497,423", dated Jun. 25, 2018, 8 Pages.

"Office Action Issued in European Patent Application No. 15721468.5", dated Dec. 8, 2016, 2 Pages.

"Office Action Issued in European Patent Application No. 15738178.1", dated Apr. 25, 2017, 5 Pages.

"Search Report Issued in European Patent Application No. 15794355.6", dated Jul. 19, 2018, 3 Pages.

"First Office Action and Search Report Issued in Chinese Patent Application No. 201580028549.4", dated Aug. 30, 2018, 17 Pages.

"Office Action Issued in Chinese Patent Application No. 201580030301.1", dated Aug. 27, 2018, 16 Pages.

"Office Action Issued in Chinese Patent Application No. 201580031657.7", dated Aug. 31, 2018, 17 Pages.

"Office Action Issued in Chinese Patent Application No. 201580032034.1", dated Aug. 27, 2018, 14 Pages.

"First Office Action and Search Report Issued in Chinese Patent Application No. 201580033425.5", dated Dec. 7, 2017, 9 Pages.

"Office Action Issued in Chinese Patent Application No. 201580034192.0", dated Aug. 27, 2018, 9 Pages.

"Application as filed in U.S. Appl. No. 61/877,856", filed Sep. 13, 2013, 70 Pages.

"Application as filed in U.S. Appl. No. 61/902,093", filed Nov. 8, 2013, 76 Pages.

"Application As Filed in U.S. Appl. No. 62/062,732", dated Oct. 10, 2014, 46 Pages.

Abad, et al., "Context Dependent Modelling Approaches for Hybrid Speech Recognizers", In Proceedings of the 11th Annual Conference of the International Speech Communication Association, Sep. 26, 2010, pp. 2950-2953.

Abdel-Hamid, et al., "Fast Speaker Adaptation of Hybrid NN/HMM Model for Speech Recognition Based on Discriminative Learning of Speaker Code", In Proceedings of the IEEE International Conference on Acoustics, Speech and Signal Processing, May 26, 2013, 5 Pages.

Abid, et al., "A New Neural Network Pruning Method Based on the Singular Value Decomposition and the Weight Initialisation", In Proceedings of the 11th IEEE on European Signal Processing Conference, Sep. 3, 2002, 4 Pages.

Abraham, et al., "Hierarchical Hub Labelings for Shortest Paths", In Proceedings of the 20th Annual European Conference on Algorithms, Technical Report MSR-TRMSR-TR-2012-46, Apr. 1, 2012, 15 Pages.

Adams, Paul, "The Next Generation of USB Connector Will Plug in Either Way", Retrieved From: http://www.popsci.com/article/gadgets/next-generation-usb-connector-will-plug-either-way, Dec. 5, 2013, 3 Pages.

Ajdler, et al., "The Plenacoustic Function and Its Sampling", In Proceedings of the IEEE Transactions on Signal Processing, vol. 54, Issue 10, Oct. 1, 2006, pp. 3790-3804.

Ajwani, et al., "Breadth First Search on Massive Graphs", In Proceedings of the 9th DIMACS Implementation Challenge: The Shortest Path Problem, Nov. 13, 2006, 15 Pages.

Al-Hazmi, et al., "Virtualization of 802.11 Interfaces for Wireless Mesh Networks", In Proceeding of the Eighth International Conference on Wireless On-Demand Network Systems and Services, Computer Networks and Computer Communications Lab, Jan. 26, 2011, 8 Pages.

Al-Kanj, et al., "Optimized Energy Efficient Content Distribution over Wireless Networks with Mobile-to-Mobile Cooperation", In Proceedings of the IEEE 17th International Conference on Telecommunications, Department of Electrical and Computer Engineering, Apr. 4, 2010, 5 Pages.

Alt, et al., "Increasing the User's Attention on the Web: Using Implicit Interaction Based on Gaze Behavior to Tailor Content", In Proceedings of the 7th Nordic Conference on Human-Computer Interaction- Making Sense through Design, Oct. 14, 2012, 10 Pages.

Ananthanarayanan, et al., "Collaborative Downloading for Multihomed Wireless Devices", In Proceedings of the Eighth IEEE Workshop on Mobile Computing Systems and Applications, Mar. 8, 2007, 6 Pages.

Ananthanarayanan, et al., "COMBINE: Leveraging the Power of Wireless Peers through Collaborative Downloading", In Proceedings of the ACM 5th International Conference on Mobile Systems, Applications and Services, Jun. 11, 2007, 13 Pages.

Aniyan, Mathew, "New CodeLens Indicator—Incoming Changes", Retrieved From: https://blogs.msdn.microsoft.com/visualstudioalm/2014/03/03/new-codelens-indicatorincoming-changes/, Mar. 3, 2014, 7 Pages.

Astheimer, Peter, "What You See Is What You Hear—Acoustics Applied in Virtual Worlds", In Proceedings of the IEEE Symposium on Research Frontiers in Virtual Reality, Oct. 25, 1993, pp. 100-107.

Azizyan, et al., "SurroundSense: Mobile Phone Localization via Ambience Fingerprinting", In Proceedings of the 15th Annual International Conference on Mobile Computing and Networking, Sep. 20, 2009, 12 Pages.

Barman, et al., "Nonnegative Matrix Factorization (NMF) Based Supervised Feature Selection and Adaptation", In Proceedings of the 9th International Conference on Intelligent Data Engineering and Automated Learning, Nov. 2, 2008, 2 Pages.

Barrett, et al., "Implementations of Routing Algorithms for Transportation Networks", In Proceedings of the 9th DIMACS Implementation Challenge: The Shortest Path Problem, Nov. 8, 2006, 19 Pages.

Bast, et al., "Fast Routing in Road Networks with Transit Nodes", In Proceedings of the Science, vol. 316, No. 5824, Apr. 27, 2007, 1 Page.

Bast, et al., "Route Planning in Transportation Networks", In Technical Report MSR-TR-2014-4, Jan. 8, 2014, 57 Pages.

Belhumeur, et al., "Eigenfaces vs. Fisherfaces: Recognition Using Class Specific Linear Projection", In Proceedings of the IEEE Transactions on Pattern Analysis and Machine Intelligence, vol. 19, Issue 7, Jul. 1, 1997, pp. 711-720.

Beymer, et al., "WebGazeAnalyzer: A System for Capturing and Analyzing Web Reading Behavior Using Eye Gaze", In Proceedings of the Extended Abstracts on Human Factors in Computing Systems, Apr. 2, 2005, 10 Pages.

Bleiweiss, Avi, "GPU Accelerated Pathfinding", In Proceedings of the 23rd ACM Siggraph/Eurographics Symposium on Graphics Hardware, Jun. 20, 2008, pp. 65-74.

Bohus, et al., "Olympus: An Open-Source Framework for Conversational Spoken Language Interface Research", In Proceedings of

(56) References Cited

OTHER PUBLICATIONS the Workshop on Bridging the Gap: Academic and Industrial Research in Dialog Technologies, Apr. 1 2007, 8 Pages.
Bonzi et al., "The Use of Anaphoric Resolution for Document Description in Information Retrieval", In Proceedings of the Information Processing & Management, vol. 25, Issue 4, Jun. 1, 1989, pp. 53-66.
Bradley, et al., "Accuracy and Reproducibility of Auditorium Acoustics Measures", in Proceedings of the British Institute of Acoustics, vol. 10, Part 2, Retrieved On: May 6, 2014, pp. 339-406.
Broder, Andrei, "A Taxonomy of Web Search", In Proceedings of the ACM SIGIR Forum, vol. 36, Issue 2, Sep. 1, 2002, pp. 3-10.
Burges, Christopher JC., "From Ranknet to Lambdarank to Lambdamart: An Overview", In Proceedings of the Microsoft Research Technical Report MSR-TR-2010-82, Jun. 23, 2010, 19 Pages.
Burges, et al., "Learning to Rank With Nonsmooth Cost Functions", In Proceedings of the 19th International Conference on Neural Information Processing Systems, Dec. 4, 2006, 8 Pages.
Buscher, et al., "Generating and Using Gaze-Based Document Annotations", In Proceedings of the Extended Abstracts on Human Factors in Computing Systems, Apr. 5, 2008, 6 Pages.
Calamia, Paul Thomas., "Advances in Edge-Diffraction Modeling for Virtual-Acoustic Simulations", In Doctoral Dissertation of Princeton University, in Candidacy for the Degree of Doctor of Philosophy, Jun. 1, 2009, 159 Pages.
Callan, James P., "Passage-Level Evidence in Document Retrieval", In Proceedings of the 17th Annual International ACM SIGIR Conference on Research and Development in Information Retrieval, Jul. 3, 1994, pp. 302-310.
Cao, et al., "Face Recognition with Learning-based Descriptor", In Proceedings of the IEEE Conference on Computer Vision and Pattern Recognition, Jun. 13, 2010, 8 Pages.
Castro, et al., "A Probabilistic Room Location Service for Wireless Networked Environments", In Proceedings of the 3rd International Conference on Ubiquitous Computing, Sep. 30, 2001, 19 Pages.
Nguyen, et al., "Cosine Similarity Metric Learning for Face Verification", In Proceedings of the 10th Asian Conference on Computer Vision, vol. Part II, Nov. 8, 2010, 12 Pages.
Novak, et al., "Use of Non-Negative Matrix Factorization for Language Model Adaptation in a Lecture Transcription Task", In Proceedings of the IEEE International Conference on Acoustics, Speech and Signal Processing, vol. 1, May 7, 2001, 4 Pages.
O'Connor, Enda, et al., "Patch Management Best Practices", Retrieved From: http://www.oracle.com/technetwork/systems/articles/patch-management-jsp-135385.html, Apr. 1, 2008, 8 Pages.
Ojala, et al., "A Generalized Local Binary Pattern Operator for Multiresolution Gray Scale and Rotation Invariant Texture Classification", In Proceedings of the 2nd International Conference on Advances in Pattern Recognition, Mar. 11, 2001, 10 Pages.
Ortega-Arranz, et al., "A New GPU-based Approach to the Shortest Path Problem", In Proceedings of the International Conference on High Performance Computing and Simulation, Jul. 1, 2013, 7 Pages.
Papadopoulos, et al., "Image Clustering Through Community Detection on Hybrid Image Similarity Graphs", In Proceedings of the 17th IEEE International Conference on Image Processing, Sep. 26, 2014, 4 Pages.
Park, et al., "Monitoring Impact Events Using a System-Identification Method", In AAA Journal, vol. 47, Issue 9, Sep. 1, 2009, pp. 2011-2021.
Pascoal, Marta M. B., "Implementations and Empirical Comparison of K Shortest Loopless Path Algorithms", In Proceedings of the 9th DIMACS Implementation Challenge: The Shortest Path Problem, Nov. 13, 2006, 16 Pages.
"Written Opinion Issued in PCT Application No. PCT/US2015/027688", dated Feb. 9, 2016, 6 Pages.
"International Preliminary Report on Patentability Issued in PCT Application No. PCT/US2014/041014", dated Sep. 15, 2015, 6 Pages.
"International Search Report & Written Opinion Issued in PCT Application No. PCT/US2015/017872", dated Jun. 25, 2015, 11 Pages.
"International Search Report & Written Opinion Issued in PCT Application No. PCT/US2014/041014", dated Oct. 2, 2014, 9 Pages.
"International Preliminary Report on Patentability Issued in PCT Application No. PCT/US2015/017872", dated Dec. 14, 2015, 7 Pages.
"International Preliminary Report on Patentability for PCT Patent Application No. PCT/US2014/041023", dated Nov. 13, 2015, 18 Pages.
"International Search Report & Written Opinion Issued in PCT Application No. PCT/US2014/041023", dated Jun. 3, 2015, 16 Pages.
Xue, et al., "Singular Value Decomposition Based Low-Footprint Speaker Adaptation and Personalization for Deep Neural Network", In Proceedings of the IEEE International Conference on Acoustics, Speech and Signal Processing, May 4, 2014, pp. 6359-6363.
Xue, et al., "Restructuring of Deep Neural Network Acoustic Models with Singular Value Decomposition", In Proceedings of the 14th Annual Conference of the International Speech Communication Association, Aug. 25, 2013, pp. 2365-2369.
Yan, et al., "A Scalable Approach to Using DNN-Derived Features in GMM-HMM Based Acoustic Modeling for LVCSR", In Proceedings of the 14th Annual Conference of the International Speech Communication Association, Aug. 25, 2013, 5 Pages.
Yang, et al., "Qualifier in TREC-12 QA Main Task", In Proceedings of the 12th Text Retrieval Conference, Nov. 1, 2003, 9 Pages.
Yao, et al., "Adaptation of Context-Dependent Deep Neural Networks for Automatic Speech Recognition", In Proceedings of the IEEE Spoken Language Technology Workshop, Dec. 2, 2012, pp. 366-369.
"International Search Report and Written Opinion Issued in PCT Application No. PCT/US2015/021921", dated Jul. 17, 2015, 11 Pages.
"Second Written Opinion Issued in PCT Application No. PCT/US2015/021921", dated Feb. 11, 2016, 7 Pages.
"International Search Report & Written Opinion Issued in PCT Application No. PCT/US2015/022886", dated Aug. 31, 2015, 17 Pages.
"Second Written Opinion Issued in PCT Application No. PCT/US2015/022886", dated Jun. 16, 2016, 9 Pages.
"International Preliminary Report on Patentability Issued in PCT Application No. PCT/US2015/022887", dated Apr. 7, 2016, 8 Pages.
"International Search Report and Written Opinion Issued in PCT Application No. PCT/US2015/022887", dated Jun. 26, 2015, 12 Pages.
"Second Written Opinion Issued in PCT Application No. PCT/US2015/022887", dated Jan. 7, 2016, 5 Pages.
"International Search Report and Written Opinion Issued in PCT Patent Application No. PCT/US2015/024594", dated Jul. 24, 2015, 9 Pages.
"International Preliminary Report on Patentability Issued in PCT Application No. PCT/US2015/026971", dated Aug. 10, 2016, 8 Pages.
"International Search Report and Written Opinion Issued in PCT Patent Application No. PCT/US2015/026971", dated Jul. 24, 2015, 14 Pages.
"Second Written Opinion Issued in PCT Application No. PCT/US2015/026971", dated Mar. 30, 2016, 7 Pages.
"International Preliminary Report on Patentability Issued in Patent Application No. PCT/US2015/027409", dated Jun. 16, 2016, 9 Pages.
"International Search Report & Written Opinion Issued in PCT Application No. PCT/US2015/027409", dated Jul. 22, 2015, 13 Pages.
"Second Written Opinion Issued in PCT Application No. PCT/US2015/027409", dated Mar. 18, 2016, 8 Pages.
"International Preliminary Report on Patentability Issued in PCT Application No. PCT/US2015/027688", dated Apr. 26, 2016, 7 Pages.

(56) References Cited

OTHER PUBLICATIONS

"International Search Report and Written Opinion Issued in PCT Application No. PCT/US2015/027688", dated Jul. 9, 2015, 9 Pages.
"Second Written Opinion Issued in PCT Application No. PCT/US2015/027688", dated Feb. 9, 2016, 6 Pages.
"International Preliminary Report on Patentability Issued in PCT Application No. PCT/US2015/027689", dated Jul. 18, 2016, 9 Pages.
"International Search Report and Written Opinion Issued in PCT Patent Application No. PCT/US2015/027689", dated Jul. 8, 2015, 13 Pages.
"Second Written Opinion Issued in PCT Application No. PCT/US2015/027689", dated Apr. 1, 2016, 8 Pages.
"International Preliminary Report on Patentability Issued in PCT Application No. PCT/US2015/028383", dated Jul. 18, 2016, 10 Pages.
"International Search Report & Written Opinion Issued in PCT Application No. PCT/US2015/028383", dated Jul. 24, 2015, 13 Pages.
"Second Written Opinion Issued in PCT Application No. PCT/US2015/028383", dated Apr. 18, 2016, 9 Pages.
"International Preliminary Report on Patentability Issued in PCT Application No. PCT/US2015/029334", dated Jul. 18, 2016, 8 Pages.
"International Search Report & Written Opinion for PCT Application No. PCT/US2015/029334", dated Jul. 7, 2015, 11 Pages.
"Second Written Opinion Issued in PCT Application No. PCT/US2015/029334", dated Mar. 31, 2016, 5 Pages.
"International Preliminary Report on Patentability Issued in PCT Application No. PCT/US2015/029805", dated Jul. 27, 2016, 11 Pages.
"International Search Report and Written Opinion Issued in PCT Application No. PCT/US2015/029805", dated Oct. 15, 2015, 19 Pages.
"Second Written Opinion Issued in PCT Application No. PCT/US2015/029805", dated May 6, 2016, 9 Pages.
"International Preliminary Report on Patentability Issued in Application No. PCT/US2015/030096", dated Jul. 14, 2016, 8 Pages.
Gade, Anders, "Acoustics in Halls for Speech and Music", In Proceedings of the Springer Handbook of Acoustics, Jan. 1, 2007, 8 Pages.
Gajos, et al., "Automatically Generating Personalized User Interfaces With Supple", In Proceedings of the Artificial Intelligence, vol. 174, Issue 12-13, Aug. 1, 2010, 49 Pages.
Gajos, et al., "Exploring the Design Space for Adaptive Graphical User Interfaces", In Proceedings of the ACM Working Conference on Advanced Visual Interfaces, May 23, 2006, 8 Pages.
Geisberger, et al., "Efficient Routing in Road Networks with Turn Costs", In Proceedings of the 10th International Conference on Experimental Algorithms, May 5, 2011, 12 Pages.
Geisberger, et al., "Exact Routing in Large Road Networks using Contraction Hierarchies", In Proceedings of the Transportation Science, vol. 46, Issue 3, Apr. 5, 2012, 17 Pages.
Gemello, et al., "Adaptation of Hybrid ANN/HMM Models Using Linear Hidden Transformations and Conservative Training", In Proceedings of the IEEE International Conference on Acoustics, Speech and Signal Processing, vol. 1, May 14, 2006, pp. 1189-1192.
Goldberg, et al., "Better Landmarks within Reach", In Proceedings of the 6th International Conference on Experimental Algorithms, Jun. 6, 2007, 14 Pages.
Goldstein, et al., "Summarizing Text Documents: Sentence Selection and Evaluation Metrics", In Proceedings of the 22nd Annual International ACM SIGIR Conference on Research and Development in Information Retrieval, Aug. 15, 1999, pp. 121-128.
Gooch, et al., "Color2Gray: Salience-Preserving Color Removal", In Journal of ACM Transactions on Graphics, vol. 24, Issue 3, Jul. 31, 2005, 6 Pages.
Grasset, et al., "Image-Driven View Management for Augmented Reality Browsers", In Proceedings of the IEEE International Symposium on Mixed and Augmented Reality, Nov. 5, 2012, 10 Pages.

Gruenstein, et al., "Context-Sensitive Language Modeling for Large Sets of Proper Nouns in Multimodal Dialogue Systems", In Proceedings of the IEEE/ACL Workshop on Spoken Language Technology, Dec. 10, 2006, pp. 130-133.
Guillaumin, et al., "Is that you? Metric Learning Approaches for Face Identification", In Proceedings of the 12th IEEE International Conference on Computer Vision, Sep. 29, 2009, 8 Pages.
Gumerov, et al., "Fast Multipole Methods on Graphics Processors", In Journal of Computational Physics, vol. 227, Issue 18, Sep. 10, 2008, 4 Pages.
Harper, et al., "A Language Modelling Approach to Relevance Profiling for Document Browsing", In Proceedings of the 2nd ACM/IEEE-CS Joint Conference on Digital Libraries, Jul. 14, 2002, 8 Pages.
Harper, et al., "Within-Document Retrieval: A User-Centered Evaluation of Relevance Profiling", In Journal of Information Retrieval, vol. 7, Issue 3-4, Sep. 1, 2004, 26 Pages.
Harris, Frederic J., "On the Use of Windows for Harmonic Analysis with the Discrete Fourier Transform", In Proceedings of the IEEE, vol. 66, Issue 1, Jan. 1, 1978, pp. 51-84.
Hawamdeh, et al., "Paragraph-Based Nearest Neighbor Searching in Full-Text Documents", In Proceedings of the Electronic Publishing, vol. 2, No. 4, Dec. 1, 1989, pp. 179-192.
He, et al., "What is Discriminative Learning?", In Proceedings of the Discriminative Learning for Speech Recognition Theory and Practice, Achorn International, Jun. 25, 2008, 25 Pages.
Hearst, Marti A., "Tilebars: Visualization of Term Distribution Information in Full Text Information Access", In Proceedings of the SIGCHI Conference on Human Factors in Computing System, May 7, 1995, pp. 59-66.
Heck, et al., "Robustness to Telephone Handset Distortion in Speaker Recognition by Discriminative Feature Design", In Journal of Speech Communication—Speaker Recognition and its Commercial and Forensic Applications, vol. 31, Issue 2-3, Jun. 1, 2000, pp. 181-192.
Hefeeda, Mohamed M., "A Framework for Cost-Effective Peer-to-Peer Content Distribution", In Proceedings of the Eleventh ACM International Conference on Multimedia, Department of Computer Sciences, Nov. 2, 2003, 2 Pages.
Hinton, et al., "Deep Neural Networks for Acoustic Modeling in Speech Recognition", In Proceedings of the IEEE Signal Processing Magazine, vol. 29, Issue 6, Apr. 27, 2012, 27 Pages.
Xu, et al., "User-Oriented Document Summarization through Vision-Based Eye-Tracking", In Proceedings of the 14th International Conference on Intelligent User Interfaces, Feb. 8, 2009, 10 Pages.
Hodgson, et al., "Experimental Evaluation of Radiosity for Room Sound-Field Prediction", In the Journal of the Acoustical Society of America, vol. 120, Issue 2, Aug. 1, 2006, pp. 808-819.
Hoffmeister, et al., "Log-Linear Model Combination with Word-Dependent Scaling Factors", In Proceedings of the Human Language Technology and Pattern Recognition Computer Science Department, Sep. 6-10, 2009, 4 Pages.
Holzer, et al., "Engineering Multilevel Overlay Graphs for Shortest-Path Queries", In Journal of Experimental Algorithmics (JEA), vol. 13, Article No. 5, Sep. 1, 2008, 24 Pages.
Hsu, et al., "HBCI: Human-Building-Computer Interaction", In Proceedings of the 2nd ACM Workshop on Embedded Sensing Systems for Energy-Efficiency in Building, Nov. 2, 2010, 6 Pages.
Huang, et al., "Labeled Faces in the Wild: A Database for Studying Face Recognition in unconstrained Environments", In Proceedings of the 10th European Conference on Computer Vision, Oct. 12, 2008, 11 Pages.
Huang, et al., "Unified stochastic engine (USE) for speech recognition", In Proceedings of the IEEE International Conference on Acoustics, Speech and Signal Processing, vol. 2, Apr. 27, 1993, pp. 636-639.
Hughes, Neil, "Apple's Lightning Port Dynamically Assigns Pins to Allow for Reversible Use", Retrieved From: http://appleinsider.com/articles/12/09/25/apples-lightning-port-dynamically-assigns-pins-to-allow-for-reversible-use, Sep. 25, 2012, 9 Pages.
Ioffe, Sergey, "Probabilistic Linear Discriminant Analysis", In Proceedings of the 9th European Conference on Computer Vision, Part IV, May 7, 2001, pp. 531-542.

(56) References Cited

OTHER PUBLICATIONS

Jacob, Josh, "QR Directory App—Overview", In Blog of Josh Jacob Dev, Apr. 21, 2011, 3 Pages.

Jaiswal, et al., "Bulk Content Delivery Using Co-Operating End-Nodes with Upload/Download Limits", In Proceedings of the IEEE Fifth International Conference on Communication Systems and Networks, Sep. 10, 2012, 11 Pages.

Jaitly, et al., "Application of Pretrained Deep Neural Networks to Large Vocabulary Conversational Speech Recognition", In Proceedings of the 13th Annual Conference of the International Speech Communication Association, Mar. 12, 2012, 11 Pages.

Jluedemann, "Networking & Wireless Forum: How to Set up Dual Network Adapters", Retrieved From: http://www.cnet.com/forums/discussions/how-to-set-up-dual-network-adapters-531538/, Jun. 27, 2011, 3 Pages.

Jones, Karen Sparck., "Automatic Summarising: The State of the Art", In Journal of Information Processing and Management: an International Journal, vol. 43, Issue 6, Oct. 1, 2007, 52 Pages.

Karpinski, et al., "Multi-GPU Parallel Memetic Algorithm for Capacitated Vehicle Routing Problem", In Lecture Notes in Computer Science, Jan. 21, 2014, 12 Pages.

Kaszkiel, et al., "Effective Ranking with Arbitrary Passages", In Journal of the American Society for Information Science and Technology, vol. 52, Issue 4, Jan. 22, 2001, pp. 344-364.

Kaszkiel, et al., "Efficient Passage Ranking for Document Databases", In Journal of ACM Transactions on Information Systems, vol. 17, Issue 4, Oct. 1, 1999, 26 Pages.

Keller, et al., "MicroCast: Cooperative Video Streaming on Smartphones", In Proceedings of the 10th International Conference on Mobile Systems, Applications and Services, Jun. 25, 2012, 13 Pages.

Keshtkar, et al., "A Corpus-Based Method for Extracting Paraphrases of Emotion Terms", In Proceedings of the NAACL HLT Workshop on Computational Approaches to Analysis and Generation of Emotion in Text, Jun. 5, 2010, pp. 35-44.

Ko, et al., "Cammia—A Context-Aware Spoken Dialog System for Mobile Environments", In Proceedings of the Automatic Speech Recognition and Understanding Workshop, Jul. 29, 2011, 2 Pages.

Kohler, et al., "Fast Point-to-Point Shortest Path Computations with Arc-Flags", In Proceedings of the Shortest Path Computations: Ninth DIMACS Challenge, vol. 24 of DIMACS Book, American Mathematical Society, Nov. 13, 2006, 27 Pages.

Kolarik, et al., "Perceiving Auditory Distance Using Level and Direct-to-Reverberant Ratio Cues", In the Journal of the Acoustical Society of America, vol. 130, Issue 4, Oct. 2011, 4 Pages.

Konig, et al., "Nonlinear Discriminant Feature Extraction for Robust Text-Independent Speaker Recognition", In Proceedings of the RLA2C, ESCA workshop on Speaker Recognition and its Commercial and Forensic Applications, Apr. 1, 1998, 4 Pages.

Koo, et al., "Autonomous Construction of a WiFi Access Point Map Using Multidimensional Scaling", In Proceedings of the 9th International Conference on Pervasive computing, Jun. 12, 2011, 18 Pages.

Krokstad, Asbjorn, "The Hundred Years Cycle in Room Acoustic Research and Design", In Proceedings of the Reflections on Sound, Norwegian University of Science and Technology, Jun. 1, 2008, 30 Pages.

Kumar, et al., "Attribute and Simile Classifiers for Face Verification", In Proceedings of the 12th IEEE International Conference on Computer Vision, Sep. 29, 2009, 8 Pages.

Kumar, et al., "Describable Visual Attributes for Face Verification and Image Research", In Journal of the IEEE Transactions on Pattern Analysis and Machine Intelligence, vol. 33, Issue 10, Oct. 1, 2011, 17 Pages.

Kumar, et al., "Face Recognition Using Gabor Wavelets", In Proceedings of the 40th IEEE Asilomar Conference on Signals, Systems and Computers, Oct. 29, 2006, 5 Pages.

Chandak, et al., "AD Frustum: Adaptive Frustum Tracing for Interactive Sound Propagation", In Proceedings of the IEEE Transactions on Visualization and Computer Graphics, vol. 14, Issue 6, Nov. 1, 2008, pp. 1707-1714.

Chandra, et al., "MultiNet: Connecting to Multiple IEEE 802.11 Networks Using a Single Wireless Card", In Proceedings of the 23rd Annual Joint Conference of the IEEE Computer and Communications Societies, INFOCOM, Mar. 7, 2004, 12 Pages.

Chandrasekaran, et al., "Sparse and Low-Rank Matrix Decompositions", In Proceedings of the IFAC Symposium on System Identification, vol. 42, Issue 10, Sep. 30, 2009, 6 Pages.

Chen, et al., "Bayesian Face Revisited: A Joint Formulation", In Proceedings of the 12th European Conference on Computer Vision, vol. Part III, Oct. 7, 2012, 14 Pages.

Chen, Wei, "Building Language Model on Continuous Space using Gaussian Mixture Models", In Proceedings of the Research in Language Modeling, Jan. 1, 2007, 66 Pages.

Chen, et al., "Supplemental Material for Bayesian Face Revisited: A Joint Formulation", Retrieved From: https://www.microsoft.com/en-us/research/wp-content/uploads/2012/01/JointBayesian_Suppl.pdf, Apr. 1, 2013, 5 Pages.

Cheng, et al., "Entityrank: Searching Entities Directly and Holistically", In Proceedings of the 33rd International Conference on Very Large Data Bases, Sep. 23, 2007, 12 Pages.

Cheng, et al., "Heritage and Early History of the Boundary Element Method", In Proceedings of the Engineering Analysis with Boundary Elements, vol. 29, Issue 3, Mar. 1, 2005, pp. 268-302.

Chi, et al., "Visual Foraging of Highlighted Text: An Eye-Tracking Study", In Proceedings of the 12th International Conference on Human-Computer Interaction-Intelligent Multimodal Interaction Environments, Jul. 22, 2007, pp. 589-598.

Choi, et al., "Face Annotation for Personal Photos Using Collaborative Face Recognition in Online Social Networks", In Proceedings of the 16th International Conference on Digital Signal Processing, Jul. 5, 2009, 8 Pages.

Choudhury, et al., "A Framework for Robust Online Video Contrast Enhancement Using Modularity Optimization", In Proceedings of the IEEE Transactions on Circuits and Systems for Video Technology, vol. 22, Issue 9, Sep. 9, 2012, 14 Pages.

Clarke, et al., "Exploiting Redundancy in Question Answering", In Proceedings of the 24th Annual International ACM SIGIR Conference on Research and Development in Information Retrieval, Sep. 9, 2001, 8 Pages.

Cootes, et al., "Chapter 3: Modeling Facial Shape and Appearance", In Handbook of Face Recognition, Chapter 3, Published by Springer New York, 2005, pp. 39-63.

Cormen, et al., "Introduction to Algorithms", In Book of Introduction to Algorithms, Third Edition, Published by the MIT Press, Jul. 31, 2009, 43 Pages.

Ying, et al., "Distance Metric Learning with Eigenvalue Optimization", In Journal of Machine Learning Research, vol. 13, Issue 1, Jan. 1, 2012, 26 Pages.

Cucerzan, Silviu, "Large-Scale Named Entity Disambiguation Based on Wikipedia Data", In Proceedings of the Joint Conference on Empirical Methods in Natural Language Processing and Computational Natural Language Learning, Jun. 28, 2007, pp. 708-716.

Cvetkovic, et al., "Image enhancement circuit using non-linear processing curve and constrained histogram range equalization", In Proceedings of the SPIE and IS&T Conference on Visual Communication and Image Processing, vol. 5308, Jan. 7, 2004, 11 Pages.

Dahl, et al., "Context-Dependent Pre-Trained Deep Neural Networks for Large Vocabulary Speech Recognition", In Proceedings of the IEEE Transactions on Audio, Speech, and Language Processing, vol. 20, Issue 1, Jan. 1, 2012, pp. 30-42.

Dahl, et al., "Large Vocabulary Continuous Speech Recognition with Context-Dependent DBN-HMMs", In Proceedings of the IEEE International Conference on Acoustics, Speech and Signal Processing, May 22, 2011, 4 Pages.

Davis, et al., "Information-Theoretic Metric Learning", In Proceedings of the 24th International Conference on Machine Learning, Jun. 20, 2007, 8 Pages.

(56) References Cited

OTHER PUBLICATIONS

Davis, et al., "Low-Rank Approximations for Conditional Feedforward Computation in Deep Neural Networks", In Journal of Computing Research Repository, Dec. 16, 2013, pp. 1-10.
Delano, et al., "Integrated Development Environments for Natural Language Processing", Retrieved From: http://www.textanalysis.com/TAI-IDE-WP.pdf, Oct. 1, 2001, 13 Pages.
Delling, et al., "Customizable Route Planning", In Proceedings of the 10th International Symposium on Experimental Algorithms, May 5, 2011, 12 Pages.
Delling, et al., "Customizable Route Planning in Road Networks", In Proceedings of the Sixth Annual Symposium on Combinatorial Search, AAAI Publications, Jul. 24, 2011, 31 Pages.
Delling, et al., "Customizing Driving Directions With GPUs", In Proceedings of the 20th Euro-Par International Conference on Parallel Processing, Aug. 25, 2014, 12 Pages.
Delling, et al., "Faster Customization of Road Networks", In Proceedings of the 12th International Symposium on Experimental Algorithms, Jun. 5, 2013, 12 Pages.
Delling, et al., "Graph Partitioning with Natural Cuts", In Proceedings of the IEEE International Parallel & Distributed Processing Symposium, Dec. 1, 2010, 27 Pages.
Delling, et al., "High-Performance Multi-Level Graphs", In Proceedings of the 9th DIMACS Implementation Challenge: The Shortest Path Problem, Nov. 1, 2006, 13 Pages.
Delling, et al., "Highway Hierarchies Star", In Proceedings of the 9th DIMACS Implementation Challenge: The Shortest Path Problem, Nov. 13, 2006, 29 Pages.
Delling, et al., "PHAST: Hardware-Accelerated Shortest Path Trees", In Journal of Parallel and Distributed Computing, vol. 73, Issue 7, Sep. 1, 2010, 20 Pages.
Demetrescu, et al., "The Shortest Path Problem: Ninth DIMACS Implementation Challenge", In Proceedings of the DIMACS Series in Discrete Mathematics and Theoretical Computer Science, vol. 74, Aug. 15, 2009, 3 Pages.
Diez, et al., "Optimization of a Face Verification System Using Bayesian Screening Techniques", In Proceedings of the 23rd IASTED International Multi-Conference on Artificial Intelligence and Applications, Feb. 14, 2005, pp. 427-432.
Ding, et al., "Chapter 12: Facial Landmark Localization", In Book of Handbook of Face Recognition, Second Edition, Aug. 22, 2011, pp. 305-322.
Dong, et al., "Image Retargeting by Content-Aware Synthesis", In Proceedings of the IEEE Transaction on Visualisation and Computer Graphics, vol. XX, No. XX, Jun. 2014, 14 Pages.
Yin, et al., "An Associate-Predict Model for Face Recognition", In Proceedings of the IEEE Conference on Computer Vision and Pattern Recognition, Jun. 20, 2011, pp. 497-504.
Doren, Don Van., "Unified Communication and Collaboration from the User's Perspective", Retrieved From: http://www.ucstrategies.com/unified-communications-expert-views/unified-communication-and-collaboration-from-the-users-perspective.aspx, Retrieved Date: Dec. 8, 2009, 2 Pages.
Eagle, et al., "Common Sense Conversations: Understanding Casual Conversation using a Common Sense Database", In Proceedings of the Artificial Intelligence, Information Access and Mobile Computing Workshop, Aug. 1, 2003, 6 Pages.
Edens, et al., "An Investigation of Broad Coverage Automatic Pronoun Resolution for Information Retrieval", In Proceedings of the 26th Annual International ACM SIGIR Conference on Research and Development in Information Retrieval, Jul. 28, 2003, pp. 381-382.
Edmonds, et al., "Single-Source Shortest Paths With the Parallel Boost Graph Library", In Proceedings of the 9th DIMACS Implementation Challenge: The Shortest Path Problem, Nov. 4, 2006, 20 Pages.
Efentakis, et al., "Optimizing Landmark-Based Routing and Preprocessing", In Proceedings of the Sixth ACM SIGSPATIAL International Workshop on Computational Transportation Science, Nov. 5, 2013, 6 Pages.
Elrakabawy, et al., "Peer-to-Peer File Transfer in Wireless Mesh Networks", In Proceedings of the Fourth Annual Conference on Wireless on Demand Network Systems and Services, Jan. 24, 2007, 8 Pages.
Fang, et al., "A Formal Study of Information Retrieval Heuristics", In Proceedings of the 27th Annual International ACM SIGIR Conference on Research and Development in Information Retrieval, Jul. 25, 2004, 8 Pages.
Ferguson, Scott, "Five Key Criteria for adaptable SDN Wi-Fi", Retrieved From: http://www.extremenetworks.com/five-key-criteria-for-adaptable-sdn-wi-fi/, Nov. 25, 2013, 7 Pages.
Finkel, et al., "Incorporating Non-Local Information into Information Extraction Systems by Gibbs Sampling", In Proceedings of the 43rd Annual Meeting on Association for Computational Linguistics, Jun. 25, 2005, pp. 363-370.
Fiore et al., "Information Density Estimation for Content Retrieval in MANETs", In Proceedings of the IEEE Transactions on Mobile Computing, vol. 8, Issue 3, Mar. 1, 2009, 15 Pages.
Florescu, et al., "Towards a Peer-Assisted Content Delivery Architecture", In Proceedings of the 18th International Conference on Control Systems and Computer Science, May 1, 2011, 8 Pages.
Friedman, Jerome H., "Greedy Function Approximation: A Gradient Boosting Machine", In Proceedings of the Annals of Statistics, vol. 29, Issue 5, Feb. 24, 1999, 34 Pages.
Funkhouser, et al., "A Beam Tracing Method for Interactive Architectural Acoustics", In Journal of the Acoustical Society of America, vol. 115, Feb. 1, 2004, pp. 739-756.
Funkhouser, et al., "Realtime Acoustic Modeling for Distributed Virtual Environments", In Proceedings of the 26th Annual Conference on Computer Graphics and Interactive Techniques, Jul. 1, 1999, pp. 365-374.
Funkhouser, et al., "Survey of Methods for Modeling Sound Propagation in Interactive Virtual Environment Systems", In Journal of Presence and Teleoperation, Jan. 1, 2003, 53 Pages.
"Second Office Action Issued in Chinese Patent Application No. 201580032034.1", dated Apr. 22, 2019, 13 Pages.
"Second Office Action Issued in Chinese Patent Application No. 201580034192.0", dated Apr. 22, 2019, 10 Pages.
"Office Action Issued in European Patent Application No. 15721468.5", dated May 24, 2019, 8 Pages.
"Office Action Issued in Chinese Patent Application No. 201580029370.0", dated Feb. 28, 2019, 15 Pages.
Kumar, et al., "Gaze-Enhanced Scrolling Techniques", In Proceedings of the 20th Annual ACM Symposium on User Interface Software and Technology, Apr. 28, 2007, pp. 2531-2536.
Kuttruff, Heinrich, "Room Acoustics, Fourth Edition", In Book of Room Acoustics, Fourth Edition, Published by CRC Press, ISBN 9780419245803—CAT# RU29207, Aug. 3, 2000, 1 Page.
Lambert, et al., "Step by Step Microsoft Word 2013", In Book Step by Step, First Edition, Published by Microsoft Press, Jan. 15, 2013, 576 Pages.
Lanitis, et al., "Toward Automatic Simulation of Aging Effects on Face Images", In Proceedings of the IEEE Transaction of Pattern Analysis and Machine Intelligence (PAML), vol. 24, Issue 4, Apr. 1, 2002, pp. 442-455.
Lauterbach, et al., "Interactive Sound Rendering in Complex and Dynamic Scenes Using Frustum Tracing", In Proceedings of the IEEE Transactions on Visualization and Computer Graphics, vol. 13, Issue 6, Nov. 1, 2007, pp. 1672-1679.
Lauther, Ulrich, "An Experimental Evaluation for Point-To-Point Shortest Path Calculation on Roadnetworks with Precalculated Edge-Flags", In Proceedings of the 9th DIMACS Implementation Challenge: The Shortest Path Problem, Nov. 3, 2006, 18 Pages.
Lavrenko, et al., "Relevance-Based Language Models", In Proceedings of the 24th Annual International ACM SIGIR Conference on Research and Development in Information Retrieval, Sep. 9, 2001, pp. 120-127.
Lecouteux, et al., "Dynamic Combination of Automatic Speech Recognition Systems by Driven Decoding", In Proceedings of the IEEE Transactions on Audio, Speech and Language Processing, vol. 21, Issue 6, Jan. 1, 2013, 10 Pages.

(56) References Cited

OTHER PUBLICATIONS

Lee, et al., "Deterministic Coreference Resolution Based on Entity-Centric, Precision-Ranked Rules", In Journal of Computational Linguistics, vol. 39, Issue 4, Dec. 1, 2013, 32 Pages.

Lee, et al., "Intention-Based Corrective Feedback Generation using Context-Aware Model", In Proceedings of the Second International Conference on Computer Supported Education, Apr. 7, 2010, 8 Pages.

Lei, et al., "Face Recognition by Exploring Information Jointly in Space, Scale and Orientation", In Proceedings of the IEEE Transactions on Image Processing, vol. 20, Issue 1, Jan. 1, 2011, pp. 247-256.

Lentz, et al., "Virtual Reality System with Integrated Sound Field Simulation and Reproduction", In EURASIP Journal on Applied Signal Processing, vol. 2007, Issue 1, Jan. 1, 2007, 22 Pages.

Li, et al., "Bayesian Face Recognition Using Support Vector Machine and Face Clustering", In Proceedings of the IEEE Computer Society Conference on Computer Vision and Pattern Recognition, Jun. 27, 2004, 7 Pages.

Li, et al., "Comparison of Discriminative Input and Output Transformations for Speaker Adaptation in the Hybrid NN/HMM Systems", In Proceedings of the 11th Annual Conference of the International Speech Communication Association, INTERSPEECH, Sep. 26, 2010, pp. 526-529.

Li, et al., "Lattice Combination for Improved Speech Recognition", In Proceedings of the 7th International Conference of Spoken Language Processing, Sep. 16, 2002, 4 Pages.

Li, et al., "Probabilistic Models for Inference about Identity", In Proceedings of the IEEE Transactions on Pattern Recognition and Machine Intelligence, vol. 34, Issue 1, Jan. 1, 2012, 16 Pages.

Li, et al., "Spatial Sound Rendering Using Measured Room Impulse Responses", In Proceedings of the IEEE International Symposium on Signal Processing and Information Technology, Aug. 27, 2006, pp. 432-434.

Liang et al., "Face Alignment via Component-Based Discriminative Search", In Proceedings of the 10th European Conference on Computer Vision, Lecture Notes in Computer Science, vol. 5303, Oct. 12, 2008, 14 Pages.

Liao, Hank, "Speaker Adaptation of Context Dependent Deep Neural Networks", In Proceedings of the IEEE International Conference on Acoustics, Speech and Signal Processing, May 26, 2013, 5 Pages.

Lilly, et al., "Robust Speech Recognition using Singular Value Decomposition based Speech Enhancement", In Proceedings of the IEEE Region 10th Annual Conference on Speech and Image Technologies for Computing and Telecommunications, vol. 1, 1997, pp. 257-260.

Lin, et al., "What Makes a Good Answer? The Role of Context in Question Answering", In Proceedings of the Ninth IFIP TC13 International Conference on Human-Computer Interaction, Sep. 1, 2003, 8 Pages.

Liu, et al., "Language Model Combination and Adaptation using Weighted Finite State Transducers", In Proceedings of the IEEE International Conference on Acoustics Speech and Signal Processing, Mar. 14, 2010, 4 Pages.

Liu, et al., "Use of Contexts in Language Model Interpolation and Adaptation", In Journal of Computer Speech and Language, vol. 27, Issue 1, Feb. 1, 2009, 23 Pages.

Loizides, et al., "The Myth of Find: User Behaviour and Attitudes Towards the Basic Search Feature", In Proceedings of the 8th ACM/IEEE-CS Joint Conference on Digital Libraries, Jun. 16, 2008, 4 Pages.

Lokki, et al., "Creating interactive virtual auditory environments", In Proceedings of the IEEE on Computer Graphics and Applications, vol. 22, Issue 4, Jul. 1, 2002, pp. 49-57.

Lu, et al., "Context Aware Textures", In Journal of ACM Transactions on Graphics, vol. 26, Issue 1, Article No. 3, Jan. 1, 2007, 31 Pages.

Luo, et al., "UCAN: A Unified Cellular and AdHoc Network Architecture", In Proceedings of the Ninth ACM Annual International Conference on Mobile Computing and Networking, Sep. 14, 2013, 15 Pages.

Lv, et al., "A Comparative Study of Methods for Estimating Query Language Models with Pseudo Feedback", In Proceedings of the 18th ACM Conference on Information and Knowledge Management, Nov. 2, 2009, 4 Pages.

Lv, et al., "Positional Language Models for Information Retrieval", In Proceedings of the 32nd International ACM SIGIR Conference on Research and Development in Information Retrieval, Jul. 19, 2009, 8 Pages.

Madduri, et al., "Parallel Shortest Path Algorithms for Solving Large-Scale Instances", In Proceedings of the 9th DIMACS Implementation Challenge—The Shortest Path Problem, DIMACS Center, Aug. 30, 2006, 39 Pages.

Malony, et al., "Compensation of Measurement Overhead in Parallel Performance Profiling", In Proceedings of the International Journal of High Performance Computing Applications, vol. 21, Issue 2, May 1, 2007, 23 Pages.

Malony, et al., "Overhead Compensation in Performance Profiling", In Lecture Notes in Computer Science, vol. 3149, Oct. 1, 2004, 14 Pages.

Manetti, et al., "Next Generation CDN services for Community Networks", In Proceedings of the Third International Conference on Next Generation Mobile Applications, Services and Technologies, Sep. 15, 2009, 6 Pages.

Martin, et al., "CUDA Solutions for the SSSP Problem", In Proceedings of the 9th International Conference on Computational Science: Part I, Baton Rouge, May 20, 2009, pp. 904-913.

Mavridis, et al., "Friends with Faces: How Social Networks Can Enhance Face Recognition and Vice Versa", In Proceedings of the Computational Social Networks Analysis: Trends, Tools and Research Advances, Computer Communications and Networks, May 24, 2010, 30 Pages.

Mehra, et al., "An Efficient GPU-Based Time Domain Solver for the Acoustic Wave Equation", In Proceedings of the Applied Acoustics, vol. 73, Issue 2, Feb. 29, 2012, pp. 83-94.

Mehra, et al., "Wave-Based Sound Propagation in Large Open Scenes Using an Equivalent Source Formulation", In Journal of ACM transactions on Graphics, vol. 32, Issue 2, Apr. 1, 2013, 13 Pages.

Mehrotra, et al., "Interpolation of Combined Head and Room Impulse Response for Audio Spatialization", In Proceedings of the IEEE 13th International Workshop on Multimedia Signal Processing, Oct. 17, 2011, pp. 1-6.

Meinedo, et al., "Combination of Acoustic Models in Continuous Speech Recognition Hybrid Systems", In Proceedings of the Sixth International Conference on Spoken Language Processing, Oct. 1, 2000, 4 Pages.

Meyer, et al., "D-Stepping: A Parallelizable Shortest Path Algorithm", In Journal of Algorithms, vol. 49, Issue 1, Oct. 1, 2003, pp. 114-152.

Mihalcea, et al., "Wikify!: Linking Documents to Encyclopedic Knowledge", In Proceedings of the Sixteenth ACM Conference on Information and Knowledge Management, Nov. 6, 2007, 9 Pages.

Militano, et al., "Group Interactions in Wireless Cooperative Networks", In Proceedings of the IEEE 73rd Conference on Vehicular Technology, May 15, 2011, 5 Pages.

Moghaddam, et al., "Bayesian Face Recognition", In Journal of Pattern Recognition Society, vol. 33, Issue 11, Nov. 30, 2000, pp. 1771-1782.

Mohamed, et al., "Acoustic Modeling Using Deep Belief Networks", In Proceedings of the IEEE Transactions on Audio, Speech and Language Processing, vol. 20, Issue 1, Jan. 1, 2012, 10 Pages.

Moreira, et al., "Towards the Rapid Development of a Natural Language Understanding Module", In Proceedings of the 10th International Conference on Intelligent Virtual Agents, Sep. 15, 2011, 7 Pages.

Mota, Pedro Jose Dos Reis., "LUP: A Language Understanding Platform", In Dissertation for the Degree of Master of Information Systems and Computer Engineering, Jul. 1, 2012, 128 Pages.

(56) References Cited

OTHER PUBLICATIONS

Motlicek, et al., "Feature and Score Level Combination of Subspace Gaussinasin LVCSR Task", In Proceedings of the IEEE International Conference on Acoustics, Speech and Signal Processing, May 26, 2013, 5 Pages.

"Office Action Issued in Mexican Patent Application No. MX/a/2016/016291", dated Sep. 11, 2018, 4 Pages.

Na, et al., "A 2-Poisson Model for Probabilistic Coreference of Named Entities for Improved Text Retrieval", In Proceedings of the 32nd International ACM SIGIR Conference on Research and Development in Information Retrieval, Jul. 19, 2009, 8 Pages.

Neve, et al., "Face Recognition for Personal Photos using Online Social Network Context and Collaboration", In Guest Lecture at Korea Advanced Institute of Science and Technology (KAIST), Image and Video Systems Lab, Department of Electrical Engineering, Dec. 14, 2010, 54 Pages.

Tsay, et al., "Personal Photo Organizer based on Automated Annotation Framework", In Proceedings of the 5th International Conference on Intelligent Information Hiding and Multimedia Signal Processing, Sep. 12, 2009, pp. 507-510.

Tysowski, et al., "Peer to Peer Content Sharing on Ad Hoc Networks of Smartphones", In Proceedings of 7th International Conference on Wireless Communications and Mobile Computing, Jul. 4, 2011, 6 Pages.

Valimaki, et al., "Fifty Years of Artificial Reverberation", In Journal of IEEE Transactions on Audio, Speech, and Language Processing, vol. 20, Issue 5, Jul. 5, 2012, 28 Pages.

Vanhoucke, et al., "Improving the Speed of Neural Networks on CPUs", In Proceedings of the NIPS Workshop on Deep Learning and Unsupervised Feature Learning, vol. 1, Dec. 16, 2011, 8 Pages.

Vorm, Jochem Van Der., "Transform Coding of Audio Impulse Responses", In Proceedings of the Master's Thesis, Laboratory of Acoustical Imaging and Sound Control, Department of Imaging Science and Technology, Faculty of Applied Sciences, Delft University of Technology, Aug. 1, 2003, 109 Pages.

Wand, et al., "A Real-Time Sound Rendering Algorithm for Complex Scenes", In Proceedings of the Technical Report WSI-2003-5, ISSN 0946-3852, Jul. 1, 2003, 13 Pages.

Wang, et al., "A Unified Framework for Subspace Face Recognition", In Proceedings of the IEEE Transactions on Pattern Analysis and Machine Intelligence, vol. 26, Issue 9, Sep. 1, 2004, pp. 1222-1228.

Wang, et al., "Bayesian Face Recognition Using Gabor Features", In Proceedings of the ACM SIGMM Workshop on Biometrics Methods and Applications, Nov. 8, 2003, pp. 70-73.

Wang, et al., "Boosted Multi-Task Learning for Face Verification with Applications to Web Image and Video Search", In Proceedings of the IEEE Conference on Computer Vision and Pattern Recognition, Jun. 20, 2009, 8 Pages.

Wang, et al., "Subspace Analysis Using Random Mixture Models", In Proceedings of the IEEE Computer Society Conference on Computer Vision and Pattern Recognition, Jun. 20, 2005, 7 Pages.

Weinberger, et al., "Distance Metric Learning for Large Margin Nearest Neighbor Classification", In Proceedings of the Conference on Advances in Neural Information Processing Systems, Dec. 1, 2006, 8 Pages.

Wodecki, et al., "Multi-GPU Parallel Memetic Algorithm for Capacitated Vehicle Routing Problem", In Proceedings of the 10th International Conference on Parallel Processing and Applied Mathematics, Jan. 21, 2014, pp. 207-214.

Wu, et al., "Adapting Boosting for Information Retrieval Measures", In Journal of Information Retrieval, vol. 13, Issue 3, Jun. 1, 2010, pp. 254-270.

Wu, et al., "Who's Mary Jane? Understanding Fictional Characters", In Proceedings of the 23rd International World Nide Web Conference, Apr. 7, 2014, 212 Pages.

Robertson, et al., "Okapi at TREC-3", In Proceedings of the Text Retrieval Conference, Jan. 24, 2014, 18 Pages.

Rosten, et al., "Real-Time Video Annotations for Augmented Reality", In Proceedings of the First International Conference on Advances in Visual Computing, Lecture Notes in Computer Science, Dec. 5, 2005, 8 Pages.

Rouillard, Jose, "Contextual QR Codes", In Proceedings of the Third International Multi-Conference on Computing in the Global Information Technology, Jul. 27, 2008, pp. 50-55.

Sabine, Hale J., "Room Acoustics", In Proceedings of the Transactions of the IEEE Professional Group on Audio, vol. 1, Issue 4, Jul. 1, 1953, pp. 4-12.

Sainath, et al., "Auto-Encoder Bottleneck Features Using Deep Belief Networks", In Proceedings of the IEEE International Conference on Acoustics, Speech and Signal Processing, Mar. 25, 2012, pp. 4153-4156.

Sainath, et al., "Low-Rank Matrix Factorization for Deep Neural Network Training with High-Dimensional Output Targets", In Proceedings of the IEEE International Conference on Acoustics, Speech and Signal Processing, May 26, 2013, pp. 6655-6659.

Sainath, et al., "Making Deep Belief Networks Effective for Large Vocabulary Continuous Speech Recognition", In Proceedings of the IEEE Workshop on Automatic Speech Recognition and Understanding, Dec. 11, 2011, pp. 30-35.

Sakamoto, et al., "Calculation of Impulse Responses and Acoustic Parameters in a Hall by The Finite-Difference Time-Domain Method", In Proceedings of the Acoustical Science and Technology, vol. 29, Issue 4, Feb. 1, 2008, pp. 256-265.

Saluja, et al., "Context-aware Language Modeling for Conversational Speech Translation", in Proceedings of the Machine Translation Summit XIII, Sep. 19, 2011, 8 Pages.

Sanders, et al., "Robust, Almost Constant Time Shortest-Path Queries in Road Networks", In Proceedings of the 9th DIMACS Implementation Challenge: The Shortest Path Problem, Nov. 1, 2006, 19 Pages.

Santos, Jose Luis, "K Shortest Path Algorithms", In Proceedings of the 9th DIMACS Implementation Challenge: The Shortest Path Problem, Aug. 1, 2006, 13 Pages.

Sarukkai, et al., "Improved Spontaneous Dialogue Recognition Using Dialogue and Utterance Triggers by Adaptive Probability Boosting", In Proceedings of the Fourth International Conference on Spoken Language, vol. 1, Oct. 3, 1996, 4 Pages.

Sarukkai, et al., "Word Set Probability Boosting for Improved Spontaneous Dialog Recognition", In Proceedings of be IEEE Transactions on Speech and Audio Processing, vol. 5, Issue 5, Sep. 1, 1997, pp. 438-450.

Sato, et al., "Incentive Mechanism Considering Variety of User Cost in P2P Content Sharing", In Proceedings of the IEEE Global Telecommunications Conference on Communications and Computer Engineering, Nov. 30, 2008, 5 Pages.

Satoh, et al., "Poster Abstract: Ambient Sound-Based Proximity Detection with Smartphones", In Proceedings of the 11th ACM Conference on Embedded Networked Sensor Systems, Article No. 58, Nov. 11, 2013, 2 Pages.

Savioja, Lauri, "Real-Time 3D Finite-Difference Time-Domain Simulation of Mid-Frequency Room Acoustics", In Proceedings of the 13th International Conference on Digital Audio Effects, Sep. 6, 2010, 8 Pages.

Savioja, et al., "Simulation of Room Acoustics with a 3-D Finite Difference Mesh", In Proceedings of the International Computer Music Conference, Sep. 1, 1994, pp. 463-466.

Sbai, et al., "P2P Content Sharing in Spontaneous Multi-Hop Wireless Networks", In Proceedings of the Second International Conference of Communication Systems and Networks, Jan. 5, 2010, 10 Pages.

Scarr, et al., "Improving Command Selection with Command Maps", In Proceedings of the ACM SIGCHI Conference on Human Factors in Computing Systems, May 5, 2012, 10 Pages.

Seide, et al., "Conversational Speech Transcription using Context-Dependent Deep Neural Networks", In Proceedings of the 12th Annual Conference of the International Speech Communication Association, Aug. 28, 2011, pp. 437-440.

(56) References Cited

OTHER PUBLICATIONS

Seneff, et al., "Galaxy-II: A Reference Architecture for Conversational System Development", In Proceedings of the 5th International Conference on Spoken Language Processing, Nov. 1, 2008, 4 Pages.
Seo, et al., "Face Verification Using the Lark Representation", In Proceedings of the IEEE Transactions on Information Forensics and Security, vol. 6, Issue 4, Dec. 1, 2011, 12 Pages.
Shan, et al., "Image Based Surface Detail Transfer", In Proceedings of the IEEE Computer Graphics and Applications, vol. 24, Issue 3, May 1, 2004, 6 Pages.
Shanklin, Will, "Samsung Galaxy S4 to Feature Eye-Tracking Technology", Retrieved From: http://www.gizmag.com/galaxy-s4-eye-tracking-technology/265031/, Mar. 4, 2013, 5 Pages.
Shen, et al., "Agent-based Traffic Simulation and Traffic Signal Timing Optimization with GPU", In Proceedings of the 14th International IEEE Conference on Intelligent Transportation Systems, Oct. 5, 2011, pp. 145-150.
Sing, et al., "Domain Metric Knowledge Model for Embodied Conversation Agents", In Proceedings of the 5th International Conference on Research, Innovation & Vision for the Future, Mar. 5, 2007, 7 Pages.
Singhal, et al., "Pivoted Document Length Normalization", In Proceedings of the 19th Annual International ACM SIGIR Conference on Research and Development in Information Retrieval, Aug. 18, 1996, 12 Pages.
Singh-Miller, et al., "Dimensionality Reduction for Speech Recognition Using Neighborhood Components Analysis", In Proceedings of the 8th Annual Conference of the International Speech Communication Association, Aug. 27, 2007, 4 Pages.
Siniscalchi, et al., "Hermitian Based Hidden Activation Functions for Adaptation of Hybrid HMM/ANN Models", In Proceedings of the 13th Annual Conference of the International Speech Communication Association, Sep. 9, 2012, 4 Pages.
So, et al., "Routing and Channel Assignment in Multi-Channel Multi-Hop Wireless Networks with Single-NIC Devices", In The Technical Report, Department of Computer Science, Department of Electrical and Computer Engineering, Coordinated Science Laboratory, University of Illinois at Urbana-Champaign, Dec. 1, 2004, 12 Pages.
Sommer, Christian, "Shortest-Path Queries in Static Networks", In Proceedings of the ACM Computing Surveys (CSUR), vol. 46, Issue 4, Article No. 45, Apr. 7, 2014, 35 Pages.
Song, et al., "Centralized Control of Wireless Sensor Networks for Real-time Applications", In IFAC Proceedings vols. 40, Issue 22, Nov. 7, 2007, 8 Pages.
Song, et al., "Optimal Resource Utilization in Content Distribution Networks", In Technical Report of Computer Science, Department of Computer Science, Nov. 14, 2005, 14 Pages.
Sparck Jones, et al., "Report on the Need for and Provision of an 'Ideal' Information Retrieval Test Collection", In the University Computer Laboratory Publishers, Dec. 1, 1975, 44 Pages.
Starr, Michelle, "Facial Recognition App Matches Strangers to Online Profiles", Retrieved From: http://www.cnet.com.au/facial-recognition-app-matches-strangers-to-online-profiles-339346355.htm, Jan. 7, 2014, 10 Pages.
Stettner, et al., "Computer Graphics Visualization for Acoustic Simulation", In Proceedings of the 16th Annual Conference on Computer Graphics and Interactive Techniques, vol. 23, Issue 3, Jul. 1, 1989, pp. 195-205.
Su, et al., "Error Back Propagation for Sequence Training of Context-Dependent Deep Networks for Conversational Speech Transcription", In Proceedings of the IEEE International Conference on Acoustics, Speech and Signal Processing, May 26, 2013, pp. 6664-6668.
Susskind, et al., "Modeling the Joint Density of Two Images Under a Variety of Transformations", In Proceedings of the IEEE Computer Society Conference on Computer Vision and Pattern Recognition, Jun. 20, 2011, pp. 2793-2800.
Svensson, et al., "The Use of Ambisonics in Describing Room Impulse Responses", In Proceedings of the International Congress on Acoustics, Apr. 1, 2004, pp. 2481-2483.
Swietojanski, et al., "Revisiting Hybrid and GMM-HMM System Combination Techniques", In Proceedings of the IEEE International Conference on Acoustics, Speech and Signal Processing, May 26, 2013, 5 Pages.
Taigman, et al., "Leveraging Billions of Faces to Overcome Performance Barriers in Unconstrained Face Recognition", In Proceedings of the Computer Vision and Pattern Recognition, Aug. 4, 2011, 7 Pages.
Taigman, et al., "Multiple One-Shots for Utilizing Class Label Information", In Proceedings of the British Machine Vision Conference (BMVC), Sep. 7, 2009, 12 Pages.
Takala, et al., "Sound Rendering", In Proceedings of the 19th Annual Conference on Computer Graphics and Interactive Techniques, vol. 26, Issue 2, Jul. 1, 1992, pp. 211-220.
Taylor, et al., "RESound: Interactive Sound Rendering for Dynamic Virtual Environments", In Proceedings of the 17th ACM International Conference on Multimedia, Oct. 19, 2009, pp. 271-280.
Tellex, et al., "Quantitative Evaluation of Passage Retrieval Algorithms for Question Answering", In Proceedings of the 26th Annual International ACM SIGIR Conference on Research and Development in Information Retrieval, Jul. 28, 2003, 7 Pages.
Thompson, Lonny L., "A Review of Finite-Element Methods for Time-Harmonic Acoustics", In Journal of Acoustical Society of America, vol. 119, Issue 3, Mar. 1, 2006, pp. 1315-1330.
Thouin, et al., "Video-on-Demand Networks: Design Approaches and Future Challenges", In Proceedings of the IEEE Network, vol. 21, Issue 2, Mar. 1, 2007, 7 Pages.
Tian, et al., "Chapter 11: Facial Expression Analysis", In Book—Handbook of Face Recognition, Jan. 1, 2005, pp. 247-275.
Tombros, et al., "Advantages of Query Biased Summaries in Information Retrieval", In Proceedings of the 21st Annual International ACM SIGIR Conference on Research and Development in Information Retrieval, Aug. 1, 1998, 9 Pages.
Trmal, et al., "Adaptation of a Feedforward Artificial Neural Network Using a Linear Transform", In Proceedings of the Text, Speech and Dialogue, vol. 6231 of the series Lecture Notes in Computer Science, Sep. 10, 2010, 8 Pages.
"Non Final Office Action Issued in U.S. Appl. No. 15/692,494", dated Jul. 19, 2019, 11 Pages.
"Second Office Action and Search Report Issued in Chinese Application No. 201580028549.4", dated Jul. 3, 2019, 10 Pages.
"First Office Action Issued in Chinese Patent Application No. 201580018659.2", dated Dec. 25, 2018, 19 Pages.
"Office Action Issued in Chinese Patent Application No. 201580018659.2", dated Aug. 23, 2019, 15 Pages.
"Office Action Issued in Chinese Patent Application No. 201580024796.7", dated Aug. 26, 2019, 18 Pages.
"Office Action Issued in Chinese Patent Application No. 201580032034.1", dated Aug. 30, 2019, 6 Pages.
"Office Action Issued in Chinese Patent Application No. 201580034192.0", dated Sep. 2, 2019, 7 Pages.
"Second Office Action Issued in Chinese Patent Application No. 201580029370.0", dated Sep. 6, 2019, 6 Pages.
"Office Action Issued in European Patent Application No. 15745006.5", dated Dec. 20, 2019, 4 Pages.
"Office Action Issued in Chinese Patent Application No. 201580018659.2", dated Dec. 25, 2019, 11 Pages.
"Office Action Issued in European Patent Application No. 15724882.4", dated Feb. 20, 2020, 6 Pages.
"Office Action Issued in European Patent Application No. 15726780.8", dated Mar. 5, 2020, 7 Pages.
"Summons to Attend Oral Proceedings Issued in European Patent Application No. 15728297.1", Mailed Date: Mar. 13, 2020, 8 Pages.

\* cited by examiner

ISOLATING A PORTION OF AN ONLINE COMPUTING SERVICE FOR TESTING

CROSS-REFERENCE TO RELATED APPLICATION

This application is a continuation of, claims the benefit of and priority to previously filed U.S. patent application Ser. No. 14/294,410 filed Jun. 3, 2014, entitled "TECHNIQUES TO ISOLATING A PORTION OF AN ONLINE COMPUTING SERVICE", which is hereby incorporated by reference in its entirety.

BACKGROUND

An online computing service may be continuously updated with changes to meet the demands imposed by production traffic and provide business value. There are considerable risks involved with updating a component of the online computing service. Different online computing services employ conventional mechanisms to manage the conflicting requirements of managing the risk and deploying fixes/customer-asks with high agility and negligible customer impact.

There are multiple types of test environments for resembling a production environment in some capacity. However, no matter how close the test environment is to the production environment, the production environment most likely will have some unique characteristics distinguishing it from test environments. There is a strong possibility of discovering issues in the production environment even when a change has been validated in the test environments. Furthermore, employing multiple test environments increases costs significantly. In addition, before a change is rolled out to the production environment, development teams employ deployment verification tests that are run on each changed component. These tests, however, do not resemble real-world scenarios that normally occur in the production environment. Typically, deploying the changed component across the online computing service consumes multiple days.

It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to isolating a portion of an online computing service for various purposes. Some embodiments are particularly directed to techniques to isolating a portion of online computing service for validating a new/upgraded build of the online computing service and/or for segregating production traffic from a specific subset of users. Validation of the new/upgraded build may be accomplished via testing of a service instance associated with the new/upgraded build. In one embodiment, for example, an apparatus may comprise a management application stored on a set of memory units and operative on a processor. The management application may comprise a deployment component arranged to partition a resource capacity into deployment units of which each of the deployment units comprises a set of computing roles corresponding to running an online computing service for handling production traffic provided by a plurality of users. The deployment unit may be further arranged to migrate a deployment unit from a production endpoint into another endpoint, to modify one or more computing roles associated with the deployment unit to generate a modified deployment unit on the other endpoint, and to utilize the modified deployment unit for at least a portion of the production traffic. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
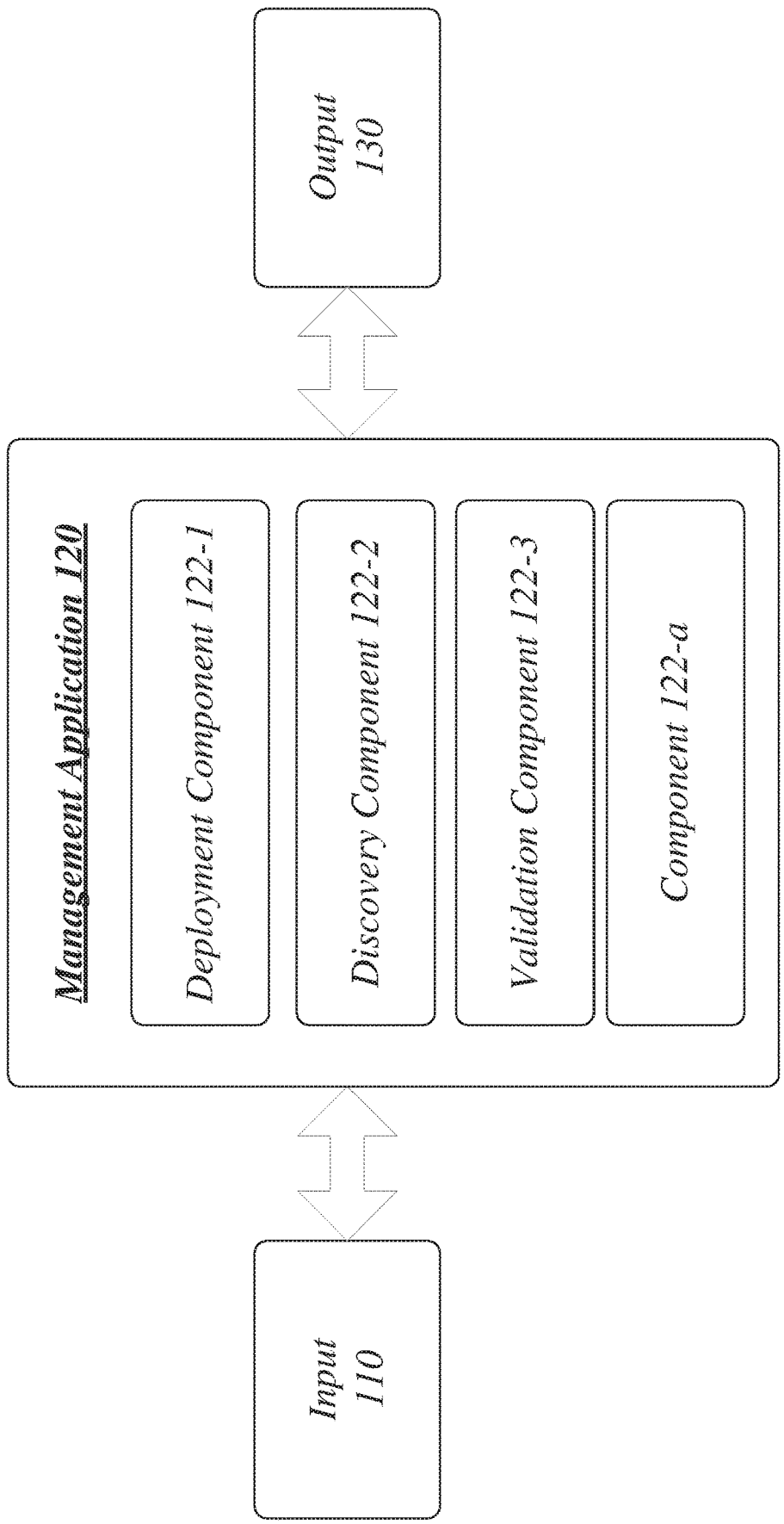
FIG. 1 illustrates an embodiment of a system to validate an online service.

Various embodiments are directed to validate a new online computing service instance for execution of an upgraded build in a production data center by creating an endpoint that does not require a significant portion of resource capacity for testing/validation, and therefore, does not affect current production traffic. In one embodiment, this endpoint may be considered temporary or ephemeral. In another embodiment, this endpoint eventually becomes a new or next production endpoint and therefore, requires a permanent portion of the resource capacity. As described below, the upgraded build may result from one or more changes applied to a previous build, including hot-fixes, custom or new features, and/or the like.

Testing of the upgraded build is performed in production data centers using production servers and networking infrastructure. Such testing is end to end, involving a complete set of computing roles to ensure that not only the role/server functions correctly but the entire system works correctly. Such testing may simulate real-world scenarios related to the online computing service. In one example embodiment, major or minor changes may be rolled out if a problem arises after deploying the upgraded build. As an example, the production traffic may re-routed to an endpoint associated with an older build of the online computer service.

The various embodiments described herein allow for the deployment of new/replacement software and/or other changes to the online computing service to be either propagated across all service instances with a single deployment, or concentrated to an isolated service instance in order to support specific tenants. The online computing service includes computing roles that have persistent data stores as well as stateless computer roles that do not have persistent data stores. Some persistent data stores can be shared across isolated service instances, such as those that contain non-sensitive data, such as spam signatures.

Instead of using dedicated cloud service components and endpoints that are independently managed, the various embodiments described herein allow for aspects of the online computing service architecture to be shared. In one embodiment, by partitioning the online computing service service's resource capacity into deployments units, each representing complete builds of the online computing service, as described herein, the complete build may be upgraded and tested through one deployment unit. When the upgraded complete build is validated, the deployment unit may be used for actual production traffic from tenants. In another embodiment, the deployment unit may support tenants that request complete isolation from other tenants.

As a result, the embodiments can improve affordability, scalability, modularity, extendibility, or interoperability for an operator, device or network.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a system 100. In one embodiment, the system 100 may comprise a computer-implemented system 100 having a management application 120 comprising one or more components 122-$a$. Although the system 100 shown in FIG. 1 has a limited number of elements in a certain topology, it may be appreciated that the system 100 may include more or less elements in alternate topologies as desired for a given implementation. Input 110 and Output 130 represent input/output activity associated with the system 100 in general.

It is worthy to note that "a" and "b" and "c" and similar designators as used herein are intended to be variables representing any positive integer. Thus, for example, if an implementation sets a value for a=5, then a complete set of components 122-$a$ may include components 122-1, 122-2, and 122-3. The embodiments are not limited in this context.

The system 100 may comprise the management application 120, which may be generally arranged to generate a new service instance for an online computing service, establish a new endpoint for serving that new service instance to users, and assign a set of servers to the new endpoint. These servers may include resources dedicated to operating various computing roles for the new service instance. The management application 120 may be configured to apply one or more changes to the computing roles, for example, in order to upgrade the computing roles to a new build/version of the online computing service. As described below, these changes may be rigorously tested in a validation process prior to deployment onto other production endpoints for the online computing service. Alternatively, the management application segregates the computing roles from other servers associated with other services instances that serve the same domain of users, thereby creating a virtual endpoint.

The management application 120 may comprise a deployment component 122-1 generally arranged to modify the computing roles of the online computing service with new/replacement software code in a manner that does not considerably impact any user's experience or productivity. Once modified, the new computing roles are tested and those test results are analyzed during a validation process. If valid, the modified computing roles are migrated to the production endpoint where they become available for processing production traffic (e.g., customer or tenant data).

In one embodiment, the deployment component 122-1 may migrate a set the computing roles to the endpoint that comprise a complete build of the online computing service.

By migrating this set of computing roles, end-to-end transactions may be invoked at the endpoint with only this set of computing roles. Hence, this set of computing roles may be referred to as a deployment unit. It is appreciated that in some embodiments, the set of computing roles may include stateless roles and zero, one, or more state-full roles.

The management application 120 may comprise a discovery component 122-2. Within the online computing service architecture, the discovery component 122-2 controls routing of the production traffic. The discovery component 122-2 may be generally arranged to manage routing data for the online computing service. In one embodiment, the deployment component 122-1 directs the discovery component 122-2 to process the routing data and route all production traffic away from the deployment unit comprising the above-mentioned set of computing roles.

The management application 120 may comprise a validation component 122-3. The validation component 122-3 may be generally arranged to perform a validation process on the modified deployment unit that comprises a variety of tests to measure performance, cost and/or other qualities. The validation component 122-3 performs all testing in production data centers using production servers and networking infrastructure. Testing is end to end involving all computing roles to ensure not only the role/server functions correctly but the entire system works correctly. Such testing may simulate real-world scenarios related to the online computing service. The validation component 122-3 may rollout major or minor changes if a problem arises after deploying an upgraded build of the online computing service. As an example, the discovery component 122-2 may re-route the production traffic to an endpoint associated with an older build of the online computer service.

Figure 2:
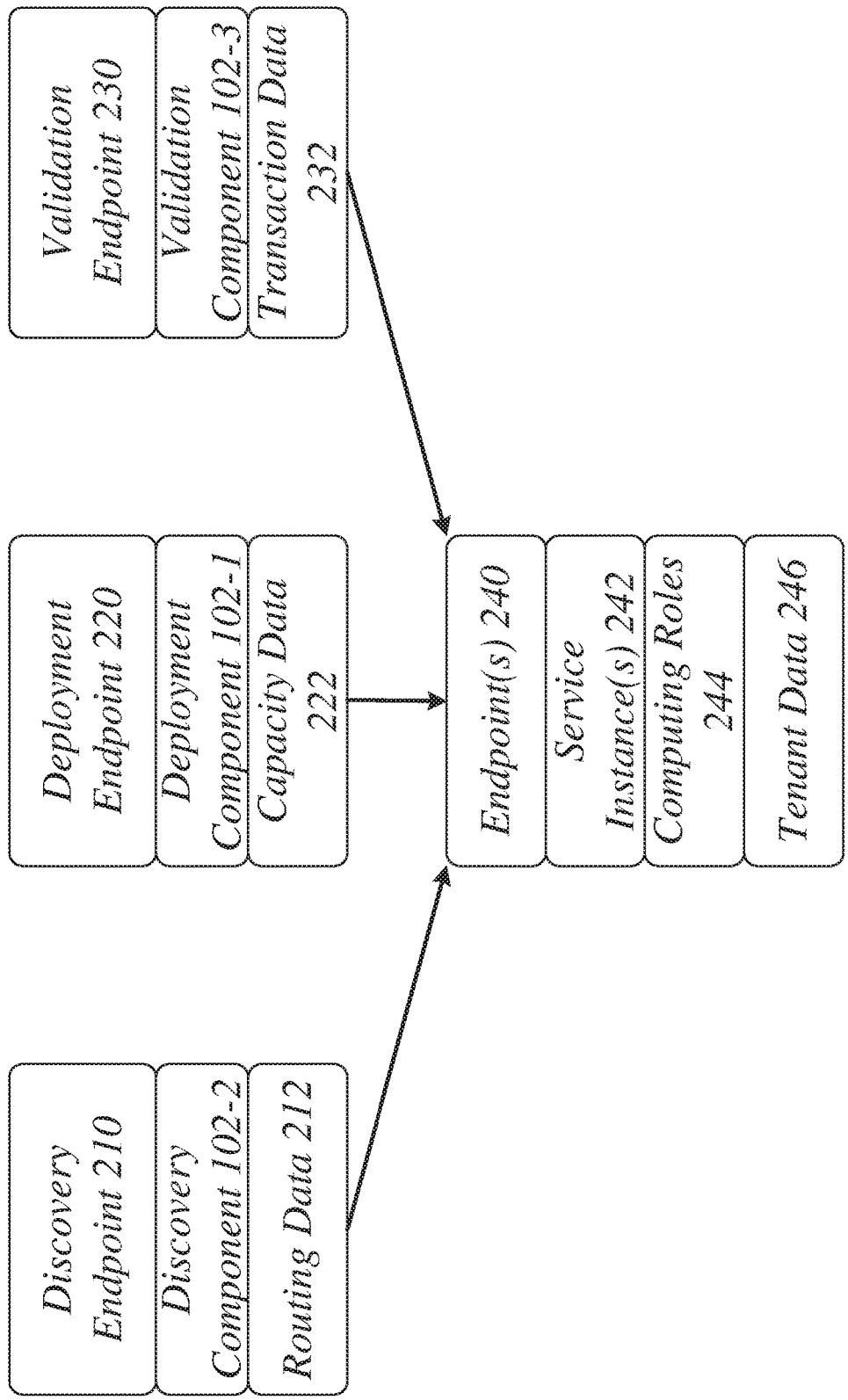
FIG. 2 illustrates an embodiment of a set of components for an online computing service.

FIG. 2 illustrates an embodiment of an operating environment 200 for the system 100. As shown in FIG. 2, the operating environment 200 includes a plurality of endpoints on which various computing resources for the system 100 are configured. Each endpoint may include one or more computing devices (e.g., servers) configured to execute one or more tasks that in some manner support an online computing service, such as a cloud computing service. As noted above, the online computing service as described herein may operate over one or more data networks in order to provide a plurality of computer users (e.g., endpoint users) with data and/or applications. FIG. 2 illustrates some example endpoints, including a discovery endpoint 210, a deployment endpoint 220, a validation endpoint 230 and endpoints 240, but it is appreciated that other endpoints are envisioned by the present disclosure. The endpoints 240 may corresponding to an instance of the online computing service. These endpoints include various computing roles of which a certain group or configuration of computing roles may represent a complete build for the online computing service described above for FIG. 1 through which end-to-end transactions may be executed.

One example endpoint, the discovery endpoint 210, includes the discovery component 122-2 configured to run the online computing service's discovery service for routing the production traffic. The discovery component 122-2 is operative on the discovery endpoint 210 and is configured to process routing data 212. In one embodiment, the discovery component 122-2 processes the routing data 212 when directing the production traffic to specific endpoints amongst the endpoints 240; hence, these specific ones of the endpoints 240 may be referred to as production endpoints.

Another example endpoint is the deployment endpoint 220, which may refer to a server or servers that execute the deployment component 122-1 and, when appropriate, use the discovery component 122-2 running on the discovery endpoint 210 and/or the validation component 122-3 running on the validation endpoint 230 to perform a validation process.

In one embodiment, the deployment component 122-1 utilizes resource capacity data 222 in order to examine a network topology for the plurality of endpoints, such as a network topology for a data center comprised of several server computing devices that run one or more online computing services. The network topology may include information identifying which server computing devices provide data storage and/or processing tasks known as computing roles and which computing role is operative on a particular server device. The deployment component 122-1 may use the network topology to identify a set of computing roles that represent a full implementation of the online computing service's instance. The full implementation may be configured to process incoming/outgoing traffic on behalf of the endpoint users in end-to-end fashion. The set of computing roles may be herein referred to as a deployment unit. One example computing role, a hub role, may generally refer to a server or servers that handle the incoming/outgoing traffic directed to the deployment unit (e.g., the deployment unit's network address). For instance, the hub role may handle all incoming/outgoing email flow, apply transport rules, apply journaling policies, and deliver messages to a recipient's mailbox. Another example computing role may screen incoming/outgoing email traffic and filter out emails with SPAM, viruses and other malware.

In one example embodiment where a change is to be applied to the set of computing roles, the deployment component 122-1 may process the routing data 212 to direct the incoming traffic away from the deployment unit comprising the set of roles. This may be accomplished by modifying the routing data 212 to remove any mappings between the set of computing roles and the endpoints 240, thereby terminating any association with the previous online computing service instance. The deployment unit is identifiable as usable resources. After generating another (e.g., new) online computing service instance and establishing another endpoint on that service instance, the deployment component 122-1 associates the set of computing roles with the other endpoint, which places the computer roles under the direction of the other service instance, completing the migration of the deployment unit to the other service instance. Note, the production traffic is re-routed through other production endpoints of the previous service instance and any user(s) associated with re-routed production traffic is, for the most part, unaffected by the migration.

According to one example embodiment, the deployment component 122-1 modifies the set of computing roles by applying one or more changes to computer program code (e.g., instructions) and/or data stored on the server computing devices that comprises the deployment unit. After implementing the one or more changes, the set of computing roles becomes transformed into a set of changed computing roles.

Another example endpoint, the validation endpoint 230, includes the validation component 122-3 for running end-to-end tests on some on some of the service instances 242. In one example embodiment, the deployment component 122-1 initiates testing of the changed set of computing roles. One example implementation of the validation component 122-3 engages in end-to-end testing by communicating transaction data simulating real-world production traffic. The transaction data allows evaluation of the changed set of computing roles under real world conditions. In the context of online mailbox protection, communicating the transaction data causes the computing roles 244 to perform various email filtering tasks, such as SPAM filtering, malware detection and/or the like.

Figure 3:
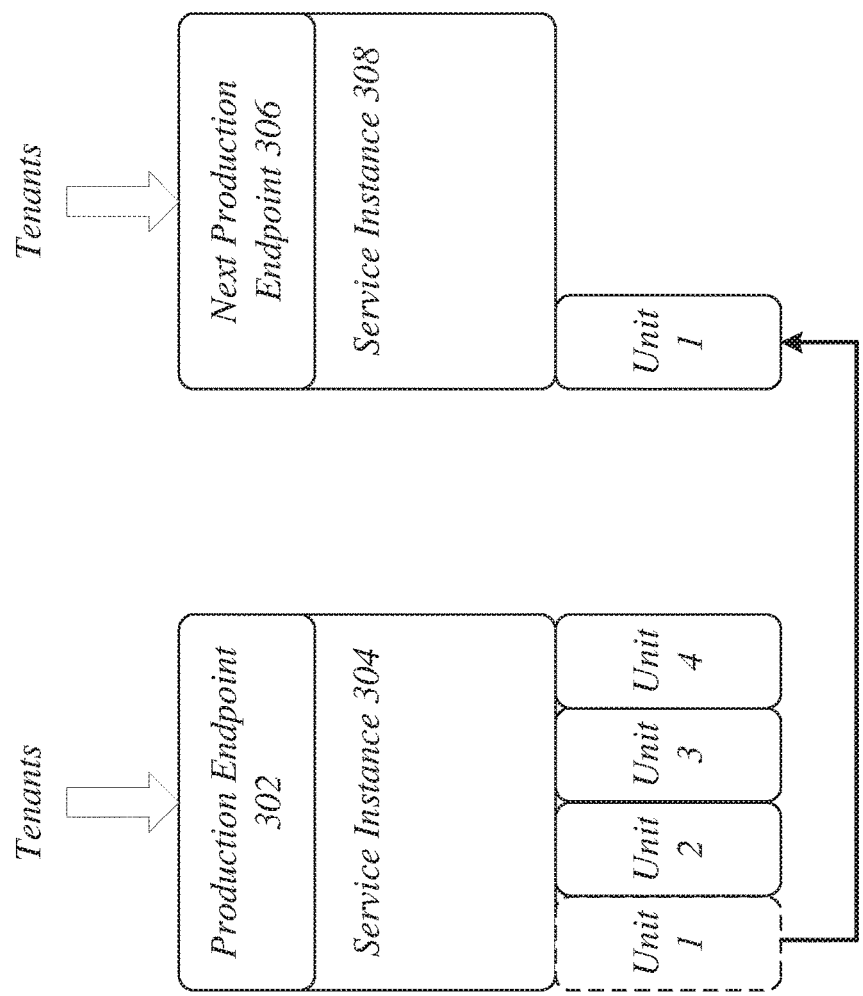
FIG. 3 illustrates an embodiment of a validation process for an online computing service.

FIG. 3 illustrates an embodiment of an operating environment 300 for the system 100. As shown in FIG. 3, the operating environment 300 includes a (current) production endpoint 302 associated with a service instance 304 and a next production endpoint 306 associated with another service instance 308.

The production endpoint 302, for example, may be configured with a plurality of computing devices known as servers that, in coordination, provide an online computing service, such as the service instance 304, to a plurality of tenants. Various parameter data associated with these tenants may determine which production endpoint to be routed as described herein. A management application (e.g., the management application 120 of FIG. 1) may allocate the production endpoint 302 with a quantifiable resource capacity in terms of, by way of example, processing power, storage space, computing capabilities (e.g., platform capabilities) and/or the like. The resource capacity, according to one embodiment, may define a set of deployment units dedicated to serving the service instance 304 to the plurality of tenants for the production endpoint 302. The set of deployment units may be illustrated in FIG. 3 as "Unit 1", "Unit 2", "Unit 3", and "Unit 4" of which each deployment unit represents one or more servers that operate the service instance 304. Each server within any given deployment unit may be configured to operate a specific computing role for the service instance 304, such as a web service role, a hub role, an edge role, a filtering role, and so forth. Each deployment unit includes a set of computing roles that are substantially or completely isolated from other computing roles in the online computing service's network topology. In some embodiments, the deployment units themselves also are isolated from other deployment units in the same network topology.

As depicted in FIG. 3, deployment unit "Unit 1" is migrated from the production endpoint to the next production endpoint 306. According to one example embodiment, the resource capacity allocated to the production endpoint 302 is partitioned and a portion of that capacity is assigned to the next production endpoint 306. A set of servers running a set of computing roles for the service instance 304 may be removed from that instance's resource pool and associated with another resource pool, such as an expected resource pool for the service instance 308. After applying a change to the deployment unit "Unit 1" (including any roll-back operation of a previous change or update to set of computing roles) and prior to deployment upon production traffic, the changed deployment unit "Unit 1" is validated through testing, for example, via the validation component 122-3 of the management application 120 described herein.

Once validated, the changed deployment unit "Unit 1" is deemed ready to handle actual production traffic and accordingly, is deployed as part of a live production environment. Routing data for a specific group of tenants is modified such that traffic generated from these tenants is directed towards the next production endpoint's address. According to one example implementation, these tenants' production traffic is redirected away from the production endpoint 302 and towards the next production endpoint 306, specifically towards the set of servers within the changed deployment unit "Unit 1." It is appreciated that the tenant's production traffic may be communicated to a server operating a specific computing role for the service instance 308 and that server orchestrates the other computing roles corresponding to the online computing service. Hence, that server's computing role may include functioning as an interface (e.g., a web interface).

By repeating at least a portion of the process described above, one or more of the remaining deployment units in the production endpoint 302 may be migrated to the next production endpoint 306 and after validation, may begin serving tenants under the service instance 308. It is appreciated that in other embodiments, none of the remaining deployment units in the production endpoint 302 are migrated. In these embodiments, the operating environment 300 maintains backwards compatibility for the tenant's production traffic. Some tenants utilize the unchanged service instance 304, which may be running an outdated/previous version of the online computing service, while other tenants are served by the updated service instance 308. If any tenant wishes to switch to the updated service instance 308, the deployment component 122-1 of the management application 120 redirects that tenant's production traffic to the changed deployment "Unit 1"; and similarly, if any tenant wishes to switch back to the unchanged service instance 304, that tenant's production data is redirected to one of the deployment units remaining in the production endpoint 302. After a roll back is performed and the changed deployment unit "Unit 1" is reverted to a previous version, the reverted deployment unit "Unit 1" may be migrated back to the production endpoint 302.

Figure 4:
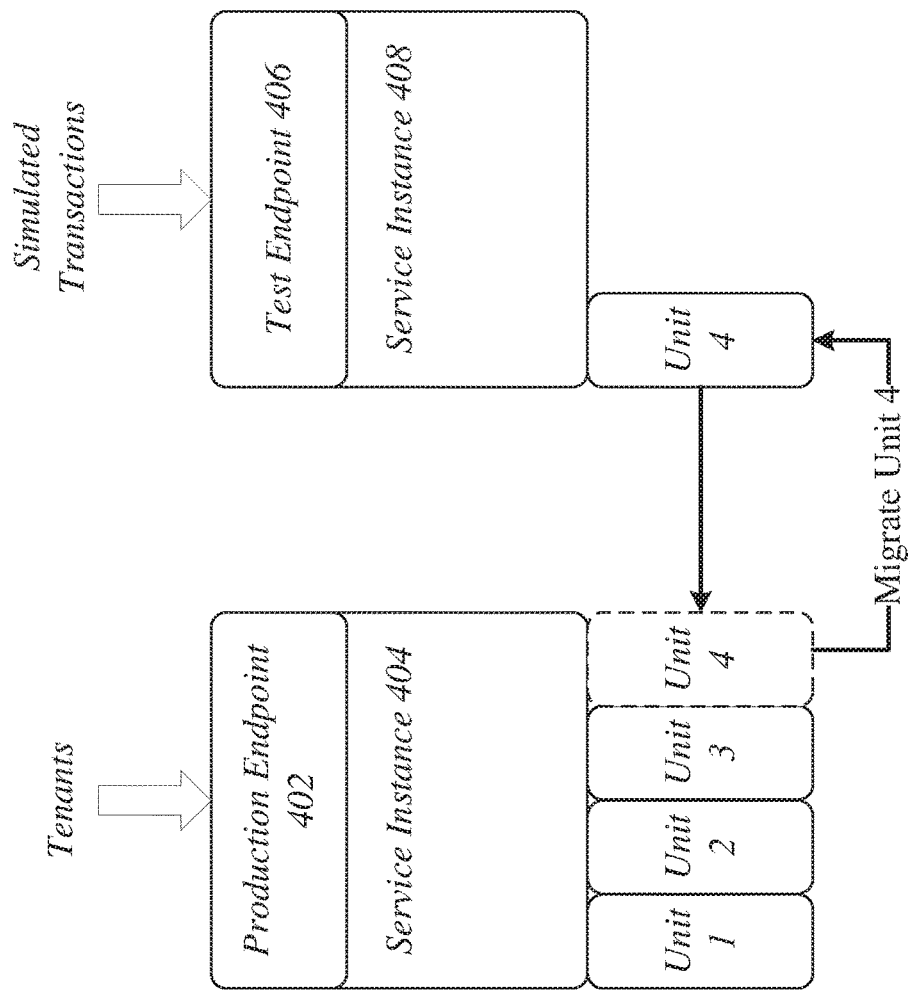
FIG. 4 illustrates an embodiment of alternate validation process for an online computing service.

FIG. 4 illustrates an embodiment of an operating environment 400 for the system 100. As shown in FIG. 4, the operating environment 400 comprises a plurality of service instances, each further comprising one or more endpoints including a production endpoint 402 configured on a service instance 404 and a temporary test endpoint 406 associated with another service instance, service instance 408. As described herein with respect to production endpoints in general, the production endpoint 402 is allocated a resource capacity for serving a plurality of users with data processing and/or storage related tasks, such as those related to an online computing service.

The following description for FIG. 4 describes example embodiments related to when the operating environment 400 provides an online mailbox protection service over a network to the plurality of (mailbox) tenants. The production endpoint 402 may be associated with a network address (e.g., a URL) that receives all incoming and outgoing message data related to an organization, such as an enterprise's internal email system. The above described resource capacity may be partitioned amongst the production endpoint 402 and the test endpoint 406. Because the test endpoint 406 is temporary, any resource capacity assigned to the test endpoint 406 is ephemeral and has a negligible impact on tenant experience. Amongst all computing devices in the operating environment's network topology, the deployment component 122-1 of the management application 120 identifies a set of computing roles (e.g., servers) that, when combined, form a complete build (e.g., full installation) of the online mailbox protection service. In one example embodiment, the identified set of computing roles are isolated from other computing roles in the operating environment 400 and therefore, do not communicate with these roles. As described herein, when the identified set of computing roles operate as the complete build, full end-to-end testing may be executed. Furthermore, changing the complete build may be implemented, tested and deployed without impacting the plurality of tenants' messaging activities.

The deployment component 122-1 of the management application 120 may configure the identified set of computing roles into a deployment unit, such as a deployment unit depicted in FIG. 4 as "Unit 4," and migrate that deployment unit to the service instance 408. One or more of the set of computing roles may be changed, updated and/or replaced, causing inter-role configurations between the set of computing roles to be updated such that inter-role communications are directed to the changed computing role. For example, if the enterprise's web email client interface is updated, a web service computing role may be modified with different code. Other computing roles within the test endpoint 406 are directed to the changed web service computing role. Other changes may also be performed, such as updating/changing other computing roles, updating/changing other software programs, adding custom mailbox protection features, updating operating system settings and/or the like. Once fully configured as a complete build with the changes, testing of the changed set of computing roles may be initiated by the validation component 122-3 of the management application 120. That component may reside in another endpoint communicably coupled to the test endpoint 406, which may referred to as a validation endpoint. For example, the validation component 122-3 may run tests comprising simulated mailbox-related transactions (e.g., incoming/outgoing emails) upon the deployment unit "Unit 4" and analyze any test results in accordance with various performance-based metrics. The test results, for example, may record successes/failures of email filtering operations, such as SPAM and malware scanning. If the test results indicate a successful transition to the changed computing roles, the deployment unit "Unit 4" is migrated back to the service instance 404 and brought under the control of the production endpoint 406. Each remaining deployment unit on the production endpoint 406 may be migrated to the test endpoint for an upgrade and, possibly, for testing; and if the modified deployment unit successfully completes the validation process, the modified deployment unit is migrated back to the production endpoint 402 and deployed for production traffic.

In some example embodiments, when one or more of these changed/updated computing roles are tested and the change causes problems handling user message data changes can be rolled back. According to one example roll-back operation, a changed computing role's software code is replaced with a previous version of that computing role. According to another example, the management application may instruct the server operating as the changed role to use the previous version of the changed computing role instead of the changed computing role. After being rolled-back, the deployment unit "Unit 4" may be migrated back to the service instance 404.

Figure 5:
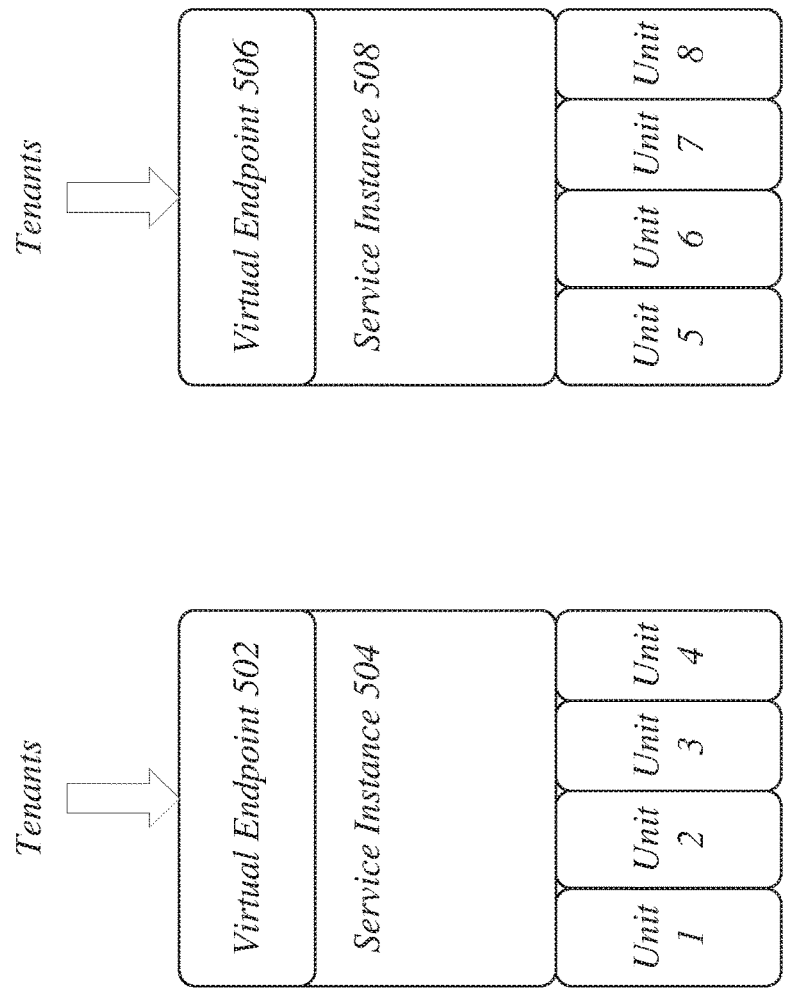
FIG. 5 illustrates an embodiment for isolating production traffic for an online computing service.

FIG. 5 illustrates an embodiment of an operating environment 500 for the system 100. As shown in FIG. 5, the operating environment 500 comprises a virtual endpoint 502 and a virtual endpoint 506 corresponding to a service instance 504 and a service instance 508, respectively. Combined, the virtual endpoint 502 and the virtual endpoint 506 may represent at least some resource capacity for an online computing service. As described herein, a resource capacity refers to various server or computing roles of which some may be stateless and some may be state-full. Each virtual endpoint is allocated a plurality of computing roles that comprise a number of complete builds of the online computing service. There are various degrees to which each virtual endpoint's resource capacity may be isolated from the other virtual endpoint's resource capacity. In some embodiments, the virtual endpoint 502 may be completely isolated from the virtual endpoint 506 by not sharing any resources, persistent databases, and/or computing roles. In some embodiments, certain state-full roles are maintained as shared resources, such as a globally shared database storing SPAM or malware signature data.

Within the plurality of computing roles, a deployment unit may define a set of computing roles that, independent of any other computing role, represent one complete build. Hence, each endpoint includes a set of deployment units that are isolated from other deployment units in a network topology for the online computing service. The resource capacity is partitioned into these isolated units. In one embodiment, the virtual endpoint 506 comprises an isolated build that has been changed to adapt to that virtual endpoint's users. As an example, sensitive email traffic for top level government officials may be segregated from other government email traffic originating from a same region by directing the other government email traffic email traffic to the virtual endpoint 502 and directing the sensitive email traffic to the virtual endpoint 506. An example operating environment for such an example may be described for FIG. 8.

Figure 6:
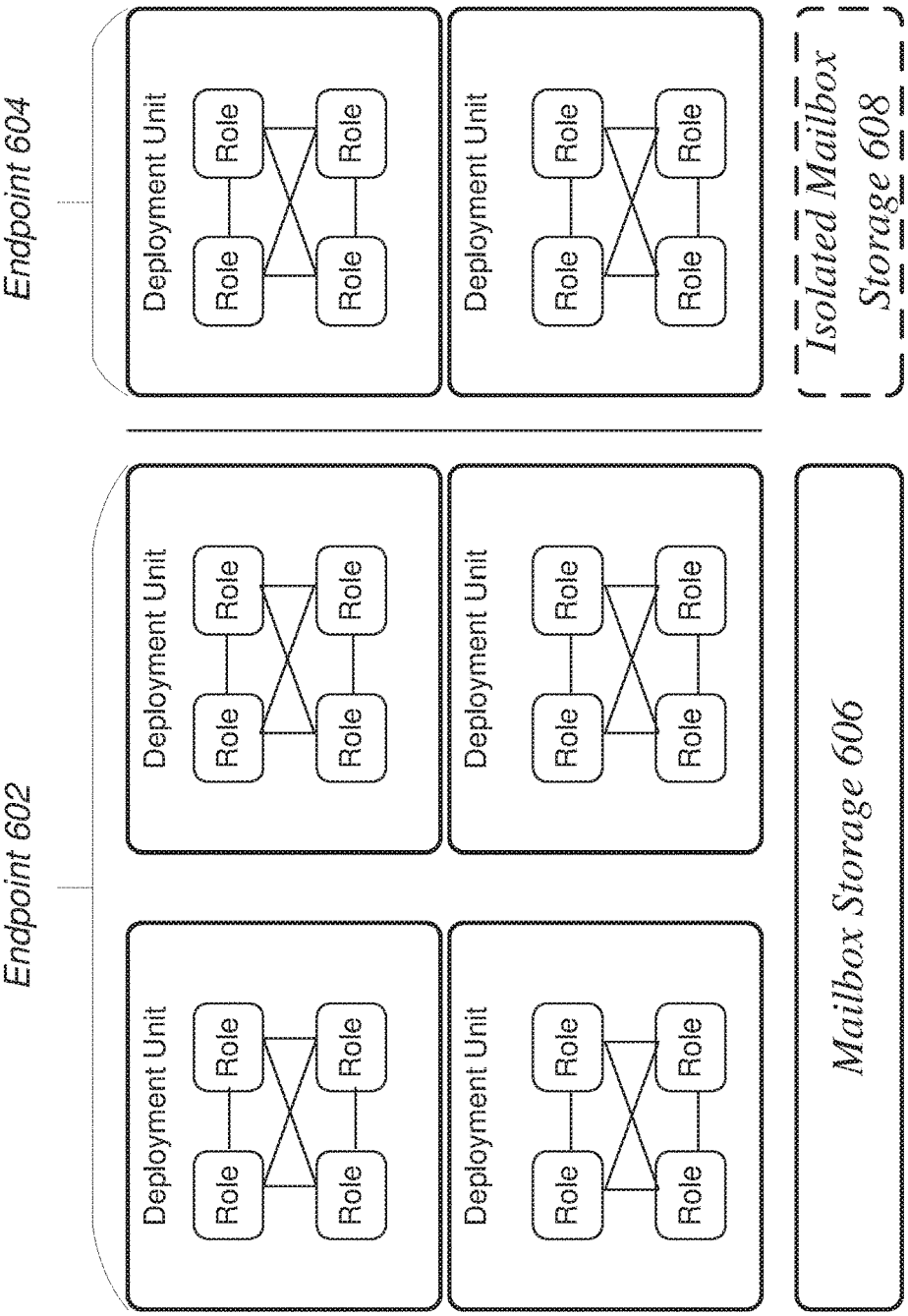
FIG. 6 illustrates an embodiment of a deployment unit for running an online computing service.

FIG. 6 illustrates an embodiment of an operating environment 600 for the system 100. As shown in FIG. 6, the operating environment 600 includes a network topology of computing devices (referred to as servers) representing a resource capacity allocated to one or more online computing service instances. Each deployment unit depicted in FIG. 6 comprises a set of computing roles operating as complete build of an online computing service instance that may execute end-to-end transactions, such as incoming and outgoing email filtering transactions.

In one embodiment, the deployment component 122-1 has the ability to move servers or roles of a deployment unit from one endpoint to another endpoint. In one embodiment, the deployment component 122-1 is configured to add the servers in the deployment unit to expected pools in load balancers associated the other endpoint and remove them from any unexpected pools, restrict inter-role communications to internal servers of the deployment unit, and associate (e.g., tag) the deployment unit with the other endpoint.

The deployment units depicted in FIG. 6 may be dedicated to operating an endpoint protection service, such as a mailbox protection service. As described herein, the discovery component 122-2 functions as an endpoint discovery service that is used to route email traffic for a given tenant to specific endpoints or specific deployment units within an endpoint. A large commercial enterprise, for example, may be allocated multiple mailbox protection service instances where each instance contains a collection of related endpoints that serve a subset of tenants within a given domain (e.g., tenants belonging to a same geographic region).

The mailbox protection service supports various protocols for communicating production traffic, such as SMTP and HTTPS. For SMTP incoming traffic, the discovery component 122-2 routes a tenant's emails to a deployment unit or units by implementing DNS functionality. For incoming HTTPS traffic, the discovery component 122-2 re-routes a tenant's emails using HTTP-redirect where every web server communicates with the discovery component 122-2 to identify the right endpoint or deployment for servicing the tenant.

When deploying a change (e.g., a major change or update), the deployment component 122-1 instructs the discovery endpoint 122-2 to segregate endpoint 602 directed traffic and endpoint 604 directed traffic, for example, for experimentation or to isolate the endpoint 604 to a subset of tenants. Hence, given a tenant, the discovery component 122-2 may route the tenant's email traffic to either the endpoint 602 or the endpoint 604. In one embodiment, the deployment component 122-1 may partition a resource capacity allowing allocation of deployment units to either the endpoint 602 or the endpoint 604 and after migrating the deployment units to their respective endpoints, the deployment component 122-1 may share access to mailbox storage 606 amongst the endpoint 602 and the endpoint 604. The mailbox storage 606 generally stores tenant mailboxes for the enterprise's email users. As an option, some mailboxes may be held in isolated mailbox storage 608 to which the endpoint 604 is granted access.

The deployment component 122-1, as described herein, may apply one or more changes to a deployment unit and update that unit's current build into a new build for the mailbox protection service. Each deployment unit includes servers of all the computing roles so that the new build's end-to-end functionality may be tested using simulated transactions and if such testing indicates validity, exposed to tenants by deploying only that deployment unit. The validation component 122-3 may represent a test automation machine within the same data center as the deployment units that is configured to run tests on the new build's end-to-end functionality.

Figure 7:
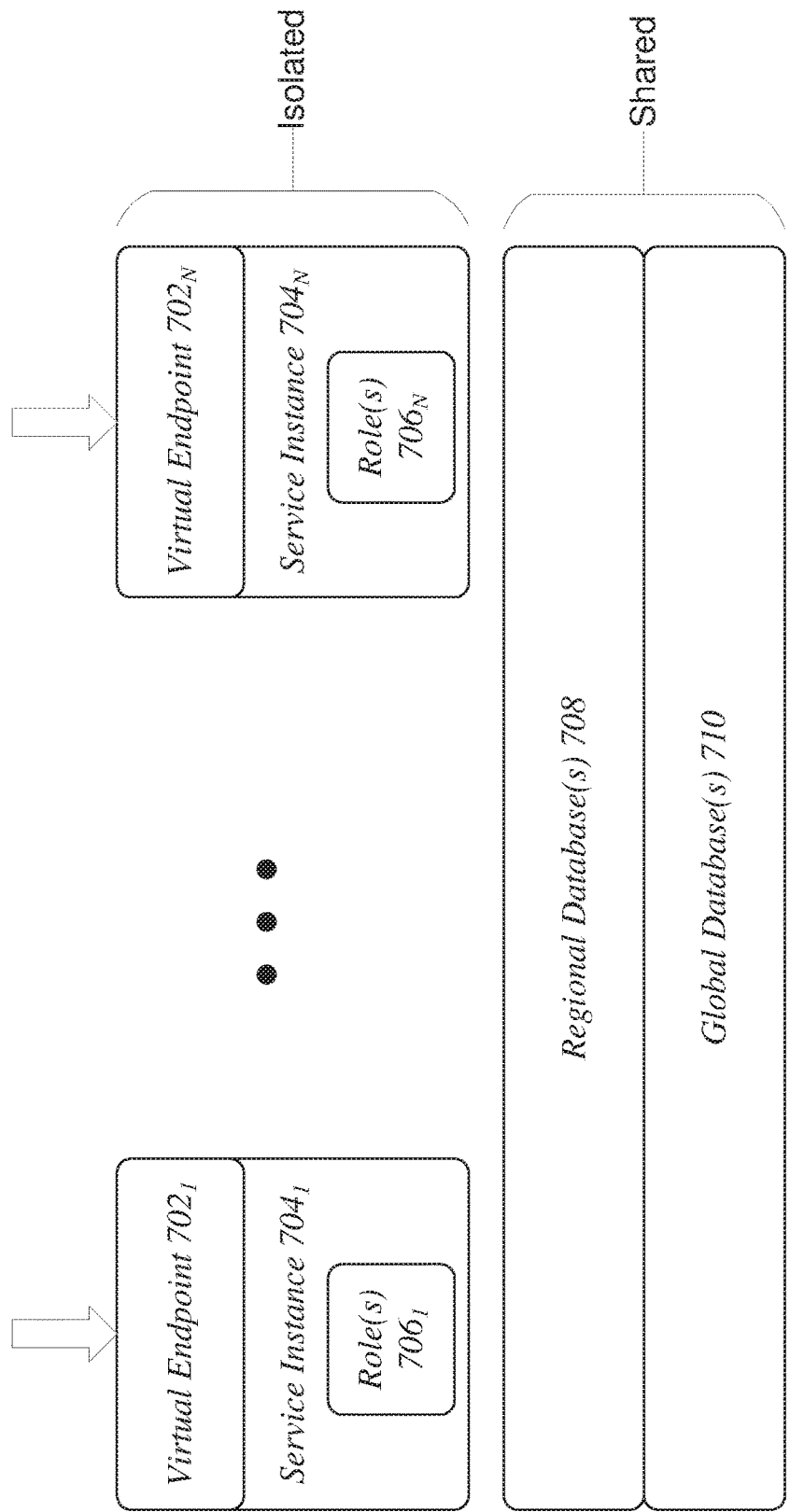
FIG. 7 illustrates an embodiment of an online computing service featuring isolated endpoints.

FIG. 7 illustrates an embodiment of an operating environment 700 for the system 100. In one example embodiment, the operating environment 700 refers to a cloud or online computing service architecture in which a virtual endpoint is adapted to isolate specific tenant production traffic while leveraging at least some shared infrastructure. As shown in FIG. 7, the operating environment 700 includes a plurality of virtual endpoints $702_{1...N}$ of which a given virtual endpoint 702 is configured on a service instance 704. Each virtual endpoint 702 also comprises a set of computing roles 706 for operating the service instance 704. In one embodiment, each set of computing roles 706 has the quality of being stateless (e.g., non-persistent) and isolated from the other virtual endpoints while state-full computing resources are shared across the plurality of virtual endpoints $702_{1...N}$. FIG. 7 depicts regional databases 708 and global databases 710 as examples of shared state-full computing resources.

One example implementation may designate an example virtual endpoint $702_1$ as a dedicated endpoint for a specific subset of tenants while isolating other tenant production traffic to at least one of remaining virtual endpoints $702_{2...N}$. Such isolation may be permanent or temporary. For example, the subset of tenants may be selected at random to test an upgraded build of the online computing service.

The subset of tenants may have certain criteria necessitating isolation to the dedicated endpoint. In one example, email traffic for a group of government tenants are not co-mingled with that of commercial or civilian tenants in the operating environment 700. This allows for the government tenants to have their data isolated from that of others who are non-government. In another example, a government tenant levies a requirement on an online computing service provider that the software and hardware that are used to process their email and data may only be accessed by that provider's employees who have certain security clearances and meet citizenship requirements. The hardware and software in the online computing service can be isolated architecturally and logically to only allow employees who are administrators or engineers who meet the requirements by the government tenant to be able to access the online computing service. At the same time, the other instance of the online computing service would be available for administrators and engineers to access and maintain the service.

Figure 8:
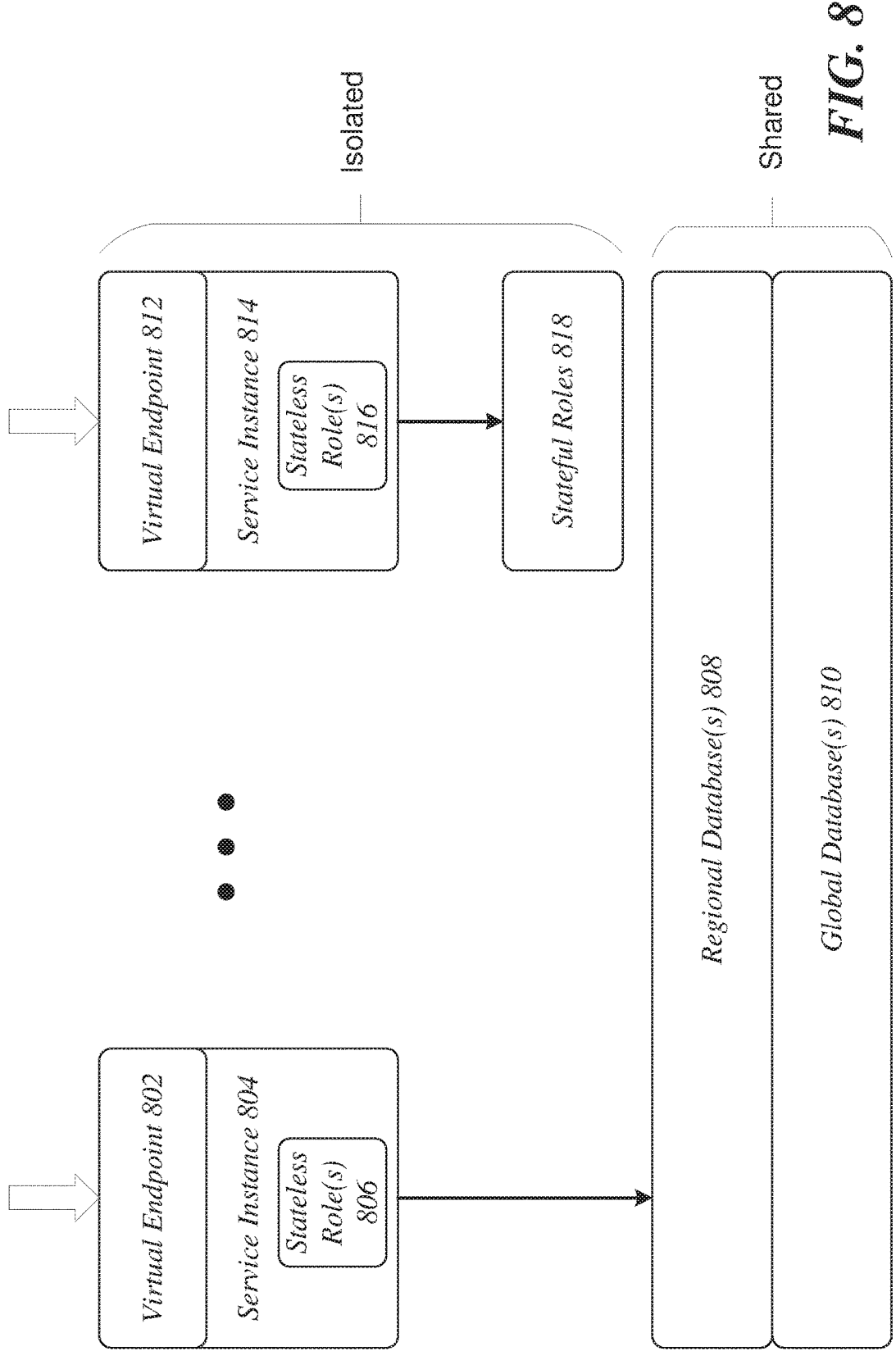
FIG. 8 illustrates another embodiment of an online computing service featuring isolated endpoints.

FIG. 8 illustrates an embodiment of an operating environment 800 for the system 100. As shown in FIG. 8, the operating environment 800 almost completely isolates the virtual endpoint 812 from other virtual endpoints, such as when a service instance 814 is dedicated to serving a particular group of tenants, such as executive government officials. In addition to stateless roles 816, the virtual endpoint 812 includes state-full roles 818 that are not shared amongst the other virtual endpoints. These state-full roles 818 may include persistent databases storing non-sensitive data, such as SPAM or malware signatures.

Given a fixed group of servers operating a set of computing roles, these servers may be segregated such that software may be deployed to these servers while maintaining virtual isolation between virtual domains in the online computing service. Each service instance can be configured with its own virtual endpoint. As described above for FIG. 7, some embodiments of the deployment component 122-1 may isolate only the stateless computing roles 816. In FIG. 8, in addition to isolating all the stateless roles 816, some state-full roles 818 are isolated into the virtual domains, such as when specific tenant data is to be isolated from other tenant data. In this case, the software in the state-full role would provide virtual isolation from other service instances. Optionally, the entire group of roles or servers can be isolated to support separate dedicated service instances. Hence, the deployment unit may be adapted dynamically to provide a service instance ranging from maximum resource sharing to maximum isolation.

Figure 9:
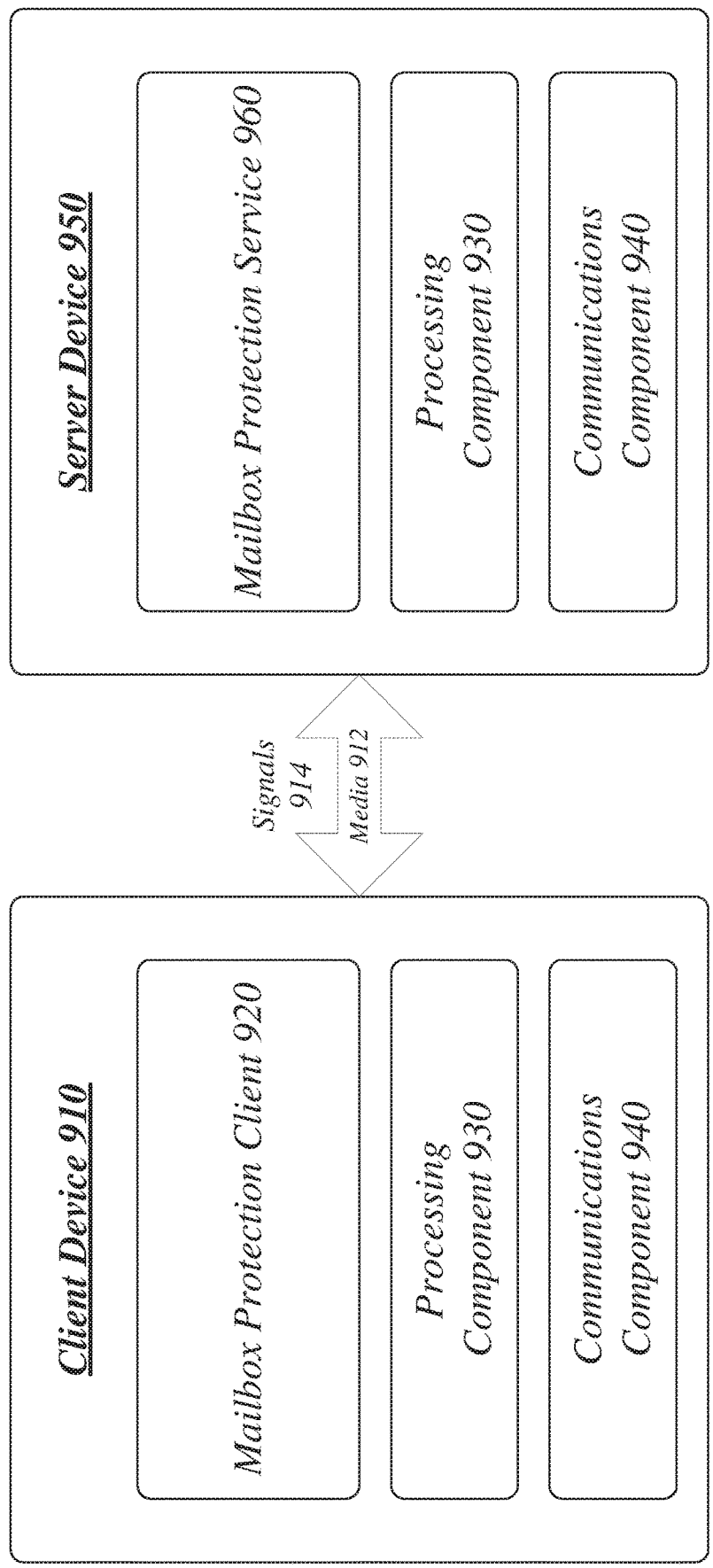
FIG. 9 illustrates an embodiment of a distributed system for the system of FIG. 1.

FIG. 9 illustrates a block diagram of a distributed system 900. The distributed system 900 may distribute portions of the structure and/or operations for the system 100 across multiple computing entities. Examples of distributed system 900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 900 may comprise a client device 910 and a server device 950. In one example, the devices 910, 950 may communicate over a communications media 912 using communications signals 914 via the communications components 940.

In general, the client device 910 and/or the server device 950 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The client device 910 and/or the server device 950 may execute processing operations or logic for the system 100 using a processing component 930. The processing component 930 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The client device 910 and/or the server device 950 may execute communications operations or logic for the system 100 using communications component 940. The communications component 940 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 940 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 912 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The client device 910 may comprise or employ one or more client programs that operate to perform various methodologies in accordance with the described embodiments. In one embodiment, for example, the client device 910 may implement a mailbox protection client 920 that functions as an interface to an online computing service referred to as a mailbox protection service. The mailbox protection client 910 may be a component (e.g., a plug-in) of an email messaging application in use at the client device 910 and configured to present mailbox information, send/receive email and other email-related tasks.

The server device 950 may comprise or employ one or more server programs that operate to perform various methodologies in accordance with the described embodiments. In one embodiment, the server device 950 may implement at least a portion of a mailbox protection service 960. To illustrate by way of examples, the server device 950 may operate a computing role that processes incoming production traffic from the client device 910 or the server device 950 may operate the entire mailbox protection service. Alternatively, the service device 950 may represent a plurality of server devices that cooperate to operate the mailbox protection service 960.

In one embodiment, the mailbox protection service 960 processes incoming emails to the client device 910 for any possible threats or problems. The incoming emails may be forwarded to the server device 950 from by the client device 910 itself or a local on-premises enterprise server that handles all network traffic in and out of the client device 910. Optionally, the incoming emails may be directly routed to the server device 950. Possible threats include, but not limited to, malware, SPAM, phish and/or any other software vulnerability exploit.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 10:
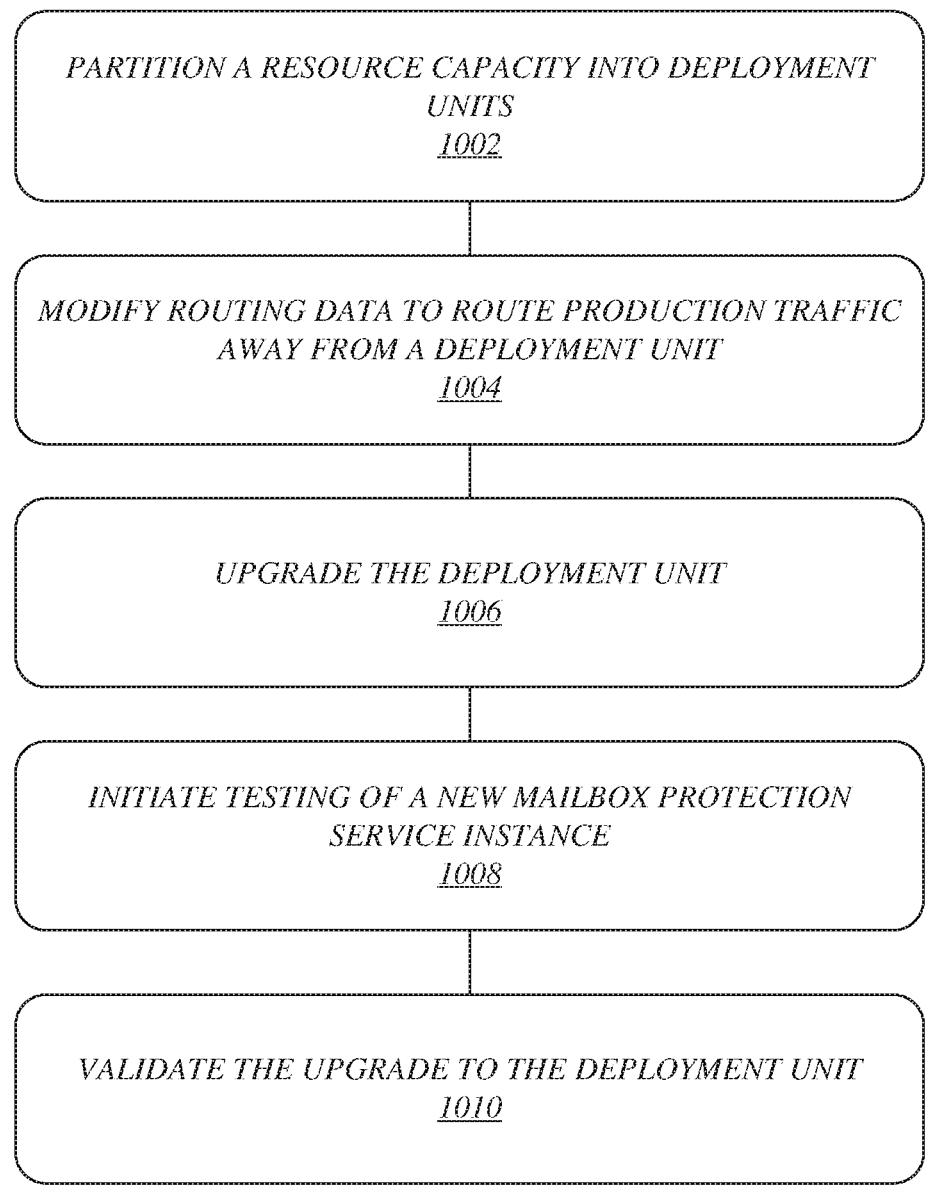
FIG. 10 illustrates an embodiment of a logic flow for the system of FIG. 1.

FIG. 10 illustrates one embodiment of a logic flow 1000. The logic flow 1000 may be representative of some or all of the operations executed by one or more embodiments described herein.

In the illustrated embodiment shown in FIG. 10, the logic flow 1000 partitions a resource capacity into deployment units at block 1002. For example, each deployment unit may include a set of servers operating various computing roles for the mailbox protection service.

The logic flow 1000 may modify routing data to route production traffic away from one of the deployment units at block 1004. For example, the deployment unit's servers may be added to expected resource pools in load balancers that are used by the other mailbox protection service instance's endpoints and removed from an expected resource pool for the service instance. Hence, these servers' resources are no longer be available for handling tenant production traffic. Any N-tier communication may be restricted to internal endpoints of the service instance and/or to internal roles within a deployment unit. This inter-role routing configuration on the machines is modified as a server is moved to a new service instance.

As an alternative, by partitioning the mailbox protection service's resource capacity into deployments units as described herein, the deployment component 122-1 of the management application 120 may generate a mailbox protection service instance to support service tenants that request complete isolation from other tenants. In one embodiment, the deployment component 122-1 isolates a service instance across stateless roles and at least some state-full roles where complete service isolation is desired.

The logic flow 1000 may upgrade the deployment unit at block 1006. For example, one or more servers within the deployment unit may be updated with new/replacement software code and/or customized features. An example computing role, for instance, a web service role, may be changed to fix one or more program bugs and/or to perform one or more custom functions. Another example computing role may be changed to include new malware removal mechanisms and/or new malware signature data. As a part of this upgrade, the deployment component 122-1 may migrate a portion of the resource capacity to the other service instance's endpoints. At this point, the deployment unit is configured the other service instance's endpoints and that deployment unit is brought online, becoming available for handling actual production traffic.

The logic flow 1000 may initiate testing of a new mailbox protection service instance at block 1008. For example, test tenants may invoke end-to-end tests upon the deployment unit. The validation component 122-3 of the management application 120 may run simulated transactions on the deployment unit. The deployment component 122-1 may also upgrade the validation component 122-3 with a latest build of the new mailbox protection service. Thus, the simulated transactions are appropriate for testing the new mailbox protection service instance.

The logic flow 1000 may validate the upgrade to the deployment unit at block 1010. For example, the validation component 122-3 of the management application 120 may analyze test results from the simulated transactions. If the test results indicate successful completion of a substantial number of the tests, a portion of the email traffic is routed to the deployment unit, possibly, for further testing. One example implementation does not perform mailbox migration for any tenant associated with this portion and only changes the routing data to include endpoints associated with the new mailbox protection service instance.

In one example embodiment, the logic flow 1000 is repeated for subsequent deployment units in the data center. Once a deployment unit is configured for the new mailbox protection service instance, additional tenant email traffic is routed to the new mailbox protection service instance's endpoint.

Alternatively, endpoints associated with the new mailbox protection service only generate temporarily upon being associated with a first deployment unit. Email traffic from actually tenants are never routed to these endpoints. Instead, test tenants are associated with the endpoints and run end to end tests on these endpoints. Following the validation, the upgraded first deployment unit is migrated back to a production endpoint (e.g., an out-of-band of deployment upgrade). Since the new build of the mailbox protection service has been tested and validated for correctness and durability, subsequent deployment units are upgraded in a rolling fashion in-place (e.g., without being moved to test endpoints).

The embodiments are not limited to this example.

Figure 11:
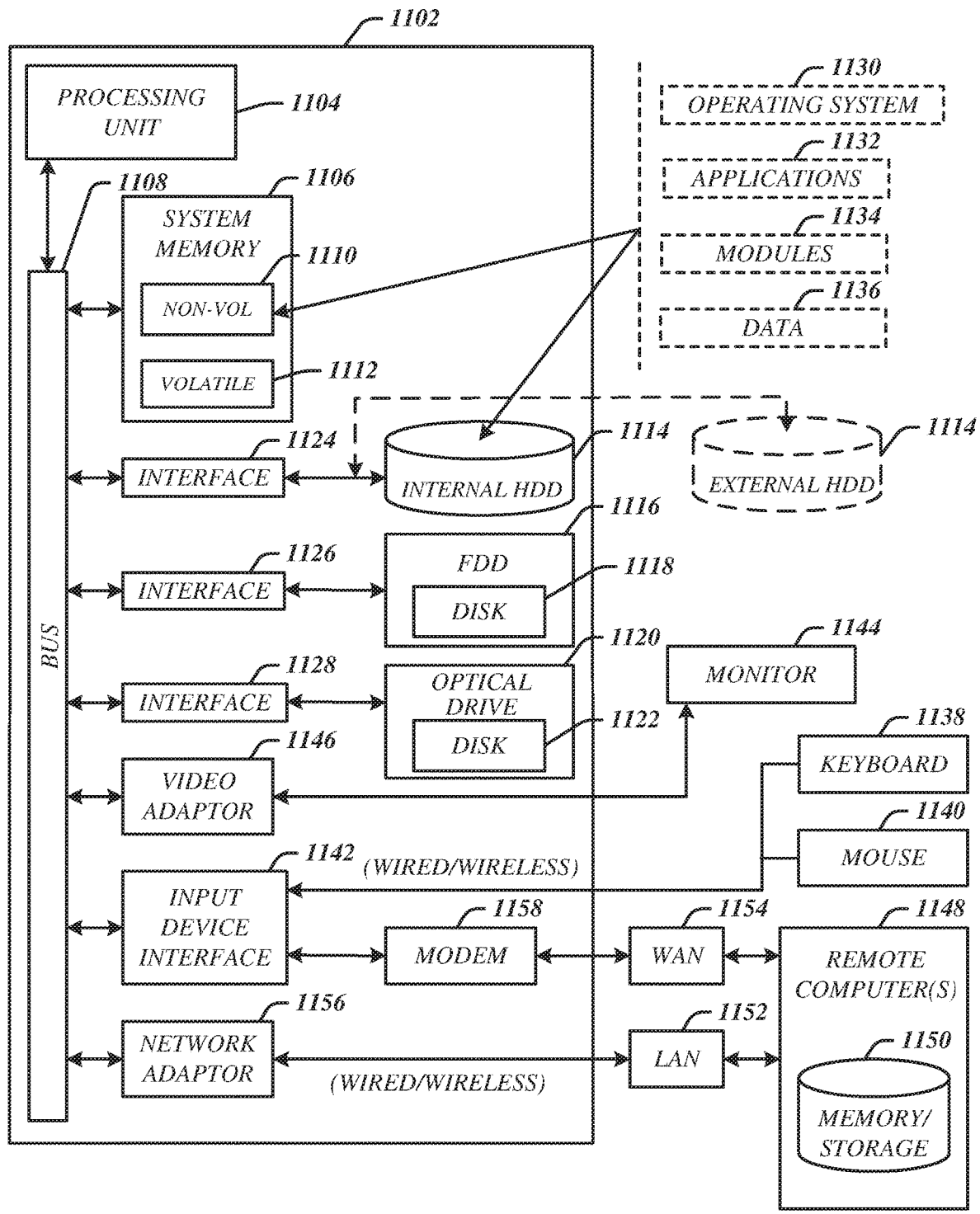
FIG. 11 illustrates an embodiment of a computing architecture.

FIG. 11 illustrates an embodiment of an exemplary computing architecture 1100 suitable for implementing various embodiments as previously described. In one embodiment, the computing architecture 1100 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the system 100.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
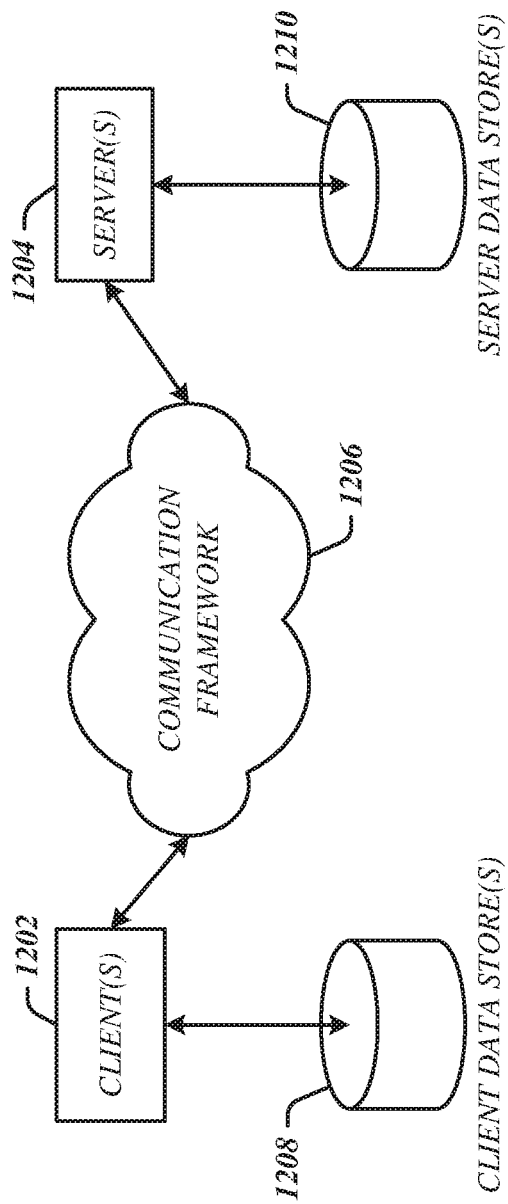
FIG. 12 illustrates an embodiment of a communications architecture.

FIG. 12 illustrates a block diagram of an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 comprises includes one or more clients 1202 and servers 1204. The clients 1202 may implement the client device 910. The servers 1204 may implement the server device 950. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 may communicate information between each other using a communication framework 1206. The communications framework 1206 may implement any well-known communications techniques and protocols. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1202 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
 a processor;
 a set of memory units; and
 a management application operative on the processor, the management application configured to perform functions of:
  routing production traffic away from a deployment unit, the deployment unit including a server for running a first endpoint protection service instance for a plurality of endpoints,
  generating a second endpoint protection service instance,
  establishing a different endpoint on the second endpoint protection service instance,
  migrating the deployment unit to the different endpoint,
  applying a change to the deployment unit to produce a modified deployment unit,
  and
  routing at least a portion of the production traffic to the modified deployment unit for testing.

2. The apparatus of claim 1, further comprising a deployment component arranged to direct a discovery component to process routing data and route the production traffic away from the deployment unit.

3. The apparatus of claim 1, further comprising a validation component arranged to initiate testing with the modified deployment unit.

4. The apparatus of claim 1, further comprising a discovery component to route the production traffic to the different endpoint.

5. The apparatus of claim 1, further comprising a discovery component to route the portion of the production traffic to the different endpoint and another portion of the production traffic to the production endpoint.

6. The apparatus of claim 2, wherein the deployment component is operative to apply a change to at least one computing role of a mailbox protection service for execution on the deployment unit, and create a new mailbox protection service instance.

7. The apparatus of claim 6, wherein the deployment component is operative to roll back the change to the at least one computing role.

8. The apparatus of claim 2, wherein the deployment component is operative to isolate production traffic associated with a subset of a plurality of users associated with the production traffic to the modified deployment unit.

9. The apparatus of claim 2, wherein the deployment component is operative to arrange the deployment unit to be a dedicated service instance to handle production traffic from a subset of a plurality of users associated with the production traffic.

10. A computer-implemented method, comprising:
routing production traffic away from a deployment unit comprising servers for running an endpoint protection service instance for a plurality of endpoints;
generating a second endpoint protection service instance, establishing a different endpoint on the second endpoint protection service instance,
migrating the deployment unit to the different endpoint;
applying a change to the deployment unit to produce a modified deployment unit;
and
routing at least a portion of the production traffic to the modified deployment unit for testing.

11. The computer-implemented method of claim 10, comprising analyzing results from testing the second endpoint protection service.

12. The computer-implemented method of claim 10, comprising rolling back the change to the deployment unit.

13. The computer-implemented method of claim 10, comprising modifying an inter-role configuration between the servers for the deployment unit.

14. The computer-implemented method of claim 10, comprising executing tests of the modified deployment unit.

15. The computer-implemented method of claim 10, comprising configuring a set of computing roles into the deployment unit, the set of computing roles comprising a complete build of the endpoint protection service instance, applying a change to the set of computing roles to produce a new build of the endpoint protection service instance, and testing the new build of the endpoint protection service instance.

16. The computer-implemented method of claim 10, comprising isolating a portion of production traffic that is associated with the modified deployment unit.

17. At least one non-transitory computer-readable storage medium comprising instructions that, when executed, cause a system to:
process routing data to route production traffic away from a deployment unit corresponding to online mailbox protection in which the deployment unit comprises a set of computing roles for running a mailbox protection service for a plurality of mailbox users;
upgrade the mailbox protection service to produce a new mailbox protection service; and route at least a portion of the production traffic to the new mailbox protection service to initiate testing of the new mailbox protection service.

18. The non-transitory computer-readable storage medium of claim 17, comprising instructions that when executed cause the system to:
modify the routing data to migrate the deployment unit from a production endpoint to a test endpoint.

19. The non-transitory computer-readable storage medium of claim 17, comprising instructions that when executed cause the system to:
process resource capacity data to isolate another portion of the production traffic to the deployment unit.

20. The non-transitory computer-readable storage medium of claim 17, comprising instructions that when executed cause the system to:
modify the routing data to route the production traffic back to the deployment unit.

* * * * *